United States Patent [19]

Champlin et al.

[11] Patent Number: 4,561,088
[45] Date of Patent: Dec. 24, 1985

[54] COMMUNICATION SYSTEM BYPASS ARCHITECTURE

[75] Inventors: Keith S. Champlin, Minneapolis; Pradip C. Kar, Coon Rapids, both of Minn.

[73] Assignee: FMC Corporation, Chicago, Ill.

[21] Appl. No.: 579,326

[22] Filed: Feb. 13, 1984

[51] Int. Cl.[4] .................. H04J 1/16; H04J 3/14; H04J 3/02; H04J 3/00
[52] U.S. Cl. .................. 370/16; 370/85; 370/86; 370/88
[58] Field of Search .......... 370/13, 15, 16, 85, 370/86, 88

[56] References Cited

U.S. PATENT DOCUMENTS

| | | | |
|---|---|---|---|
| 3,891,804 | 6/1975 | Hachenburg . | |
| 4,019,176 | 4/1977 | Cour et al. . | |
| 4,032,893 | 6/1977 | Moran | 370/85 |
| 4,071,700 | 1/1978 | Huffman et al. | 370/16 |
| 4,190,821 | 2/1980 | Woodward | 370/16 |
| 4,205,326 | 5/1980 | Porter et al. | 370/86 |
| 4,293,948 | 10/1981 | Soderblom . | |
| 4,347,605 | 8/1982 | Hashizume et al. | 370/16 |
| 4,380,061 | 4/1983 | Mori et al. | 370/16 |

FOREIGN PATENT DOCUMENTS 551118  5/1974  Switzerland .

OTHER PUBLICATIONS

Compcon 80, Digest of Papers, Proceedings "Distributed Computing", Sep. 23–25, 1980, pp. 507–515, Twenty-First IEEE Computer Society International Conference, Washington, D.C., Thomas C. Wilson et al. entitled Distributed Control of Ring Networks Using a Play Through Protocol.

Primary Examiner—Douglas W. Olms
Assistant Examiner—Wellington Chin
Attorney, Agent, or Firm—H. M. Stanley; R. B. Megley

[57] ABSTRACT

A data bus system having enhanced survivability includes a plurality of serially connected active terminals which may be configured in a user access mode to service users coupled thereto or a diagnostic mode during which the terminals undertake an analysis of the condition of the system and a determination is made of the optimum available system configuration. Complementary redundant transmission paths extend between each terminal and the terminal adjacent together with a bypass transmission path which couples each terminal with the terminal beyond the adjacent terminal. The bypass paths in conjunction with the complementary transmission paths operate to allow a greater number of faults to occur in the transmission paths without bus degradation.

51 Claims, 48 Drawing Figures

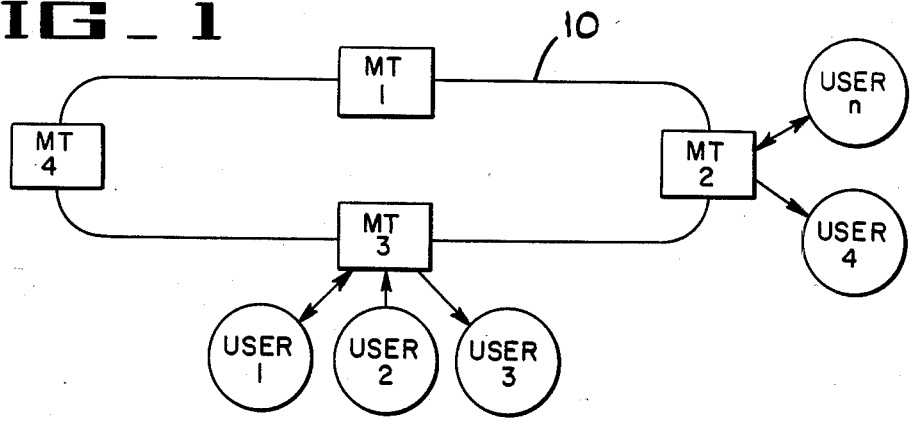
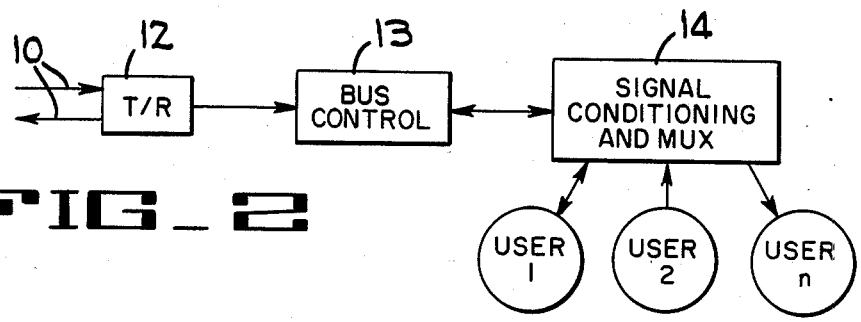
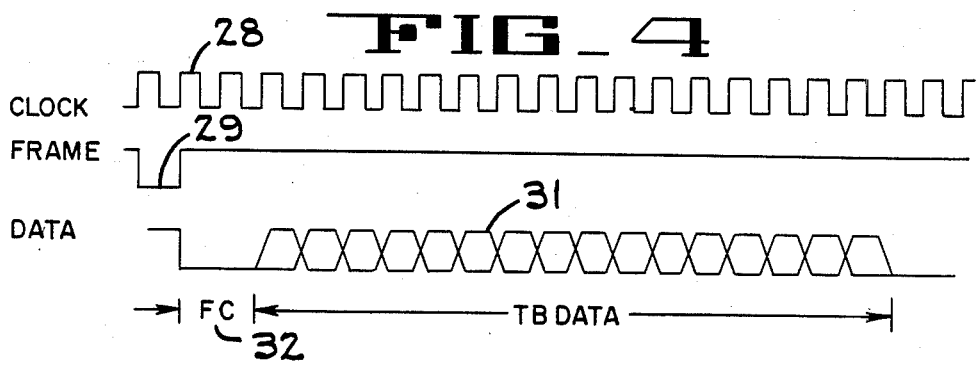
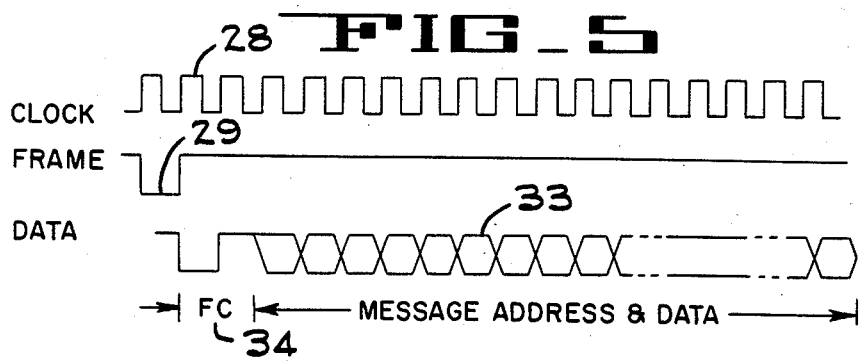

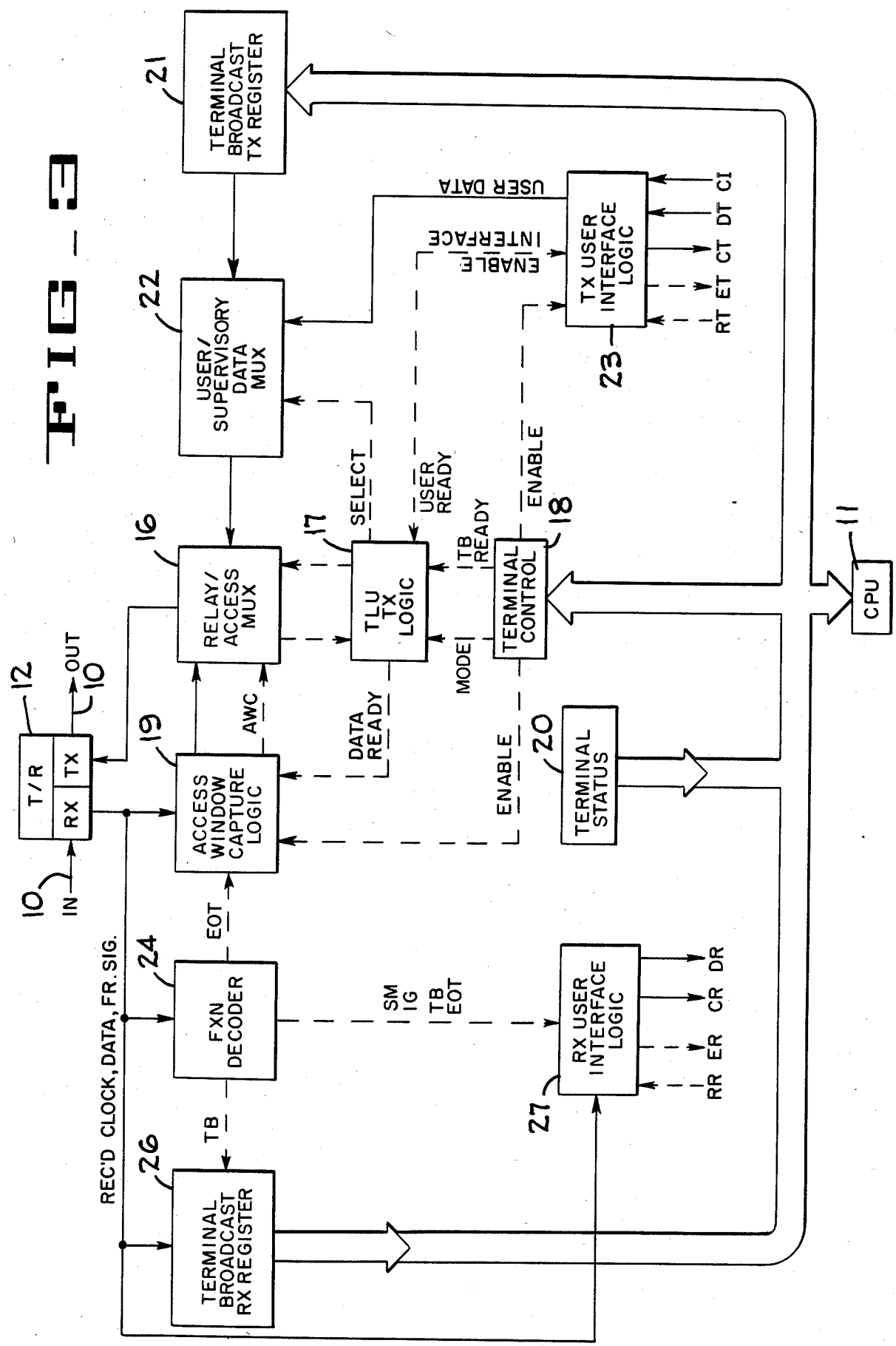

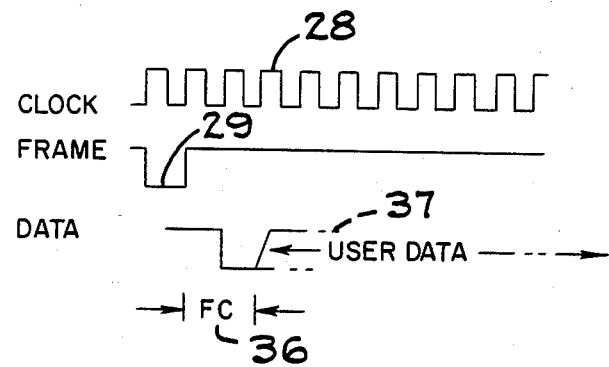
FIG_6
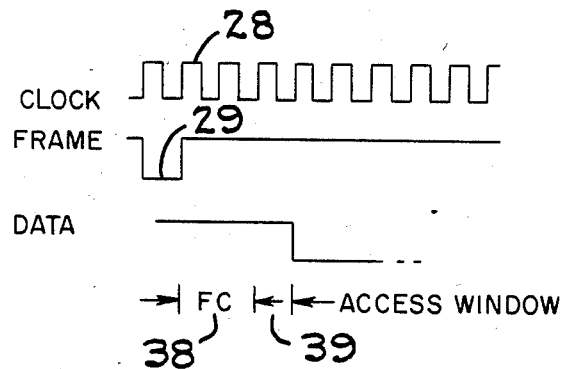
FIG_7
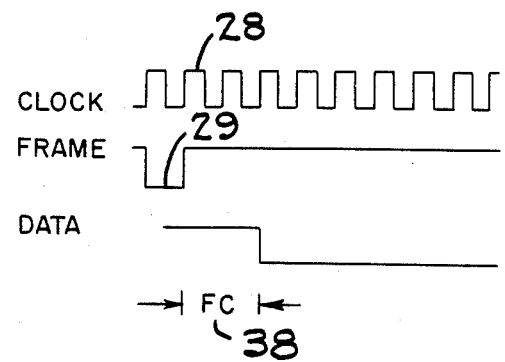
FIG_8

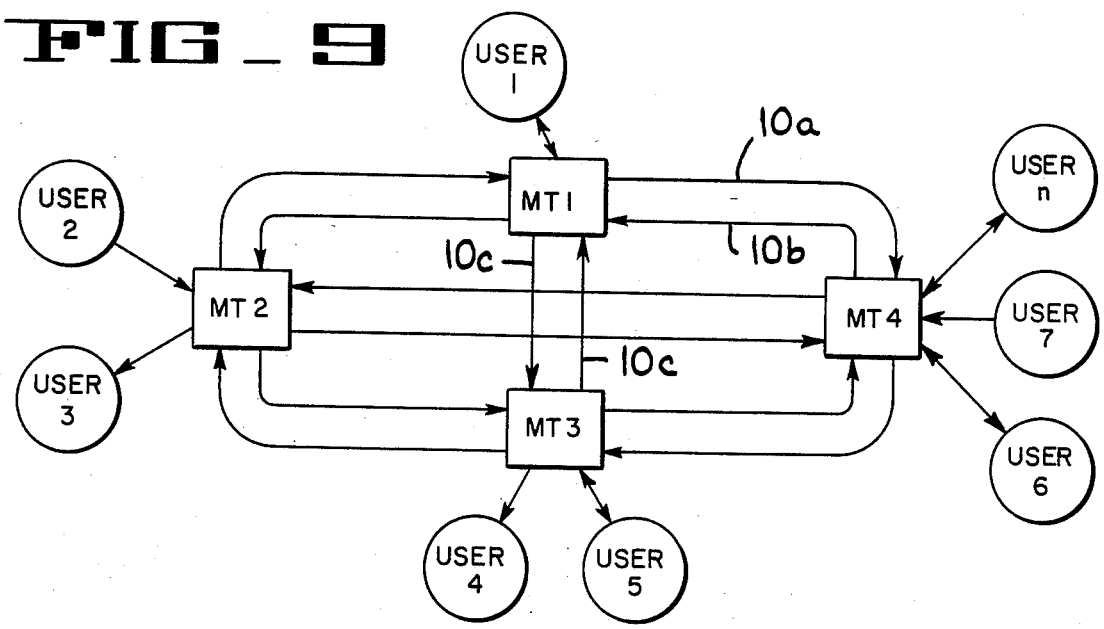
FIG_9
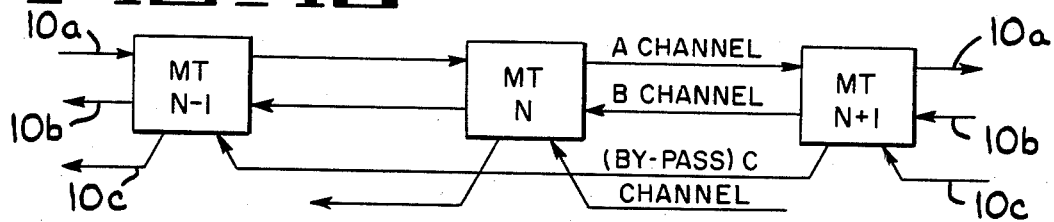
FIG_10
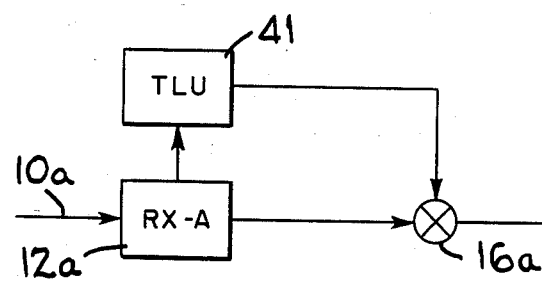
FIG_11
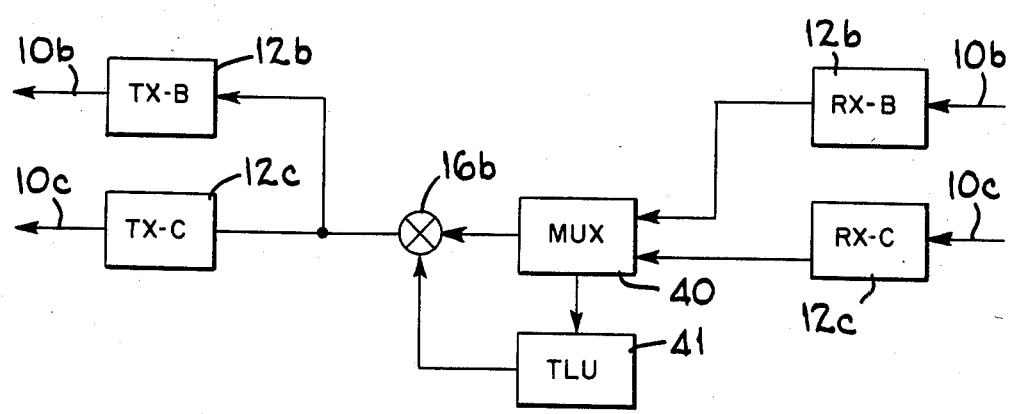

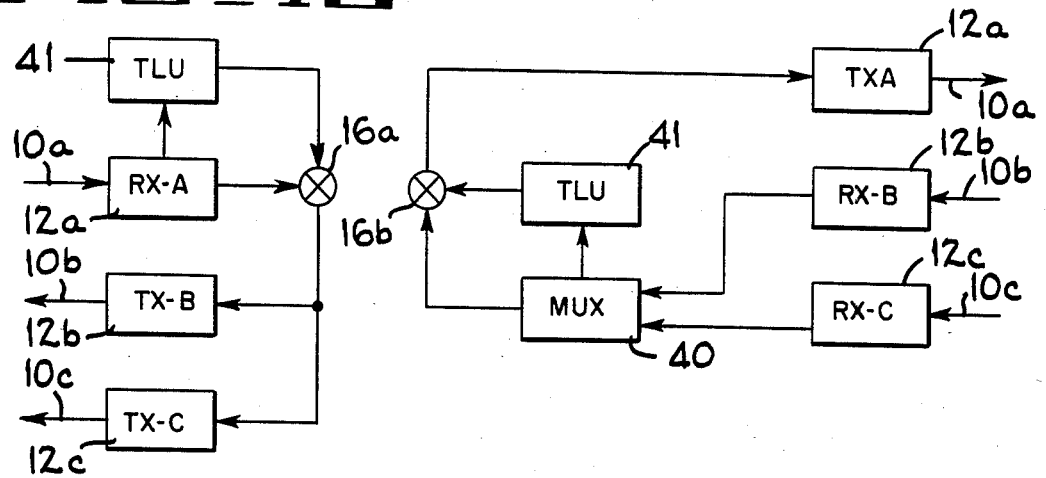
FIG_12
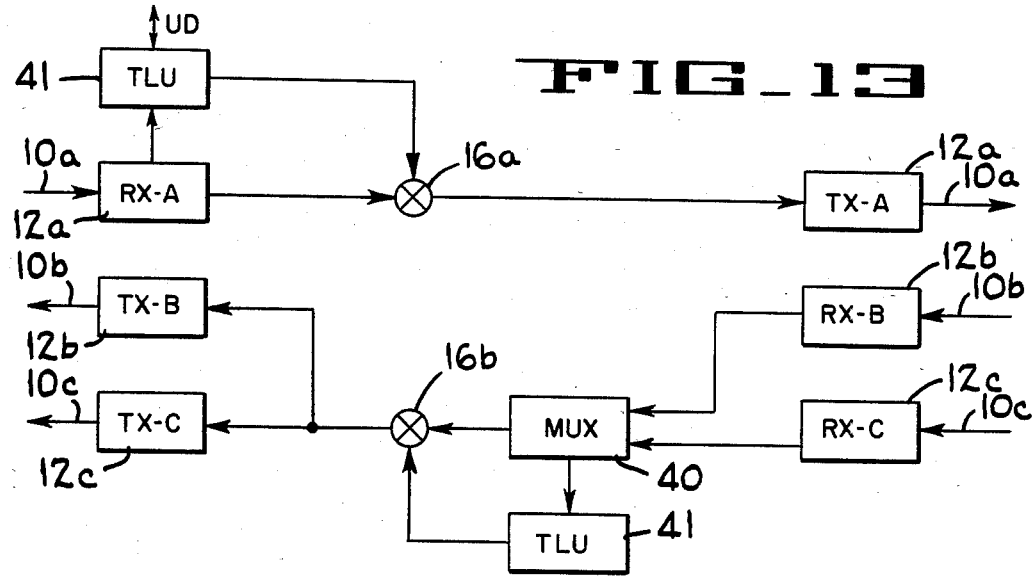
FIG_13
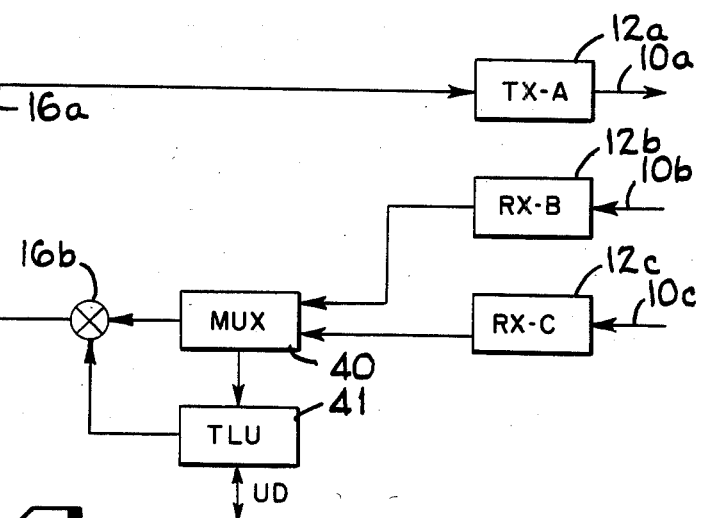
FIG_14

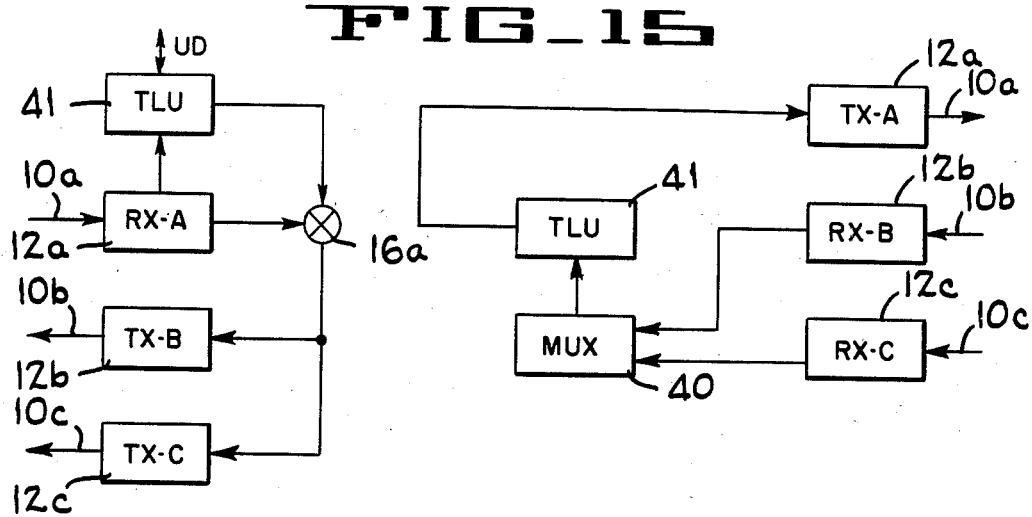
FIG_15
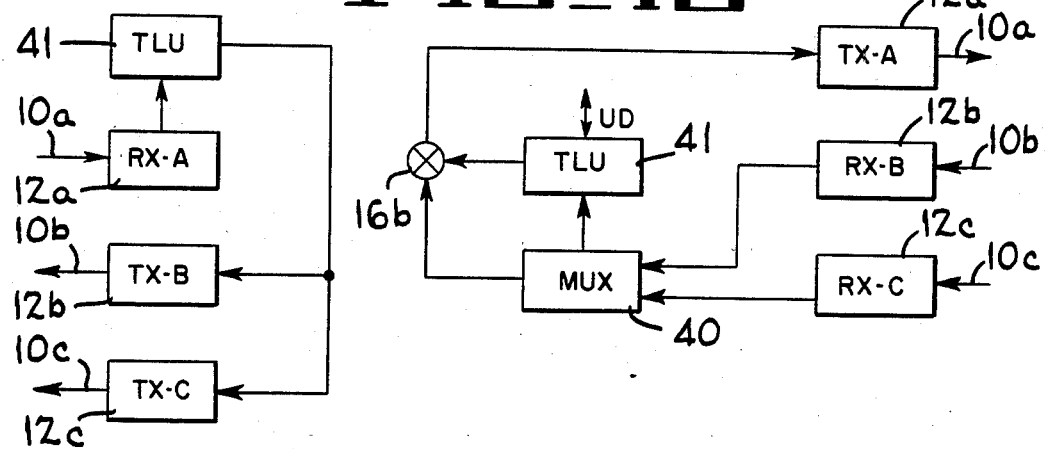
FIG_16
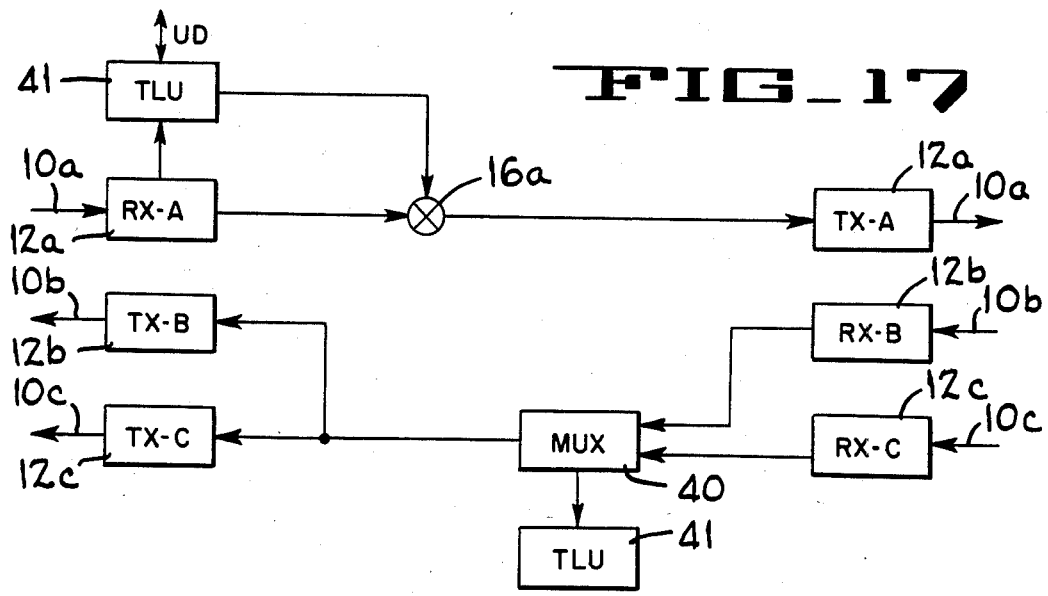
FIG_17

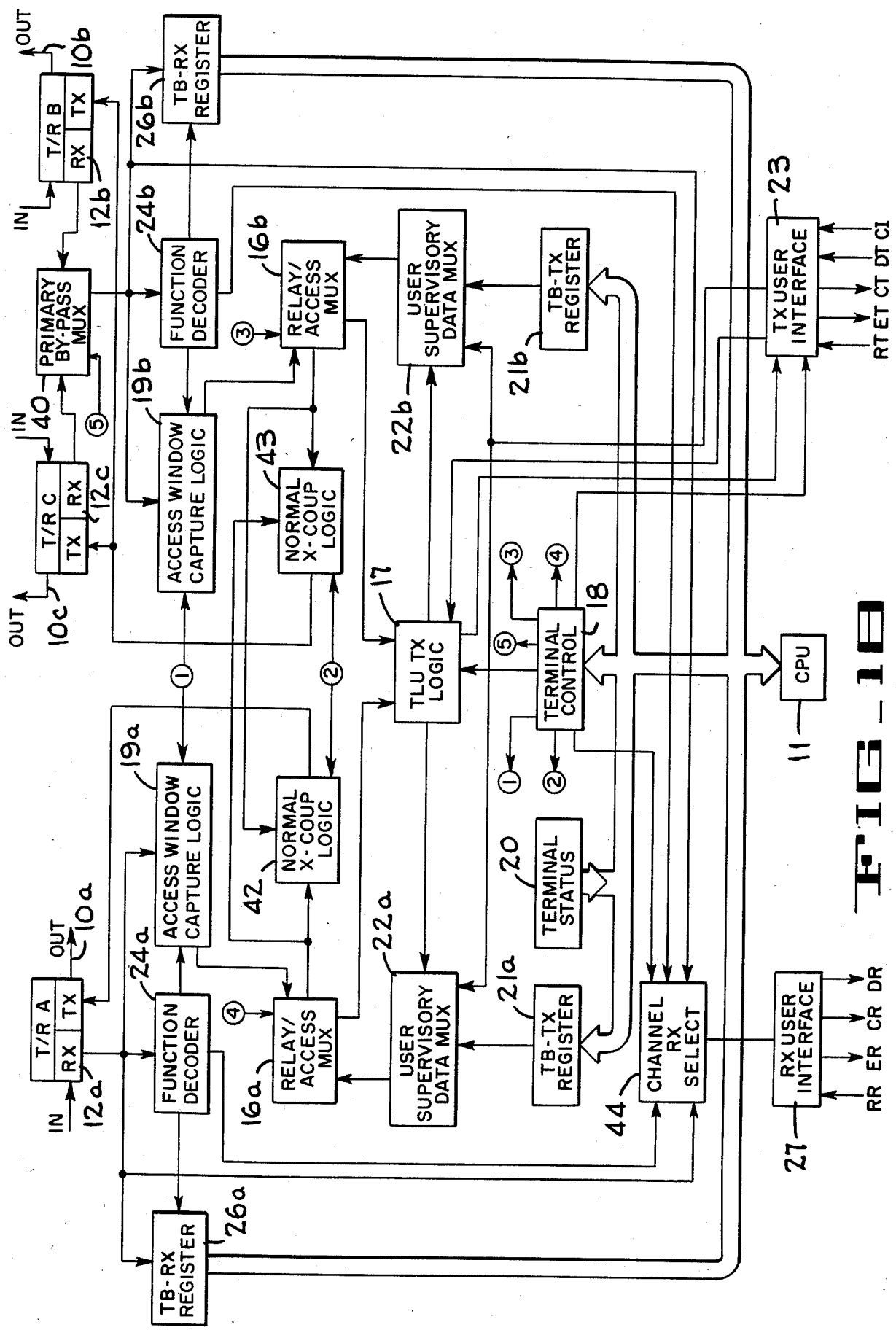
FIG_18

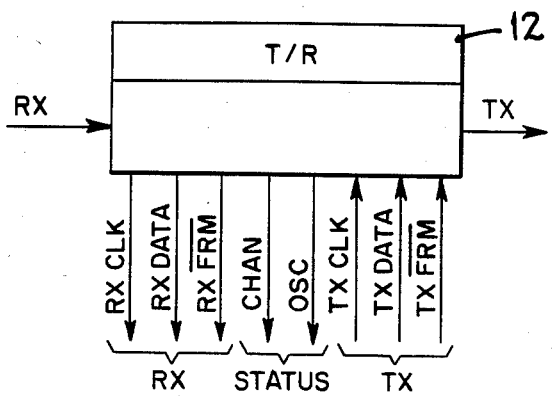
FIG_19
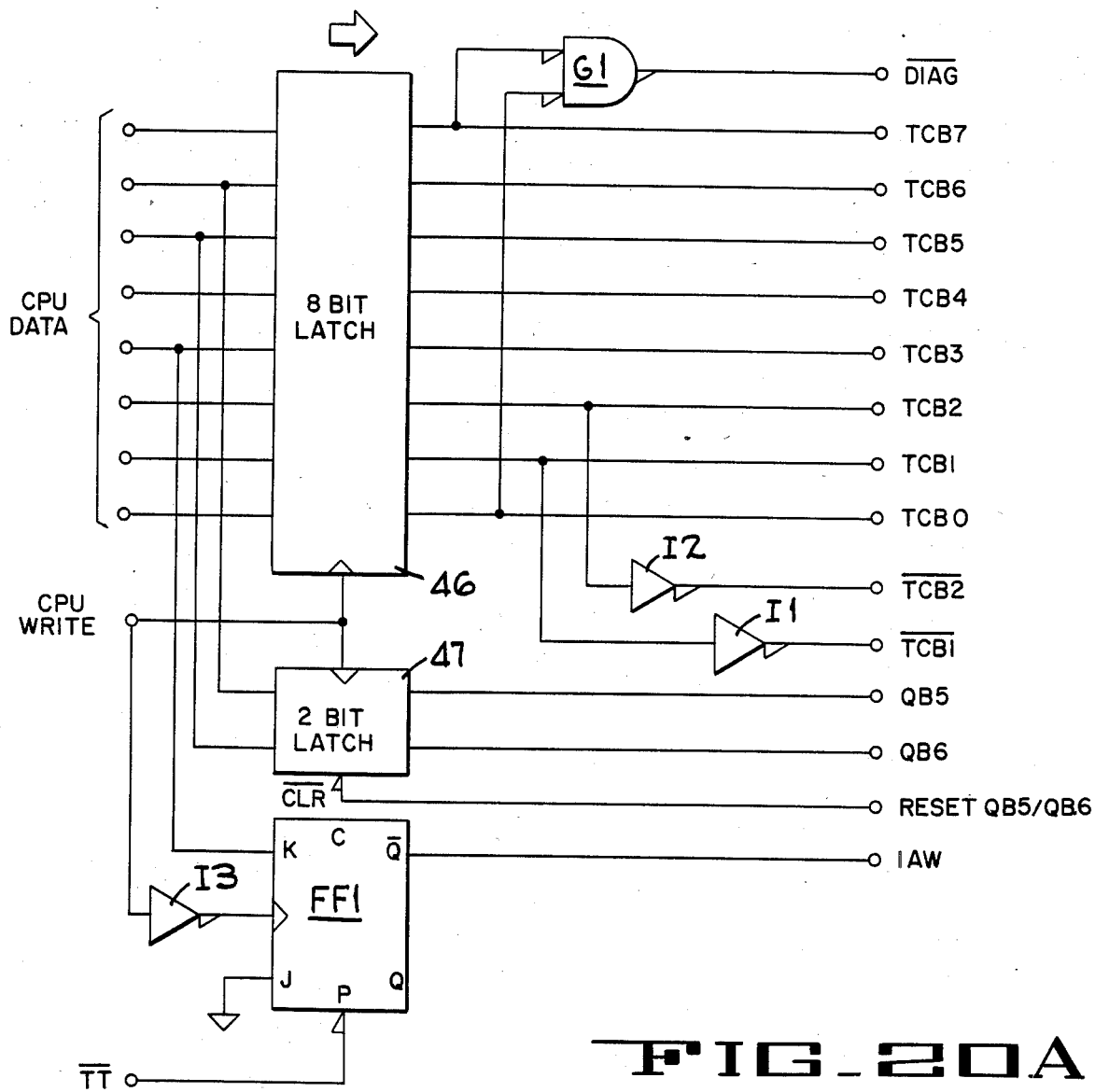
FIG_20A

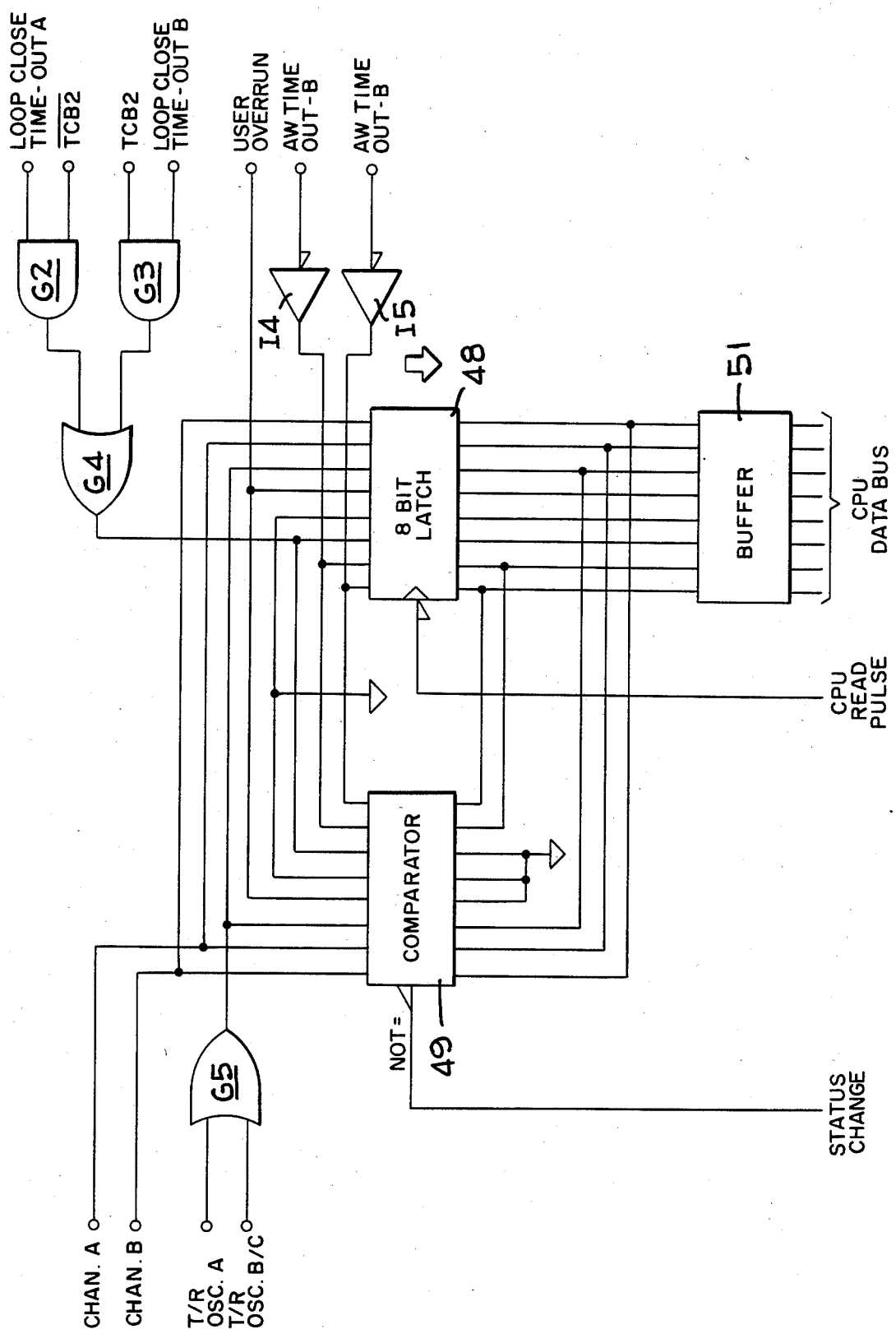
FIG_20B

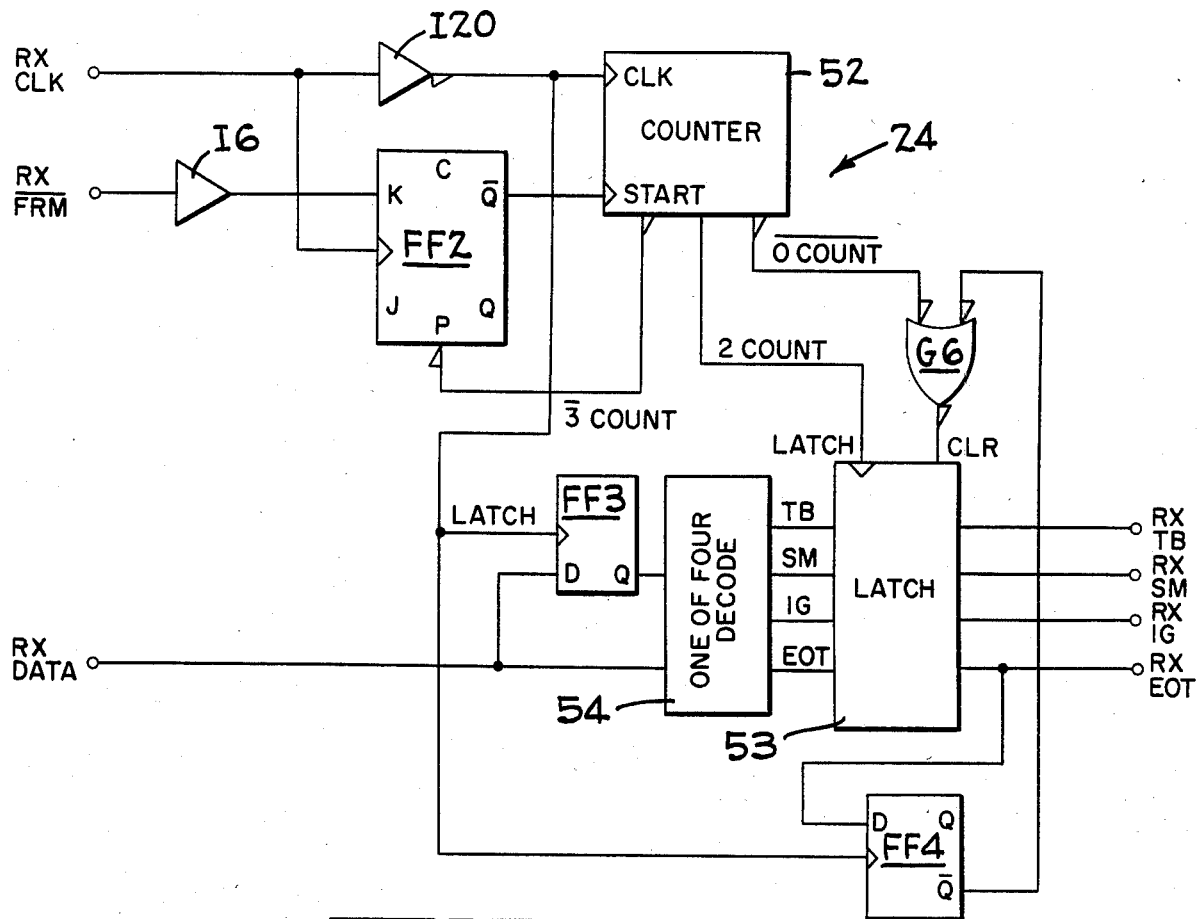
FIG_21
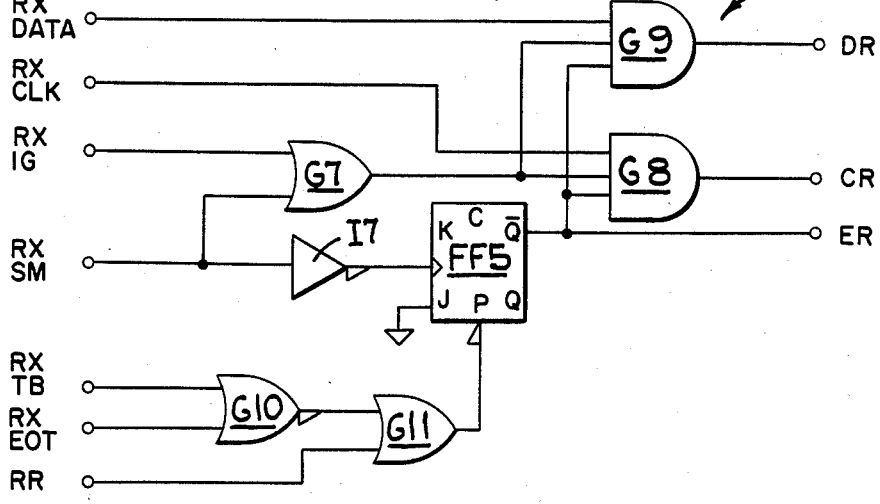
FIG_22

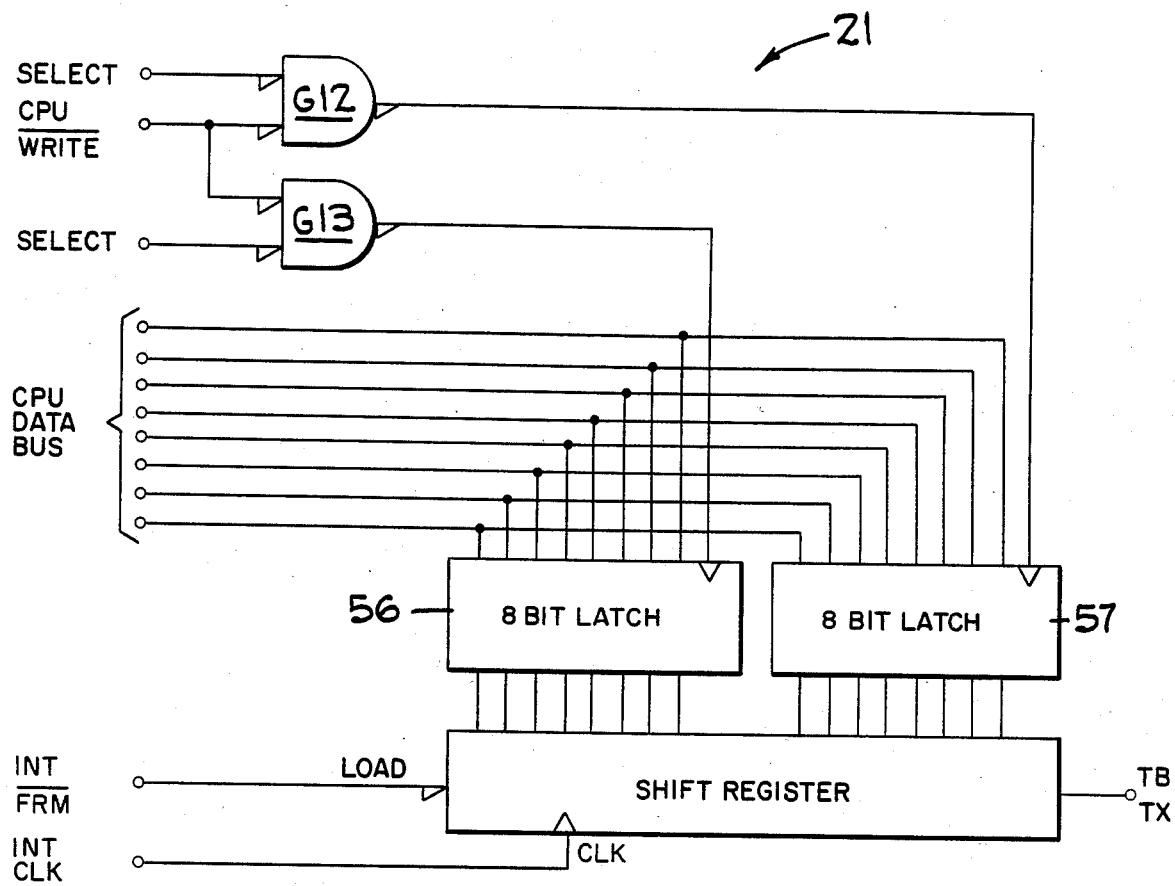
FIG_23
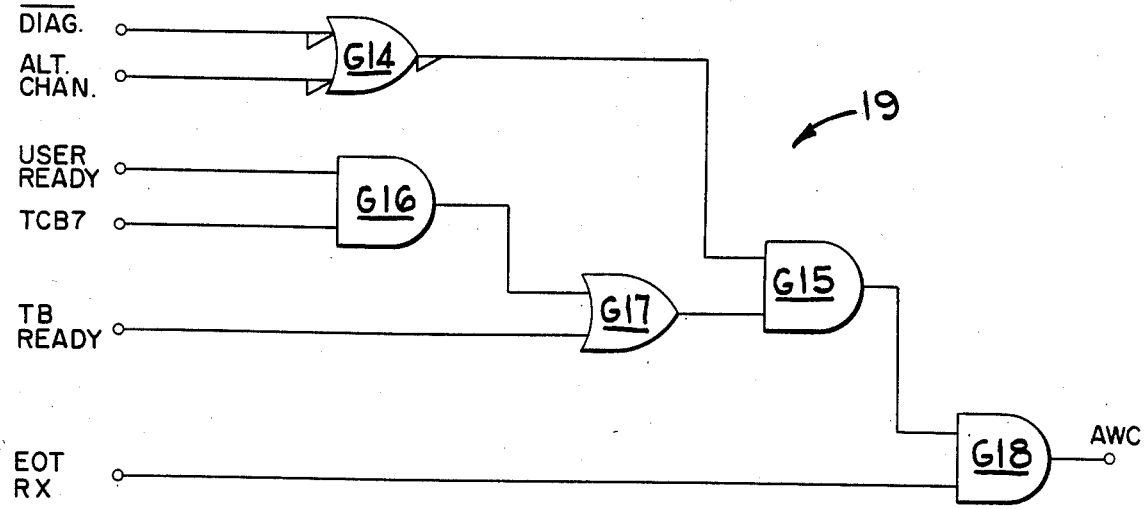
FIG_24

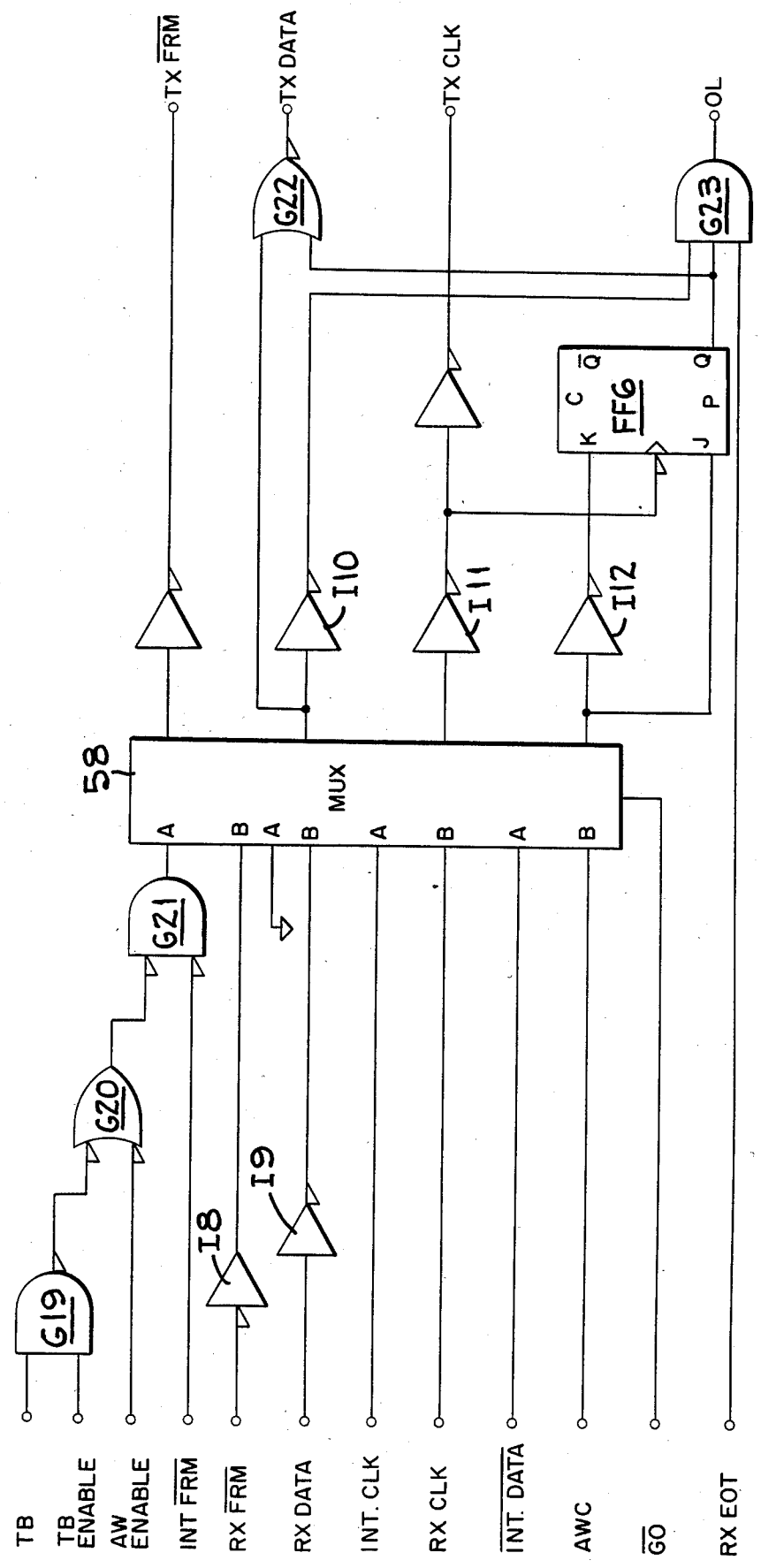
FIG_25A

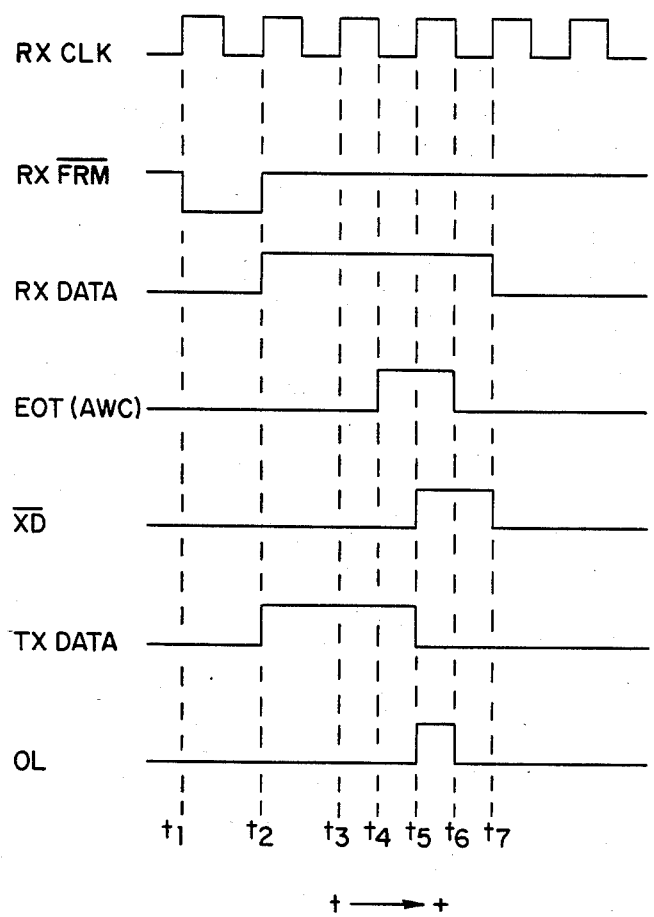
FIG_25B
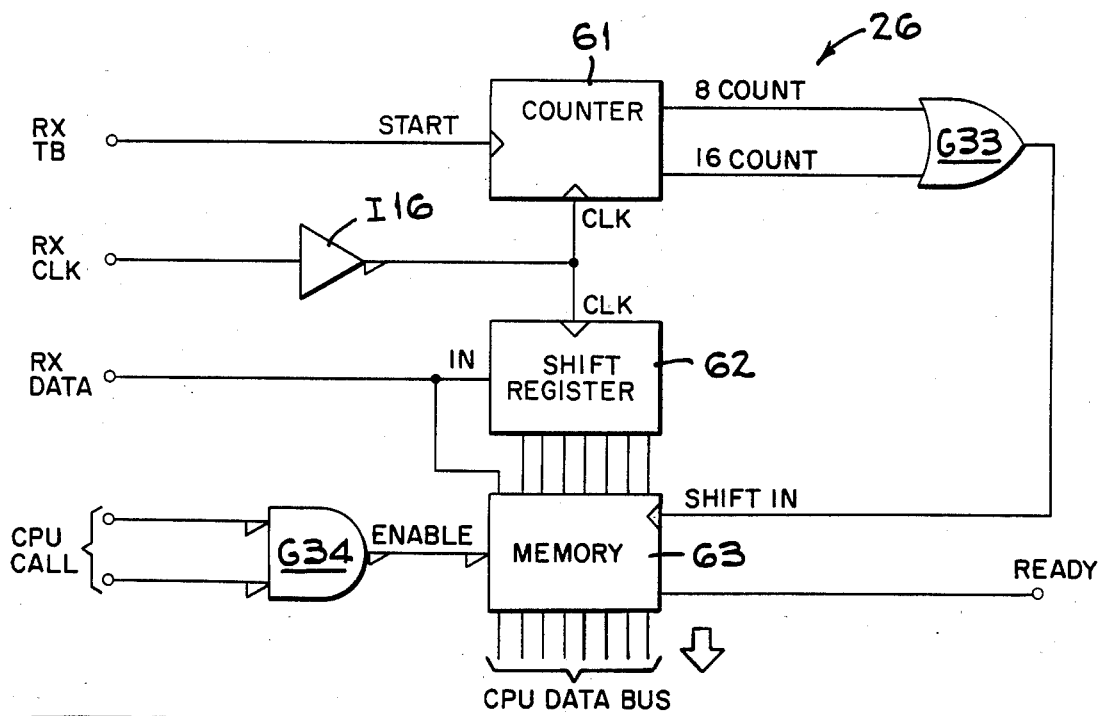
FIG_27

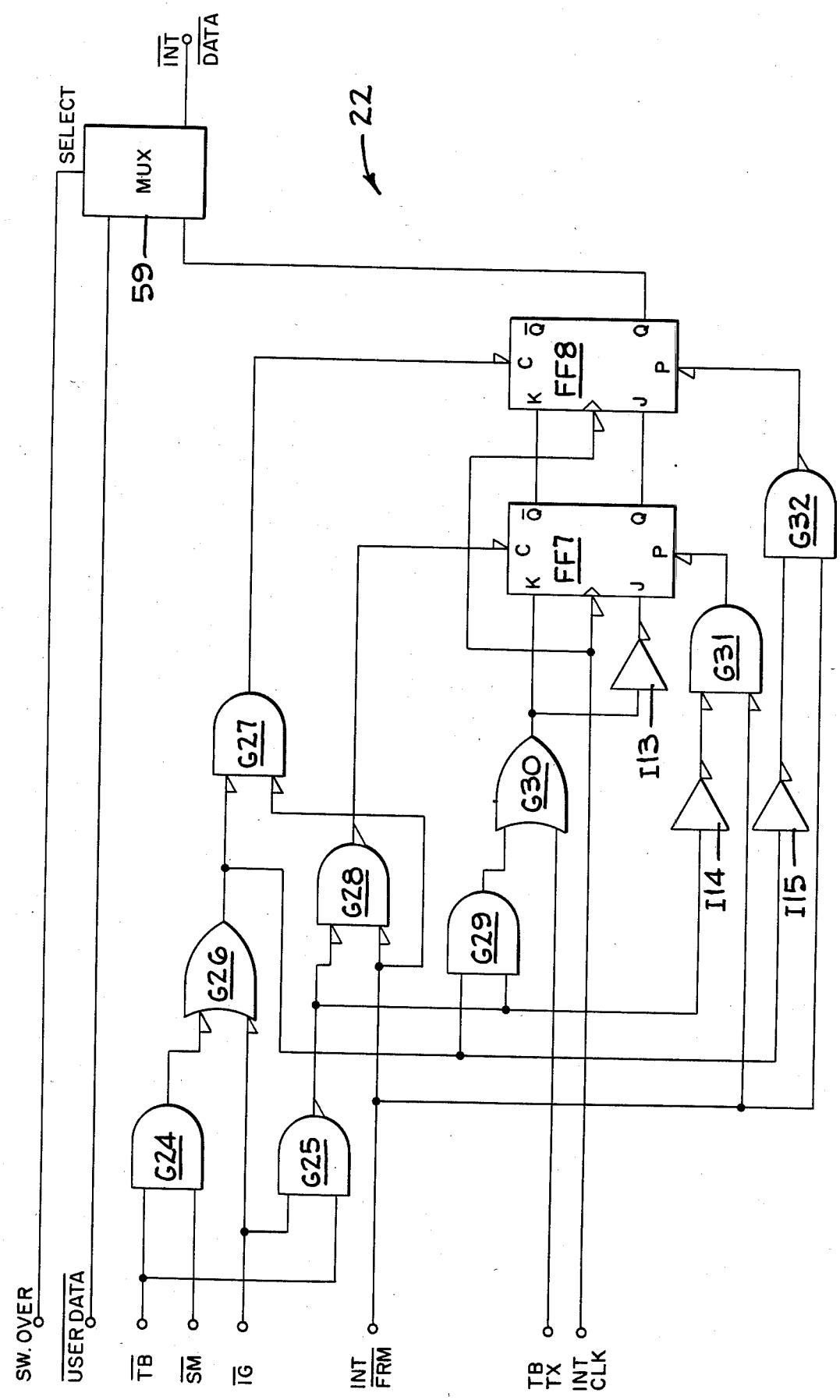
FIG_26

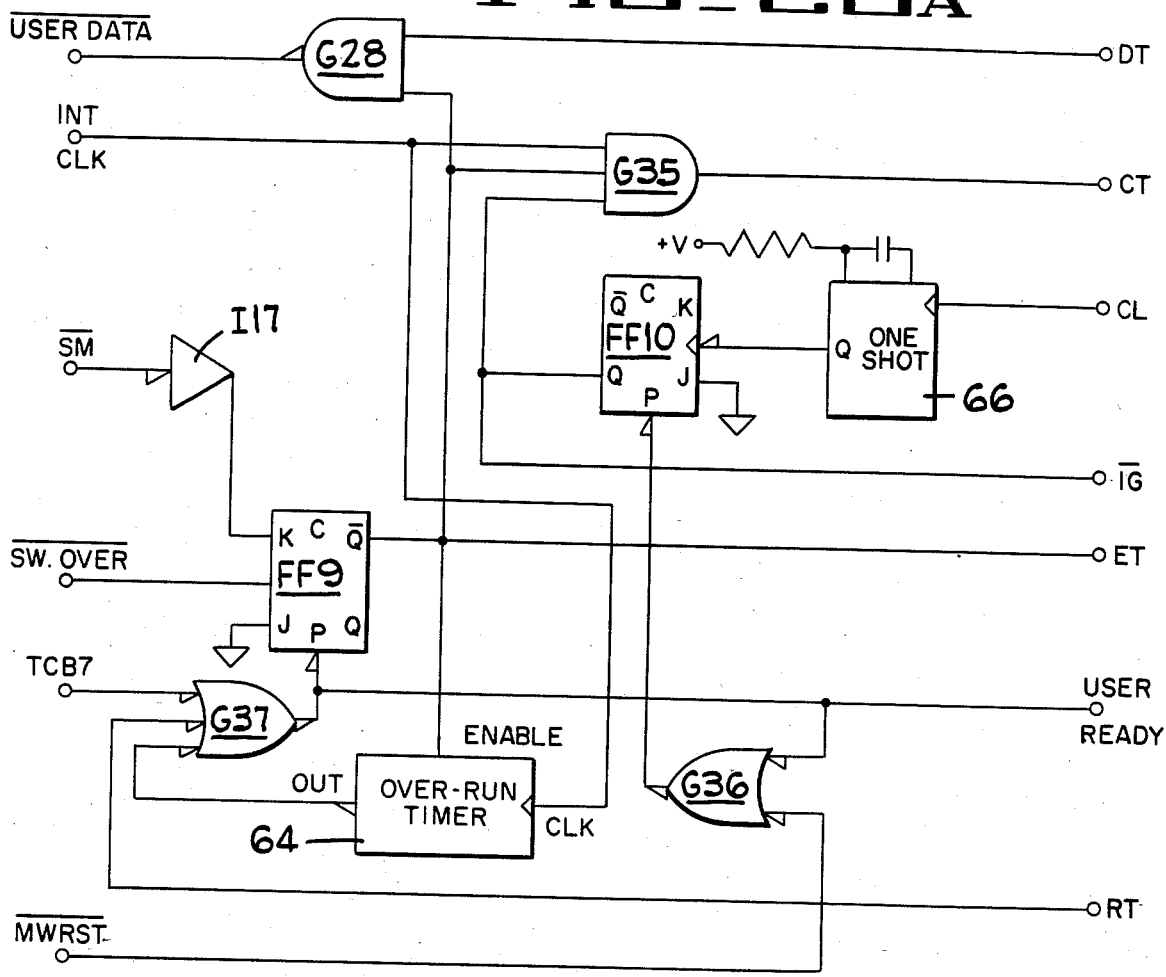
FIG_28A
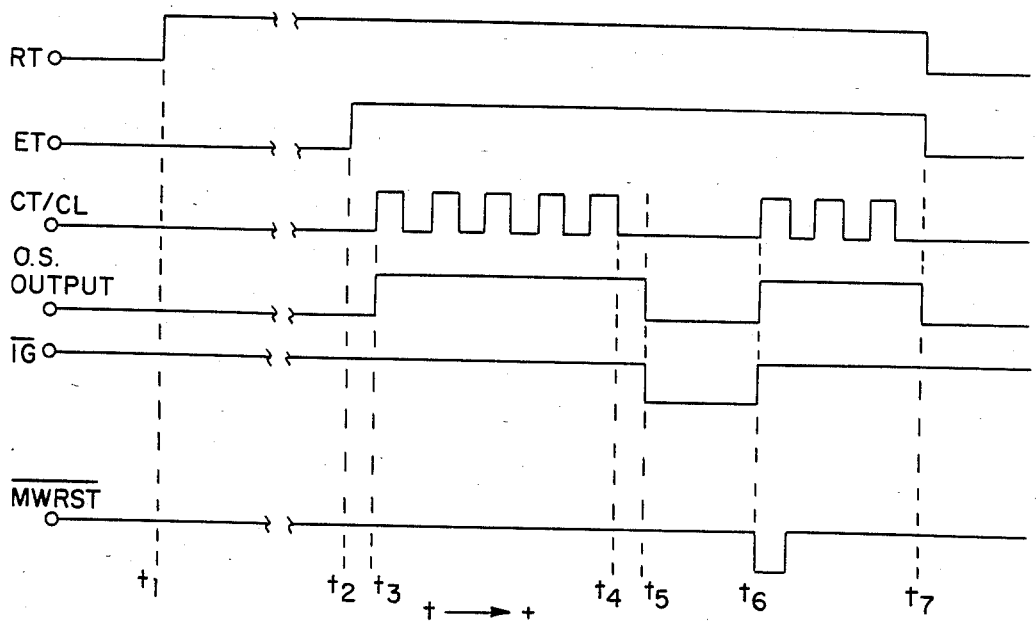
FIG_28B

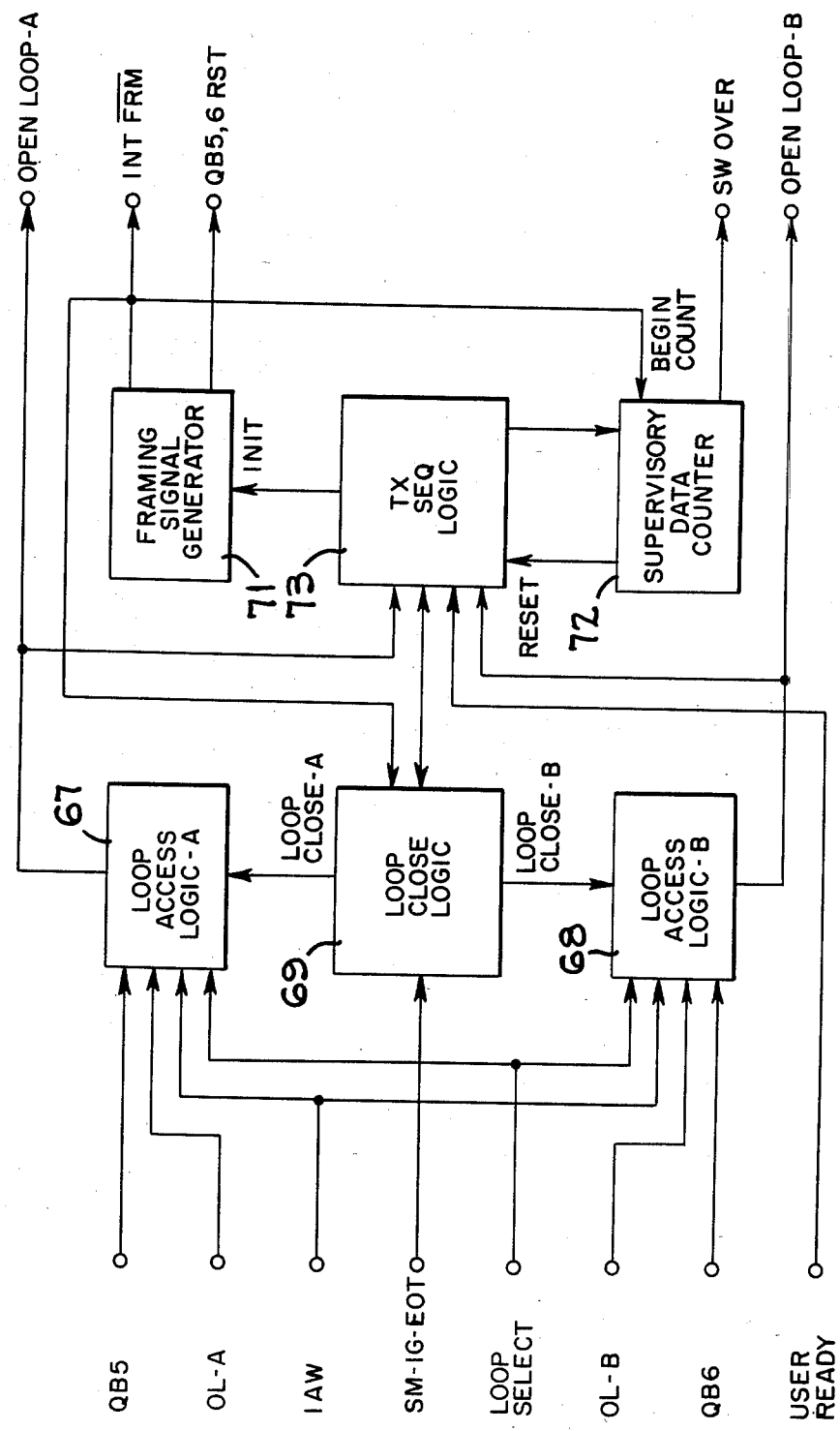

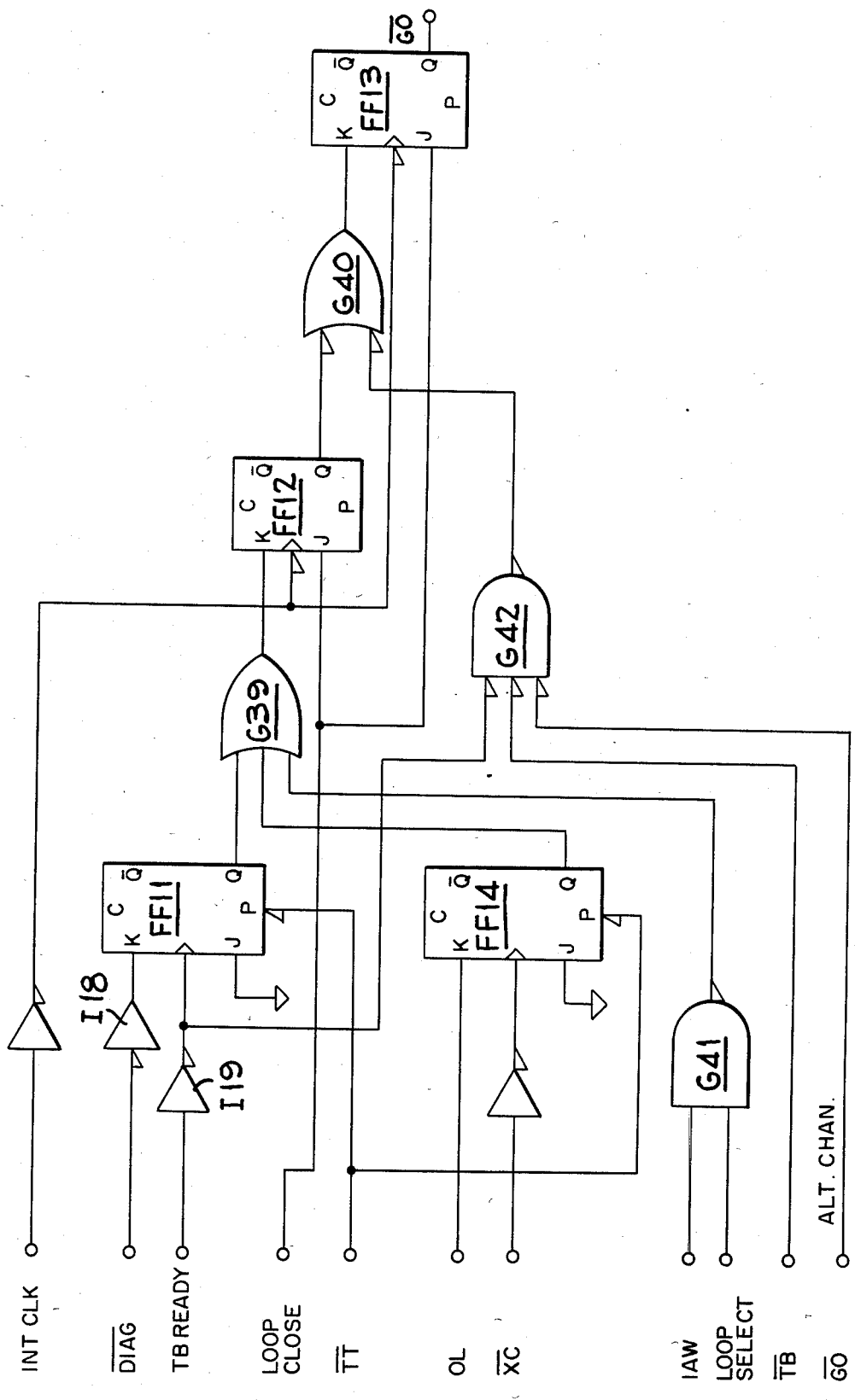
FIG_30

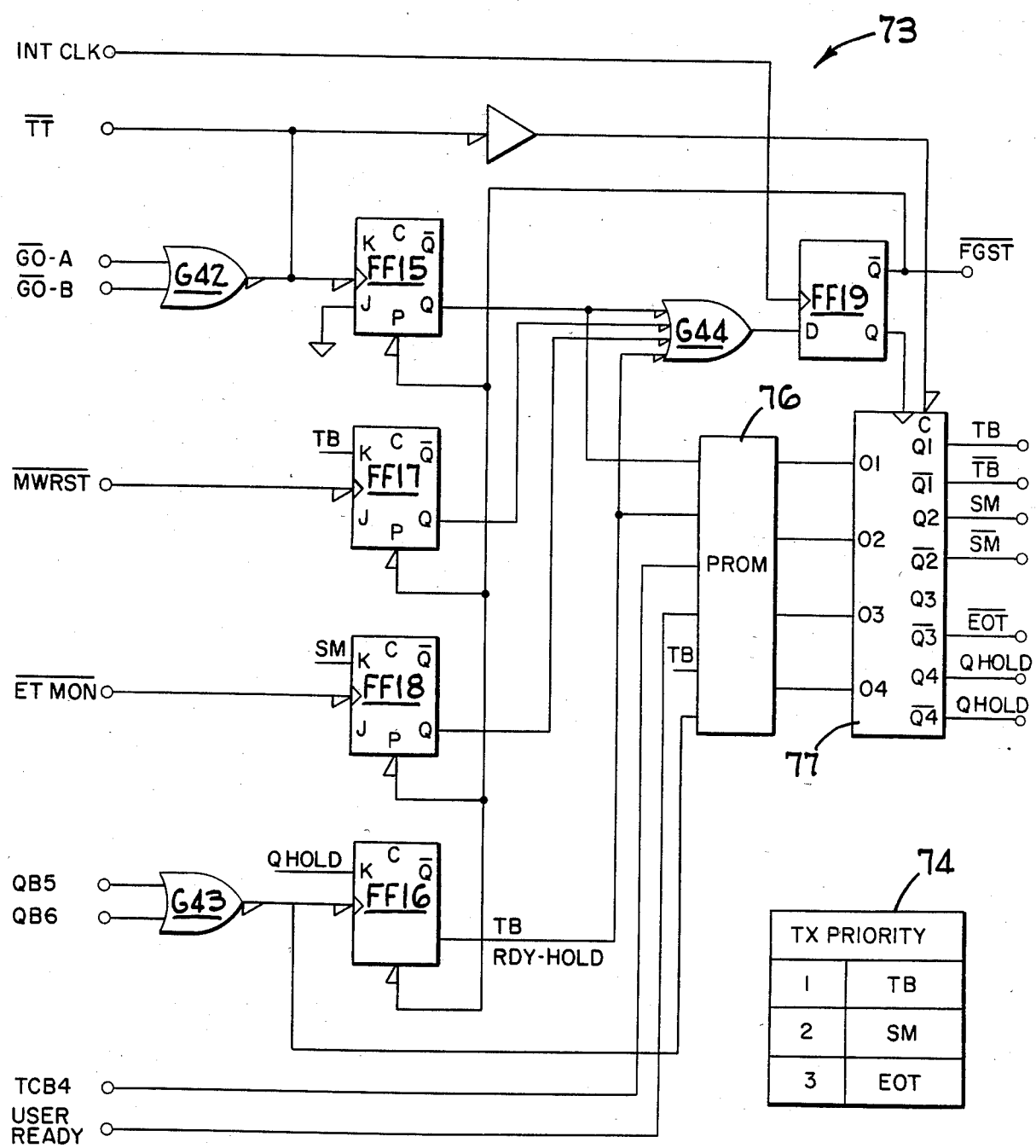
FIG_31

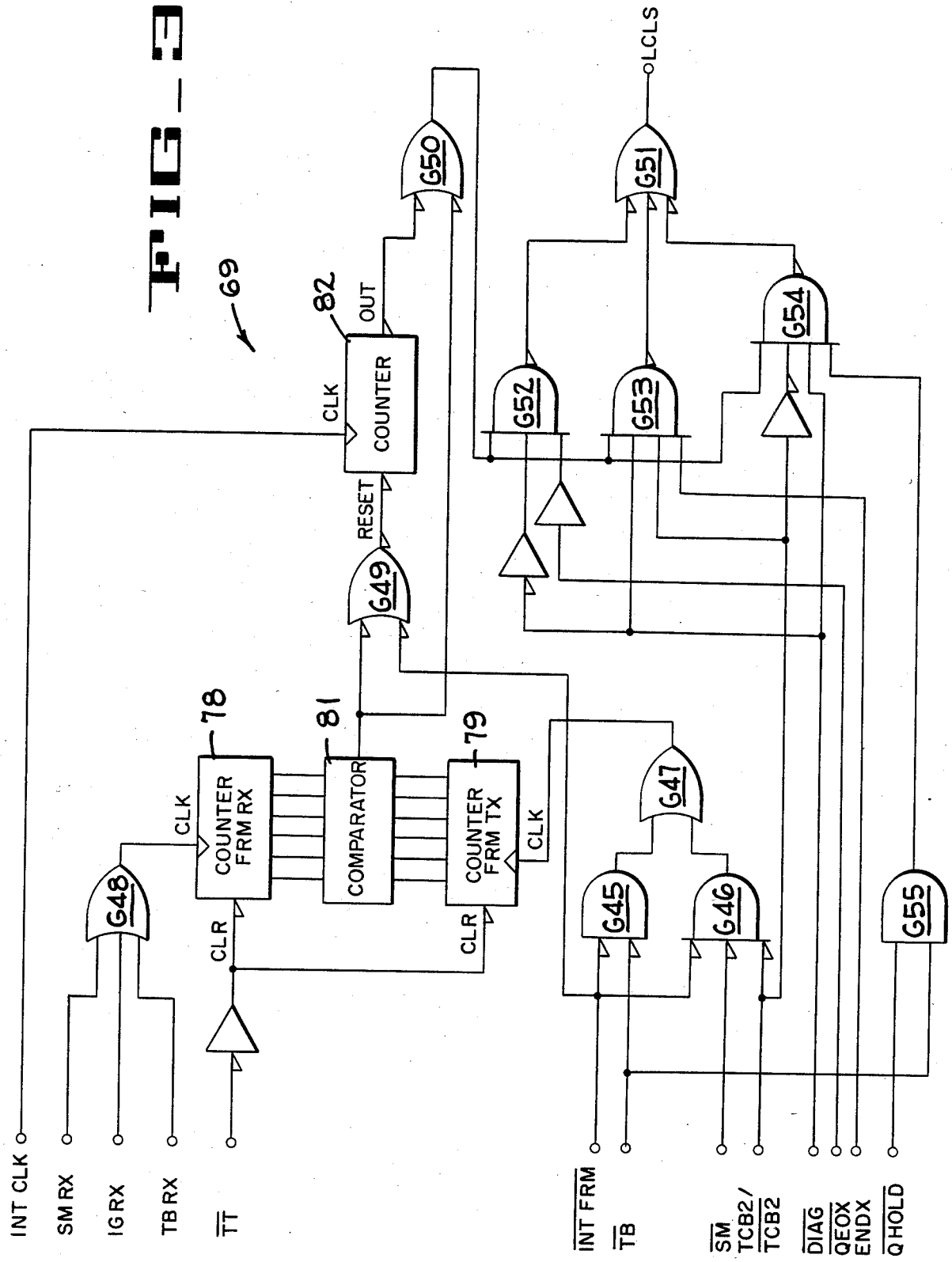
FIG_32

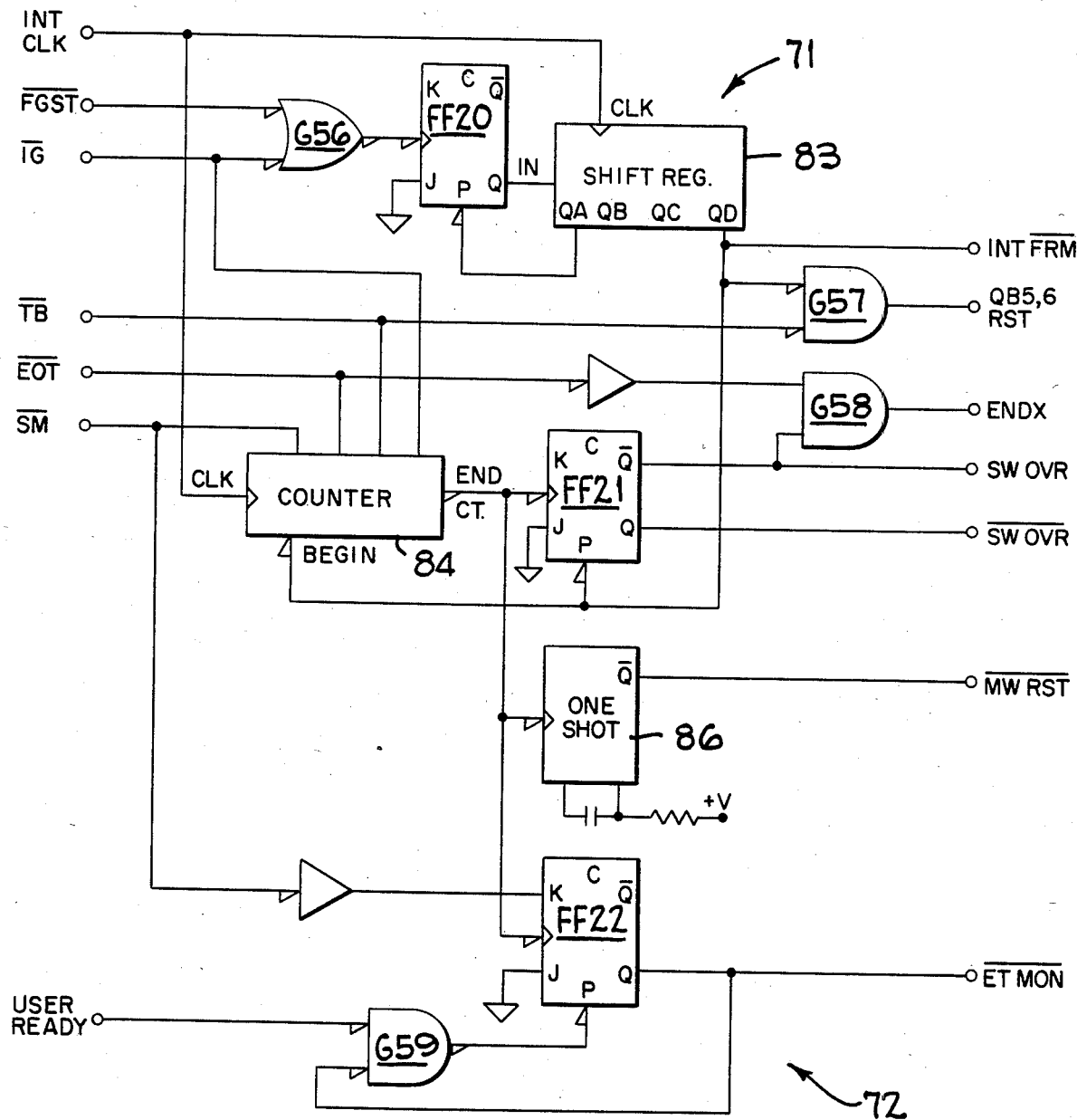
FIG_33

TABLE I

| CONFIG. | FIG. | NAME | CROSS-COUPLING | PRIMARY/BP MUX-40 | USER RX | |
|---|---|---|---|---|---|---|
| 1 | 11 | LINEAR | 0 | RX-B | — | DIAGNOSTIC MODE |
| 1 BP | 11 | LINEAR BYPASS | 0 | RX-C | — | |
| 2 | 12 | CROSS COUPLED | 1 | RX-B | — | |
| 2 BP | 12 | CROSS COUPLED BYPASS | 1 | RX-C | — | |
| 3 | 13 | A-LOOP | 0 | RX-B | A | USER ACCESS MODE |
| 4 | 14 | B-LOOP | 0 | RX-B | B | |
| 5 | 15 | A-END | 1 | RX-B | A | |
| 5 BP | 15 | A-END BYPASS | 1 | RX-C | A | |
| 6 | 16 | B-END | 1 | RX-B | B | |
| 6 BP | 16 | B-END BYPASS | 1 | RX-C | C | |
| 7 | 17 | H-INTERIOR | 0 | RX-B | A | |
| 7 BP | 17 | H-INTERIOR BYPASS | 0 | RX-C | A | |

FIG-34

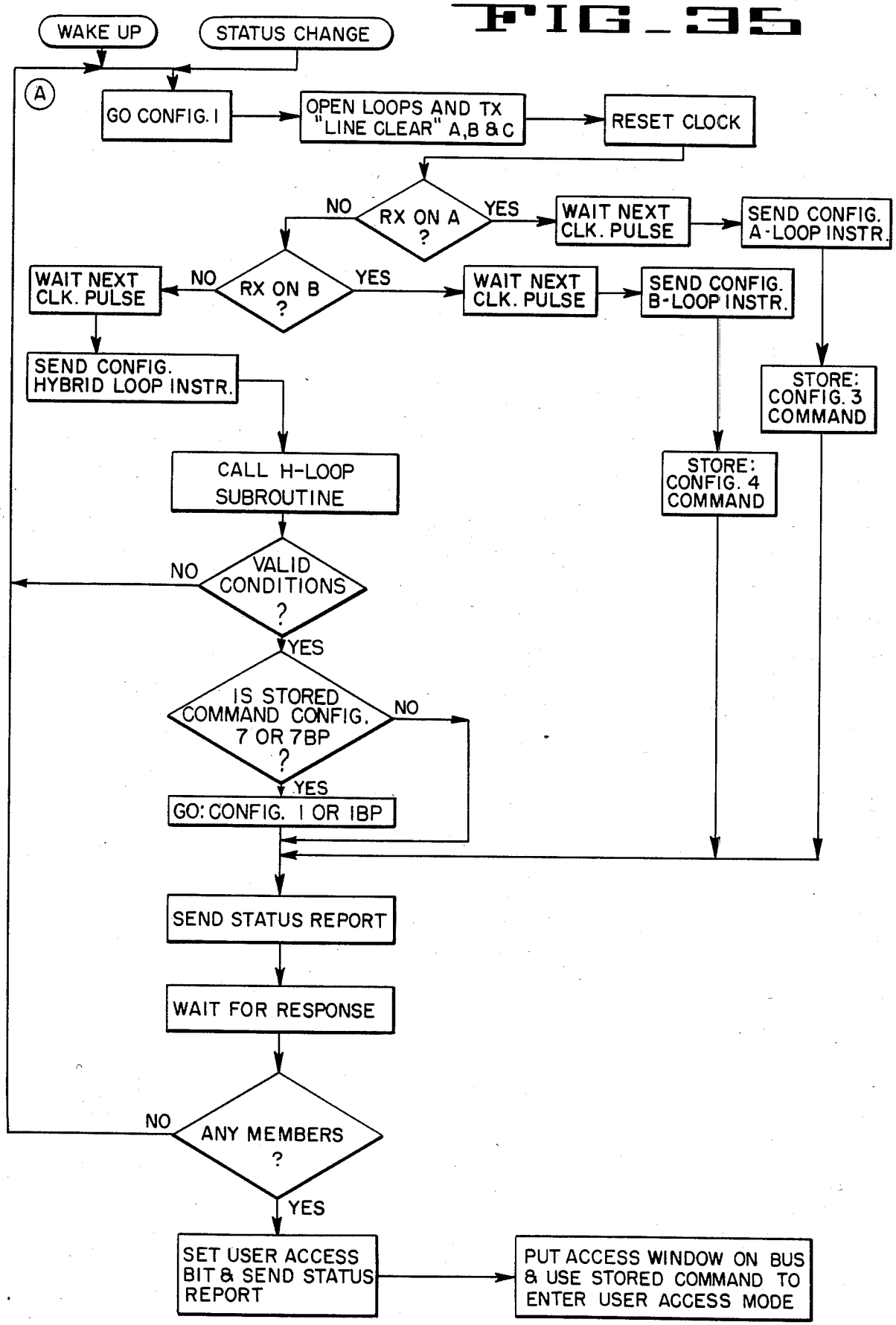
FIG_35

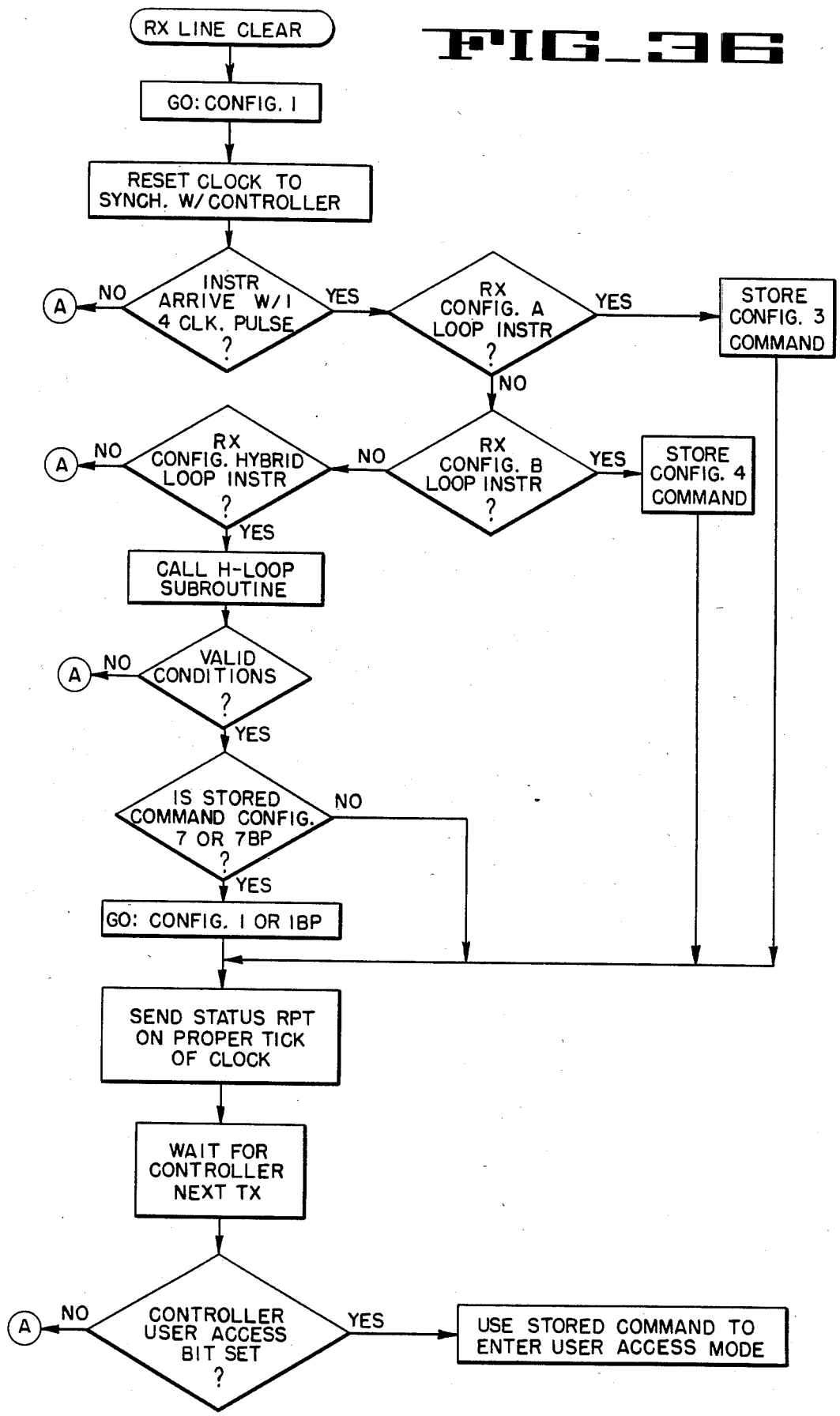

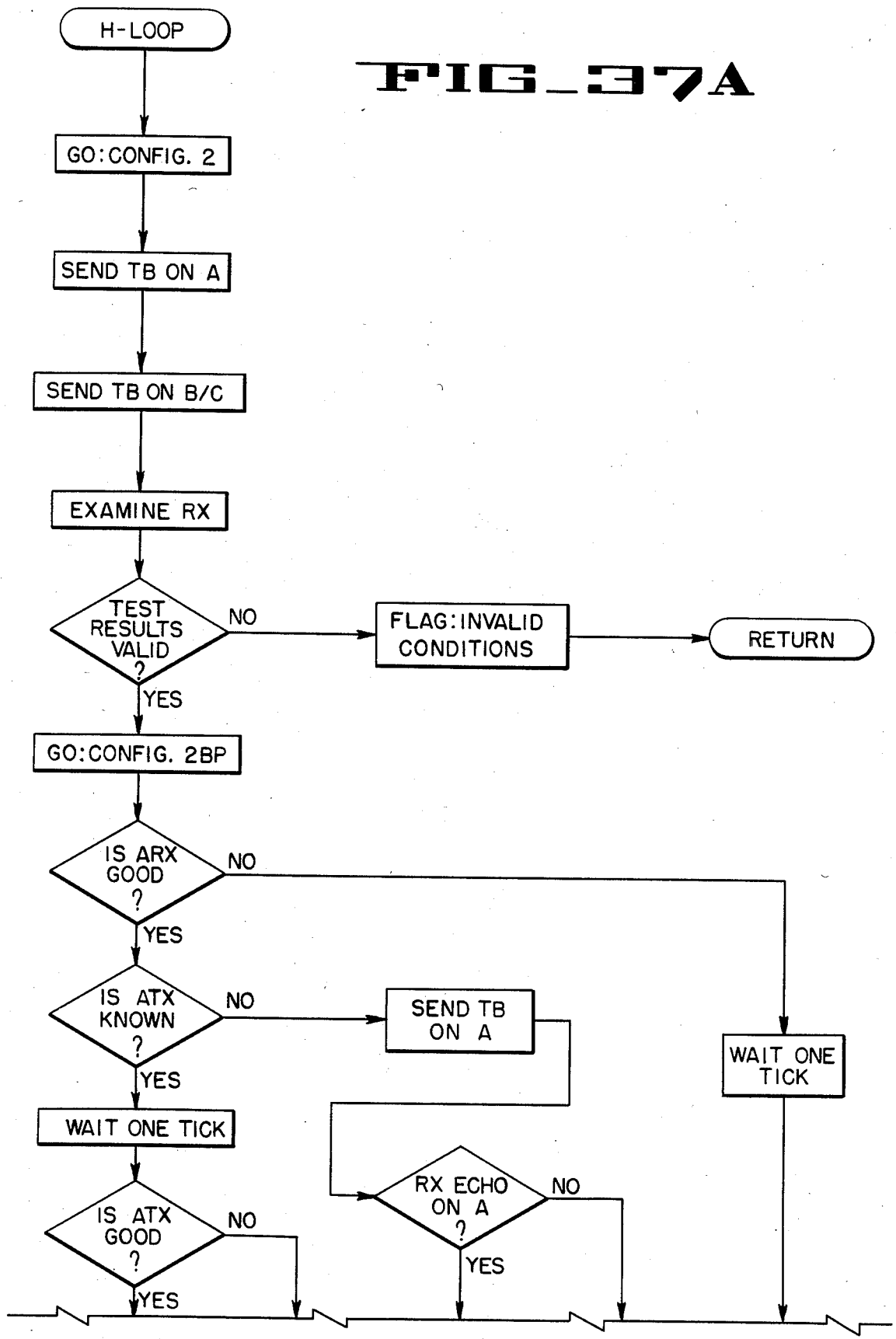
FIG_37A

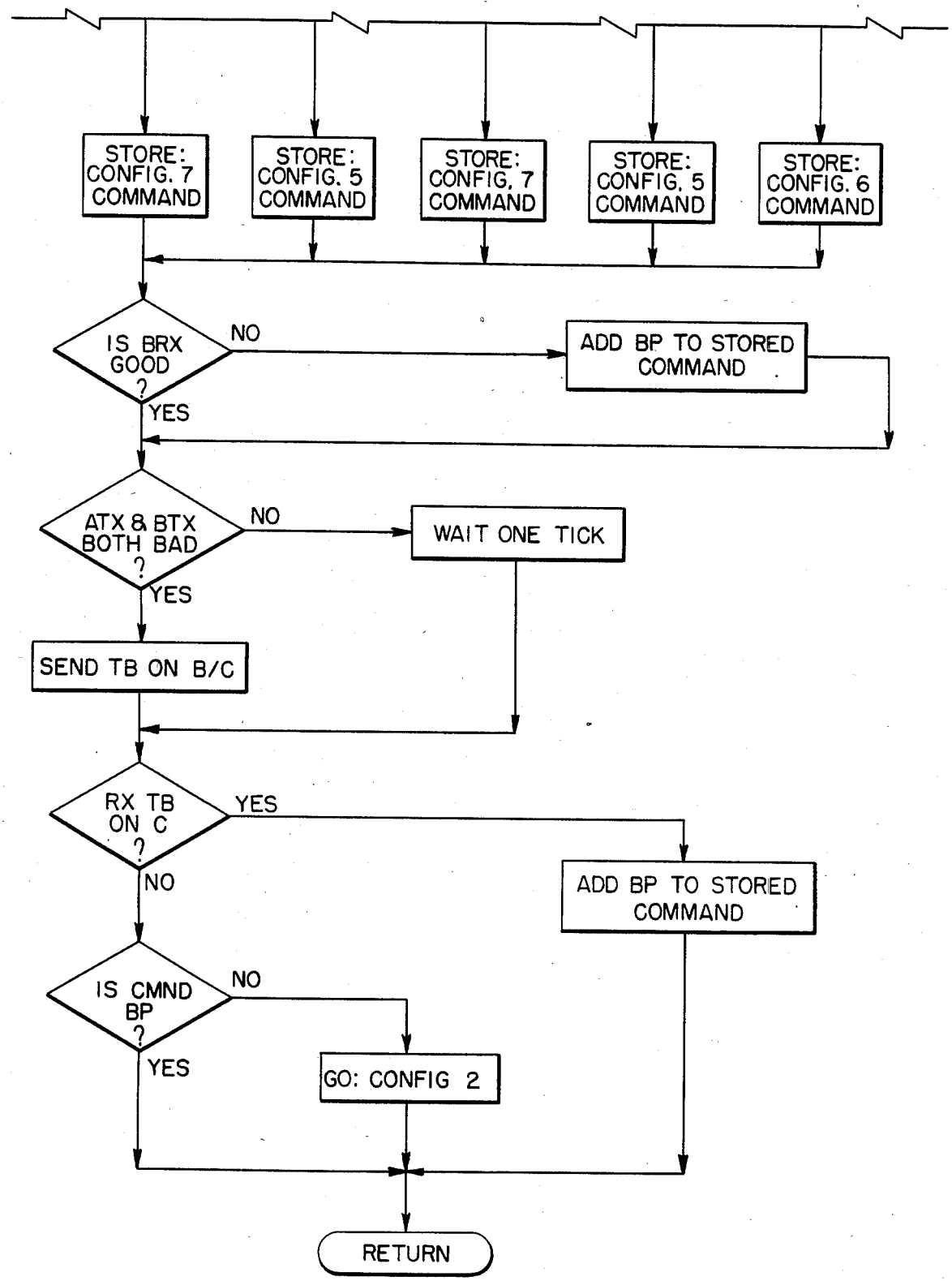
FIG_37B

FIG_38
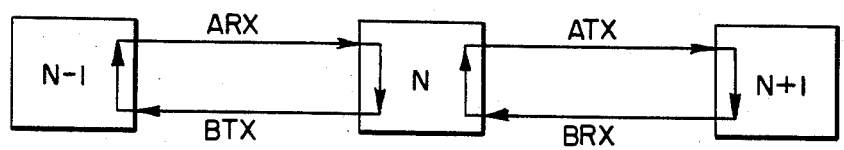
FIG_40
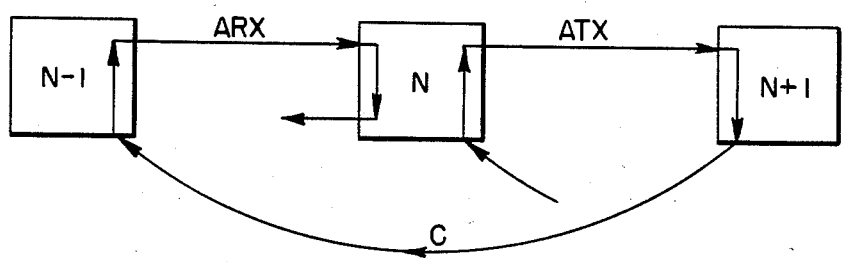

FIG. 39

| 1 | 2 | 3 | 4 | 5 | 6 | 7 | 8 |
|---|---|---|---|---|---|---|---|
| TEST RESULTS 1=RECEIVED  0=NOT RECEIVED | | | | CONCLUSIONS 1=GOOD  0=BAD  ?=UNKNOWN | | | |
| $E_A$ | $E_B$ | $TB_A$ | $TB_B$ | $A_{TX}$ | $A_{RX}$ | $B_{TX}$ | $B_{RX}$ |
| 0 | 0 | 0 | 0 | ? | 0 | ? | 0 |
| 0 | 0 | 0 | 1 | 0 | 0 | ? | 1 |
| 0 | 0 | 1 | 0 | ? | — | 0 | 0 |
| 0 | 0 | 1 | 1 | 0 | — | 0 | 1 |
| 0 | 1 | 0 | 0 | — | 1 | NOT VALID | 1 |
| 0 | 1 | 0 | 1 | — | 0 | ? | 1 |
| 0 | 1 | 1 | 0 | — | — | NOT VALID | 1 |
| 0 | 1 | 1 | 1 | — | — | 0 | 1 |
| 1 | 0 | 0 | 0 | — | — | NOT VALID | 1 |
| 1 | 0 | 0 | 1 | ? | — | NOT VALID | 0 |
| 1 | 0 | 1 | 0 | 0 | — | — | 1 |
| 1 | 0 | 1 | 1 | — | — | — | 1 |
| 1 | 1 | 0 | 0 | — | — | NOT VALID | 1 |
| 1 | 1 | 0 | 1 | — | — | NOT VALID | 1 |
| 1 | 1 | 1 | 0 | — | — | NOT VALID | 1 |
| 1 | 1 | 1 | 1 | — | — | — | 1 |

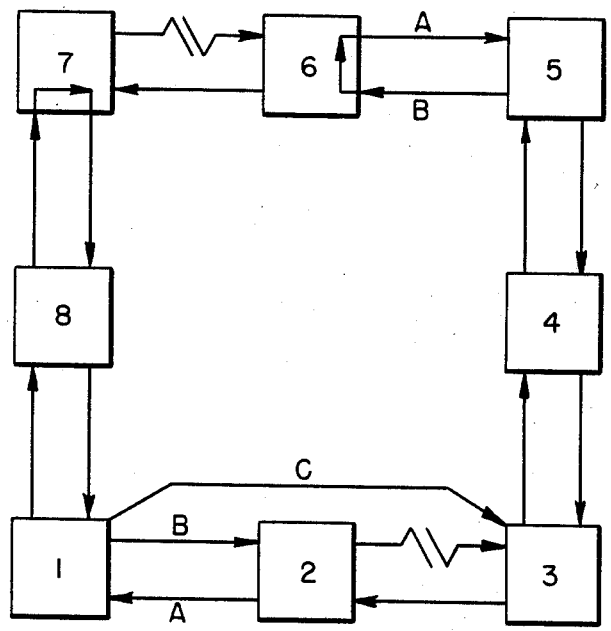
FIG_41
FIG_42
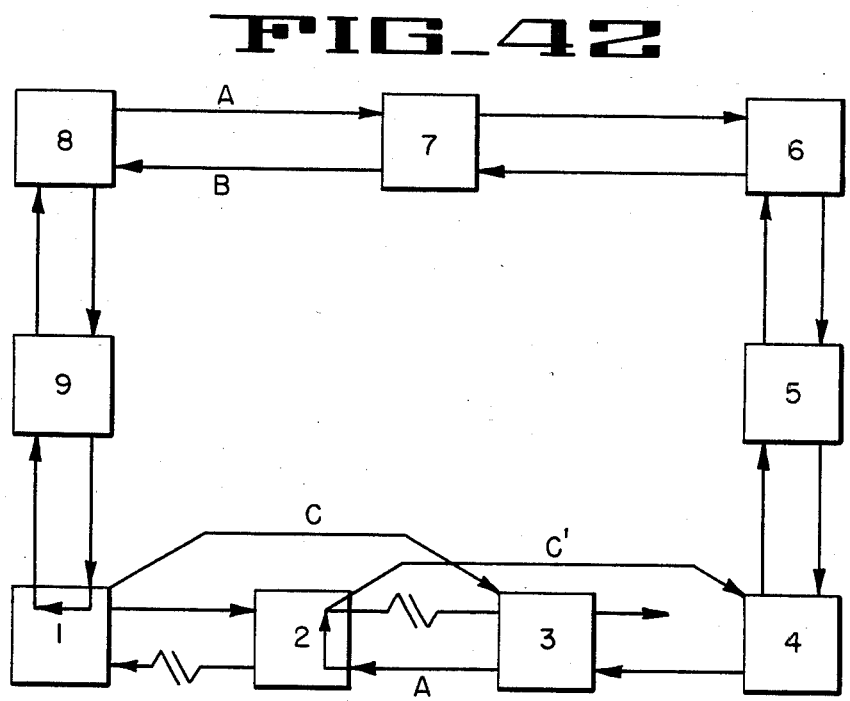

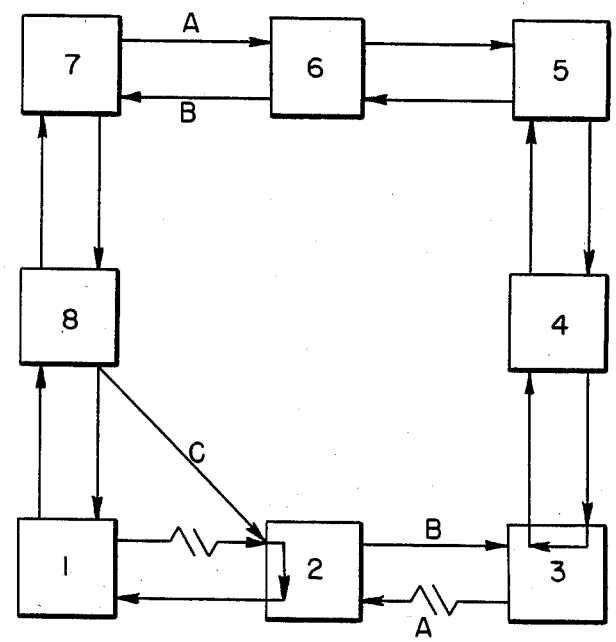
FIG_43
FIG_44
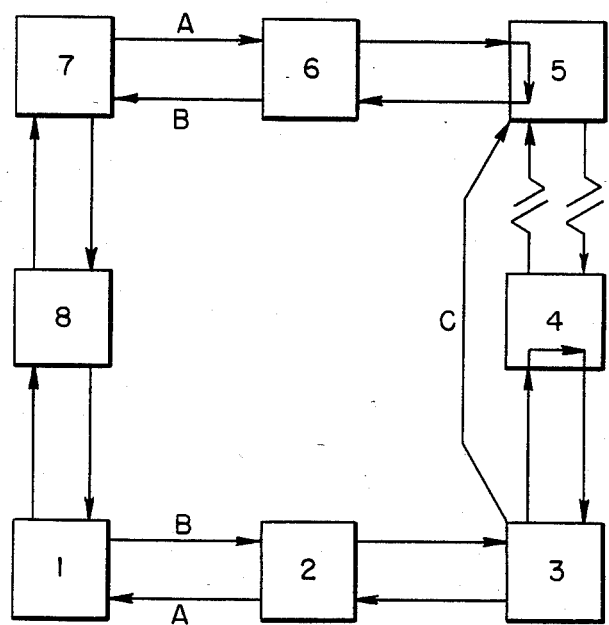

COMMUNICATION SYSTEM BYPASS ARCHITECTURE

BACKGROUND OF THE INVENTION

1. Field of the Invention

The present invention pertains to data bus systems for transmitting digital information between a plurality of interconnected and serially arranged terminals, and more particularly it pertains to data buses of the active type wherein each terminal receives data from a data source or from another terminal and transmits or retransmits the data to a different terminal in the system and wherein the survivability of the data bus is enhanced.

2. Description of the Prior Art

Recent developments in data transmission systems involve placing all data onto a single transmission line, or set of transmission lines, and then receiving the data along the line as needed, thereby distributing digital data throughout complex communication systems and over large distances, for example on board a ship. Nonetheless, such recently developed systems are subject to degradation when a multiplicity of faults occurs in the single or set of transmission lines.

There are two basic types of data buses in use in large scale distribution systems at the present time, namely passive buses and active buses. The more typical passive bus systems employ transmitters, or drivers, and receivers that couple passively to a transmission line. An active bus, on the other hand, employs active terminals. Each terminal receives data from another terminal in the system and then retransmits the data or transmits new data to a third terminal in the system. Each unidirectional link between terminals in an active bus system therefore comprises a complete transmission element, whereas in the passive data bus systems, the entire length of transmission line comprises a single bidirectional transmission element. As a consequence of this fundamental difference, a passive data bus system is more vulnerable to reflections than is an active data bus system. Indeed, a passive bus will become totally disabled by a single break in the transmission line which causes reflections to propagate throughout the entire system.

Active data bus systems are most commonly arranged in a closed loop or ring structure. With such a structure, continuity of the loop is an important consideration. A single break in the transmission path, although not totally disabling the system as with a passive bus, will prevent data from traversing the entire loop. It is therefore highly desirable to provide means which will serve to maintain loop continuity in the event of damage to terminals and/or transmission lines. This is especially true of active data buses employed in military applications.

One approach to the problem of survivability of an active data loop has been to employ complementary redundant data paths wherein each adjacent pair of terminals is interconnected by two complementary transmission lines carrying data in opposite directions. One transmission path, designated the A channel, forms a clockwise loop. The other transmission path, designated the B channel, forms a counterclockwise loop. In addition to the clockwise and counterclockwise loops, hybrid-loops utilizing both A and B channels can be formed by utilizing two terminals as "end terminals" which transfer data from the A channel to the B channel and vice-versa.

The use of complementary redundant data paths greatly enhances system survivability by permitting optional data loops to be formed. For example, if one or more casualties occur to the clockwise loop, the terminals can cooperatively switch to the B channel and utilize the counterclockwise loop. Similarly, if one or more casualties occur to the counterclockwise loop, the clockwise loop (A channel) can be utilized. Even in the event of damage to transmission paths of both channels between a single pair of terminals, a hydridloop can be formed which will maintain loop continuity throughout the system. However, multiple casualties affecting both channels at different locations will cause degradation by segmenting the system into smaller hybrid sub-loops that cannot intercommunicate.

SUMMARY OF THE INVENTION

A data communications bus is disclosed which serves a plurality of user data sources and sinks. A plurality of multiplex terminals are provided which are in communication with ones of the user data sources and sinks. Each terminal includes at least three receivers and at least three transmitters. Means is disposed within each terminal for controlling coupling of any one of the receivers in a terminal with any one of the transmitters in the terminal. First and second redundant transmission paths extend between each terminal and serve to couple first and second ones of the transmitters in one terminal with first and second ones of the receivers in another terminal. The terminals are thereby serially connected. At least one bypass transmission path extends between a third transmitter in one terminal and a third receiver in non-adjacent ones of the serially connected terminals.

BRIEF DESCRIPTION OF THE DRAWINGS

FIG. 1 is a block diagram of an active data bus system.

FIG. 2 is a simplified block diagram of one of the multiplex terminals of FIG. 1.

FIG. 3 is a detailed block diagram of the basic configuration of the multiplex terminals of FIG. 1.

FIG. 4 is a timing diagram showing the terminal broadcast format utilized by the present invention.

FIG. 5 is a timing diagram showing the start of message format utilized by the present invention.

FIG. 6 is a timing diagram showing the intramessage gap format utilized by the present invention.

FIG. 7 is a timing diagram showing the end of transmission message format utilized by the present invention.

FIG. 8 is a timing diagram showing the modified end of transmission message format utilized by the present invention.

FIG. 9 is a block diagram of the present invention employing complementary redundant data paths and bypass architecture.

FIG. 10 is a block diagram showing transmission paths interconnecting three sequential terminals according to the present invention.

FIG. 11 is a block diagram of a multiplex terminal employed in the system of FIGS. 9 or 10 configured in a diagnostic mode.

FIG. 12 is a block diagram of a multiplex terminal employed in the system of FIGS. 9 or 10 configured in another diagnostic mode.

FIG. 13 is a block diagram of a multiplex terminal employed in the system of FIGS. 9 or 10 configured in a user access mode.

FIG. 14 is a block diagram of a multiplex terminal employed in the system of FIGS. 9 or 10 configured in another user access mode.

FIG. 15 is a block diagram of a multiplex terminal employed in the system of FIGS. 9 or 10 configured in still another user access mode.

FIG. 16 is a block diagram of a multiplex terminal employed in the system of FIGS. 9 or 10 configured in yet another user access mode.

FIG. 17 is a block diagram of a multiplex terminal employed in the system of FIGS. 9 or 10 configured in still another user access mode.

FIG. 18 is a detailed block diagram of a multiplex terminal employed in the system of FIG. 9.

FIG. 19 is a block diagram of the transmit/receive (T/R) module included in the multiplex terminal of FIG. 18.

FIG. 20A is a schematic diagram of the terminal control port in the multiplex terminal of FIG. 18.

FIG. 20B is a schematic diagram of the terminal status port shown in the multiplex terminal of FIG. 18.

FIG. 21 is a schematic diagram of the function decoder in the multiplex terminal 18.

FIG. 22 is a schematic diagram of the receiver user interface logic in the multiplex terminal of FIG. 18.

FIG. 23 is a schematic diagram of the terminal broadcast transmit register utilized in the multiplex terminal of FIG. 18.

FIG. 24 is a schematic diagram of the access window capture logic circuit utilized in the multiplex terminal of FIG. 18.

FIG. 25A is a schematic diagram of the relay/access multiplexer logic circuit utilized in the multiplex terminal of FIG. 18.

FIG. 25B is a timing diagram showing the signal sequence in the circuit of FIG. 25A.

FIG. 26 is a schematic diagram of the user/supervisory data multiplexers utilized in the multiplex terminal of FIG. 18.

FIG. 27 is a schematic diagram of the terminal broadcast receive registers utilized in the multiplex terminal of FIG. 18.

FIG. 28A is a schematic diagram of the transmit user interface logic circuit utilized in the multiplex terminal of FIG. 18.

FIG. 28B is a timing diagram showing the signal sequence in the circuit of FIG. 28A.

FIG. 29 is a block diagram of the terminal logic unit utilized in the multiplex terminal of FIG. 18.

FIG. 30 is a schematic diagram of the loop access logic circuits of FIG. 29.

FIG. 31 is a schematic diagram of the transmit sequence logic circuit of FIG. 29.

FIG. 32 is a schematic diagram of the loop close logic circuit of FIG. 29.

FIG. 33 is a schematic diagram of the framing signal generator and the supervisory data counter logic circuits of FIG. 29.

FIG. 34 is a table showing terminal conditions for various diagnostic mode and user access mode configurations.

FIG. 35 is a flow chart of the diagnostic controller algorithm used to configure an optimum data loop.

FIG. 36 is a flow chart of the diagnostic follower algorithm used to configure an optimum data loop.

FIG. 37 is a flow chart of the hybrid loop subroutine used in both the diagnostic controller and follower algorithms in accordance with the present invention.

FIG. 38 is a block diagram showing terminal configurations during one test sequence of the hybrid loop subroutine of FIG. 37.

FIG. 39 is a table containing information obtained during the test sequence performed during operation in the configuration of FIG. 38.

FIG. 40 is a block diagram of terminal configurations during a second test sequence according to the subroutine of FIG. 37.

FIG. 41 is a block diagram of a system configuration according to the present invention with particular system faults.

FIG. 42 is a block diagram of another configuration of the system of the present invention with a different arrangement of system faults.

FIG. 43 is a block diagram of a system configuration according to the present invention with still another arrangement of system faults.

FIG. 44 is a block diagram of a system configuration according to the present invention with yet another arrangement of system faults.

DESCRIPTION OF THE PREFERRED EMBODIMENTS

The basic configuration of a simplified active bus data communication system is illustrated in FIG. 1 of the drawings. In this Figure, four multiplex terminals MT 1 through MT 4 are shown to be serially interconnected by transmission medium segments 10 to form a closed loop. Segments 10 in the system of FIG. 1 or other systems disclosed herein may be conventional rf cables or may be optical fiber cables and may comprise multiple parallel paths. Their exact composition as to the type of communication medium will be dictated by the format of the modulated data signals conducted from one multiplex terminal to another and their exact configuration as to path redundancy or routing will be dictated by required system survival characteristics.

FIG. 1 also shows various users, labeled USER 1 through USER n, interfaced to terminals MT2 and MT3. As seen in FIG. 1, USER 1 and USER n serve as both sources of data and sinks of data while USER 2 serves only as a data source and USERs 3 and 4 serve only as data sinks. Thus, USERs can be either data sources, data sinks or both. FIG. 1 also shows that a terminal may service no USERs at all as evidenced by terminals MT1 and MT4, but may merely serve to relay data from one terminal in the loop to another terminal in the loop until such time as USERs are interfaced thereto.

FIG. 2 shows a simplified block diagram of multiplex terminal MT3 configured for use in the system of FIG. 1. This terminal is exemplary of all the multiplex terminals in FIG. 1. The circuitry within the terminal can be divided broadly into three parts. The T/R (transmit/receive) circuitry 12 communicates with other T/R circuitry in adjacent terminals by means of modulated data signals received and transmitted over transmission medium segments 10. The T/R circuitry transfers data signals to and from bus control circuitry 13. Circuitry 13 communicates with signal conditioning and multiplexer circuitry 14 which, in turn, communicates with individual data sources (USERs 1 and 2) and with individual data sinks (USERs 1 and n).

FIG. 3 shows a more detailed block diagram of a multiplex terminal which, for purposes of presenting an initial explanation of the interaction of the basic terminal components, is shown embodying a single, nonredundant, data channel. For clarity, data signal paths are shown as solid lines in FIG. 3 while control signals are indicated by broken lines. The correspondence between elements of the simplified block diagram of FIG. 2 and the more detailed block diagram of FIG. 3 is shown from the following.

The T/R circuitry 12 of FIG. 2 may comprise multiple transmit and receive sections, but is shown as comprising a single separate data receiver (RX) and a single data transmitter (TX) in FIG. 3. These units communicate with like data transmitters and data receiver in adjacent multiplex terminals (MT) by means of appropriately modulated data signals unidirectionally conducted over transmission medium segments 10. Thus, control circuitry 13 of FIG. 2 comprises CPU 11, terminal logic unit transmit (TLU TX) logic 17, terminal control port 18, access window capture logic 19, and terminal status port 20 seen in the simplified MT depiction of FIG. 3. Signal conditioning and multiplexing circuitry 14 of FIG. 2 comprises a relay/access multiplexer 16, a terminal broadcast transmit register 21, a user/supervisory data multiplexer 22, transmit user interface logic 23, a function decoder 24, a terminal broadcast receive register 26 and a receive user interface logic 27, also seen in the simplified MT depiction of FIG. 3.

The T/R module 12 of FIG. 3 may be of the type disclosed in U.S. Pat. No. 4,038,494 issued to Miller et al on July 26, 1977. The data receiver described therein is capable of receiving a Manchester coded biphase signal from a transmission medium segment 10 and demodulating it into a separate clock signal, a binary data signal in phase with the clock signal, and a synchronizing frame signal identifying the beginning of any contiguous data signal sequence. The data transmitter described therein accepts three such signals, combining them into a single coded by-phase signal and transmitting the coded signal over another transmission medium segment 10 to a distant point. Additional output signals are provided by the T/R module to indicate contained oscillator status and channel status as may be seen by referring to FIG. 19 of the drawings. Further details of the construction and operation of the T/R module may be obtained from the aforementioned U.S. patent which details are included herein by reference.

The relay/access multiplexer 16 in FIG. 3 receives clock, data, and frame signals from either the data receiver (RX) output of T/R module 12 or from the output of user/supervisory data multiplexer 22. Relay/access multiplexer 16, in turn, transfers the three signals to the data transmitter (TX) input of T/R module 12. Accordingly, the relay/access multiplexer can exist in either of two configurations. In a relay submode or configuration, clock, data, and frame signals are routed from the RX output to the TX input of the T/R module 12 so that the terminal serves as a repeater. The data is also taken into the terminal for dissemination within the terminal as well as to data sinks interfaced with the terminal. This is the most common configuration. Under the influence of a control signal (GO) outputed by TLU TX logic 17, the relay/access multiplexer 16 assumes a transmit access submode or configuration wherein locally generated signals are routed from the user/supervisory data multiplexer 22 through relay/access multiplexer 16 to the TX input of T/R unit 12. After the locally generated signals have been transferred, TLU TX logic 17 returns the relay/access multiplexer 16 to the relay configuration so that the terminal can again serve as a repeater. The precise means whereby relay/access multiplexer 16 is efficiently controlled by TLU TX logic 17 to assume the transmit access configuration and to subsequently return to the relay configuration without interfering with transmission of other terminals and without introducing extraneous "dead time" is disclosed fully hereinafter.

The element shown generally as CPU 11 in FIG. 3 includes a terminal control microprocessor along with its associated program read only memory and scratch pad random access memory. Such microprocessor circuitry is well known and will not be detailed further herein. CPU 11 controls certain terminal operations by outputing a control word to terminal control port 18. It further monitors certain terminal conditions by inputing a status word from terminal status port 20. In addition, CPU 11 is capable of communicating with other like CPU's at other terminals by transmitting and receiving 16 bit supervisory messages called terminal broadcasts (TB's). Such messages outputed by CPU 11 are stored in terminal broadcast TX register 21 prior to being transmitted throughout the system. TB messages received from the system cause a program interrupt to CPU 11, the TB messages being temporarily stored in terminal broadcast receive register 26 prior to being inputed by CPU 11. From FIG. 3 it may be seen that CPU 11 serves as both a data source and a data sink for TB messages. It may futher be seen that CPU 11 is capable of receiving its own TB messages and therefore capable of testing the continuity of the loop.

FIG. 3 discloses that the RX output of T/R module 12 is distributed to access window capture logic 19, function decoder 24, terminal broadcast register 26, and receiver user interface logic 27 in addition to relay/access multiplexer 16. Consequently, the first four elements named continuously receive clock, data and frame signals regardless of the configurational state of the last named element. Access window capture logic 19 is instrumental in controlling relay/access multiplexer 16 and its exact function is disclosed hereinafter. As stated above, terminal broadcast receive register 26 serves as a receptacle for terminal broadcast messages prior to their being inputed by CPU 11. Receiver interface logic 27 serves to transfer user generated messages to appropriate user data sinks interfaced to the multiplex terminal. Function decoder 24 is responsive to a function code (FC) comprising the two data signal bits immediately following every frame signal as hereinafter described. The function decoder 24 provides four control signal outputs denoted TB (terminal broadcast), SM (start of message), IG (intra-message gap) and EOT (end of transmission).

The detailed operation of the function decoder 24 of FIG. 3 will now be described. The signals at the input of function decoder 24 are disclosed in the phasing diagrams of FIGS. 4 through 8. The clock signal 28 is a repetitive square wave providing a timing reference. The period of this waveform may, for example, by 100 nanoseconds. A frame signal 29 is seen to comprise a single negative pulse coincident with one cycle of the clock signal in all cases. The two following bits comprise the function code FC.

FIG. 4 discloses the format for a terminal broadcast (TB) message. Reception of FC bits that are zero-zero as at 32, signifies that a TB message is about to follow. Accordingly a TB control signal responsive to function zero-zero is sent by function decoder 24 to terminal broadcast receive register 26 activating the latter to receive and store the next 16 bits of TB data 31, whereby the data may subsequently be called up by the CPU 11. Note that the TB control signal is also sent to the receiver user interface logic 27. This is a disabling signal that prevents the TB data from being transferred to a user data sink.

FIG. 5 discloses the SM message format identifying the beginning of a user generated message. The appropriate FC bits are zero-one as seen at 34. Perception of this code indicates that a message destined for a user data sink is about to follow. Accordingly, an enabling signal responsive to function code 34 is sent by function decoder 24 to the receiver user interface logic 27. The actual message 33 can be of any length, as mentioned before, and is presumed to contain address codes, where appropriate, for interpretation by user data sinks. The principles of addressing messages and decoding the address codes for purposes of routing the messages through appropriate sinks are well known and are not considered a part of the invention disclosed herein.

If a user data sink has indicated that it is ready to receive data by asserting the RR line at the receiver user interface logic 27 of FIG. 3, the arrival of the SM control signal at the receiver user interface logic causes the ER line to become active and further causes received clock and data signals to be transferred to the user data sink on output lines CR and DR respectively.

FIG. 6 discloses the IG message format identifying an intra-message gap in a user generated message. The purpose of this function code is to provide a time interval, if needed, to permit a user data sink to switch buffers or to transfer data from a holding register before continuing with the remainder of the message. Upon reception of function code one-zero, as shown at 36, a disabling IG signal is sent from function decoder 24 to receiver user interface logic 27. This signal temporarily disables transfer to user data sinks and then re-enables such transfer to permit transfer of subsequent user data 37 (FIG. 6).

FIG. 7 discloses the EOT message format identifying the end of a terminal transmission. As seen at 38, the appropriate function code bits are one-one. Reception of the EOT digital one-one function code causes an EOT control signal to be sent from function decoder 24 to receiver user interface logic 27 disabling the latter for transfer of data signals to user data sinks until such time as an SM function code is again received. Accordingly, receiver user interface logic 27 responds to the EOT signal by disabling its CR and DR lines and bringing its ER signal to the inactive state.

In FIG. 3 it may be seen that the EOT control signal is also sent to access window capture logic 19. This signal is utilized in the highly efficient user access mode of terminal operation wherein bus access is controlled by hardware without intervention by CPU 11. In addition to the user access mode, the terminal is also capable of operating in a diagnostic mode wherein CPU 11 has total control over bus access. Details of the user access mode of terminal operation will now be described.

The terminal is disposed in the user access mode by virtue of CPU 11 outputting an appropriate control word to terminal control port 18 which so informs TLU TX logic 17 and enables access window capture logic 19 and transmit user interface logic 23. During the period of time that the channel is disposed in the user access mode, bus access is controlled totally by TLU TX logic 17, access window capture logic 19 and relay/access multiplexer 16 without any action taken by CPU 11.

With the terminal disposed in the user access mode, access window capture logic 19 is enabled. Further, if locally generated data is available for transmission, a data ready signal is provided by TLU TX logic 17 to access window capture logic 19. Under these combined conditions, access window capture logic and relay/access multiplexer are set to "capture" the next "access window". FIG. 7 discloses that an access window 39 comprises the bit immediately after an EOT function code 38. This bit set to "one" signifies that the system is available for transmission.

The arrival of an EOT control signal from function decoder 24 causes access window capture logic 19 to send an access window capture signal to relay/access multiplexer 16. In response to this signal, relay/access multiplexer resets the access window bit to zero as data signals are routed from RX output to TX input. Thus, regardless of the binary state of the received access window bit, it is retransmitted as a zero as is shown in FIG. 8. Note that because the EOT signal arrives before the access window bit, no data delay need be introduced to accomplish the above described action.

The access window bit is retransmitted as a zero whether or not the system is actually available. This action prevents any down-stream terminal that may possess locally generated data from gaining access to the bus. The logical justification for this procedure may be explained as follows. If the received access window bit is zero, it indicates that a preceding terminal has already gained access. If it is one, the subject terminal will now gain access. In either case, the retransmitted access window bit should be zero to prevent any downstream terminals from gaining access and thus interfering with data flow.

Simultaneously with transmission of the zero bit, relay/access multiplexer 16 examines the actual received bit. If a one, an OL (FIGS. 25A and 30) signal is sent to the TLU TX logic 17 signifying that an access window has been "captured". TLU TX logic 17 responds with a $\overline{GO}$ signal (FIG. 30) which controls relay/access multiplexer 16, causing it to change from a relay configuration to a transmit access configuration on the next clock pulse.

During the period of time that relay/access multiplexer 16 is disposed in a transmit access configuration, sequencing of locally generated data signals to the TX input is controlled by TLU TX logic 17. If CPU 11, by means of terminal control 18, indicates to TLU TX logic 17 that a TB is ready for transmission, TLU TX logic 17 first commands user/supervisory data multiplexer 22 to select a TB message. Accordingly, user/supervisory data multiplexer 22 generates a frame signal and a TB function code (zero-zero) and then transfers same to TX input. Following this, the user/supervisory data multiplexer routes the 16 bit TB message from the terminal broadcast transmit register 21 to TX input.

If transmit user interface logic 23 indicates to TLU TX logic 17 that its RT line is being asserted by a user, an appropriate "user select" command is next sent to the user/supervisory data multiplexer 22 by TLU TX logic 17. In response, user/supervisory data multiplexer 22 generates a frame signal followed by either an SM or IG function code and transfers such signals to the TX input. Following the function code, an "enable interface" command is sent to transmit user/interface logic 23. The interface logic responds by sending an ET signal to the user data source along with a ten Mhz transmit clock signal CT. The user data source, in turn, returns an input clock signal CI along with a transmit data signal DT in phase with it. These signals are passed through both the transmit user interface logic 23 and the user/supervisory data multiplexer 22 to the TX input for transmission.

When the user data source returns the RT line to the inactive condition, transmit user interface logic 23 terminates the transfer of user data and clock and returns the ET line to the inactive state. TLU TX logic 17 then commands user/supervisory data multiplexer to terminate the transmission. With no user data available, this occurs immediately after the 16 bit TB messages transfer to TX input. Upon this command, user/supervisory multiplexer 22 generates a frame signal followed by three "one" data bits in succession. This action appends the transmission with an EOT function code followed by an access window bit set to convey permission to another terminal to access the bus.

After the access window bit has been transferred to TX input, relay/access multiplexer 16 must return to a relay configuration. Ideally, this should occur before the access window traverses the loop so that the returning access window is relayed by the terminal that introduced it and thus permitted to continue circulating until it is captured. Closing the loop too soon however could permit ambiguous data to circulate as well. An efficient means for returning the relay/access multiplexer to a relay configuration which permits the access window to circulate without permitting ambiguous data to circulate will now be described.

TLU TX logic 17 includes counting means, to be hereinafter described in greater detail, which compares the number of transmited frame signals and the number of received frame signals excluding the one frame signal preceding the EOT function code and access window bit in both cases. After the access window bit has been transferred to TX input, TLU TX logic 17 commands relay/access multiplexer 16 to return to a relay configuration when the two numbers are equal. This insures that the last frame signal introduced, along with the EOT and access window bits which follow it, will be permitted to circulate until such time as the terminal accesses the bus. Only one frame signal will be circulating, specifically the one preceding the EOT function code and access window bit. Any additional data bits that happen to be trapped on the loop will also circulate, but will be completely ignored by all terminals because the bits will not be preceded by a frame signal. In addition to the aforementioned counting means, TLU TX logic 17 includes a backup for loop closing timing means that commands relay/access multiplexer to return to a relay configuration if it is still in a transmit access configuration at a given time after all locally generated data has been transferred to TX input. This protective device insures that a terminal will return to the transmit access configuration even if frame signals are prevented from returning to their terminal of origin because of a broken loop.

Whenever the loop is closed by means of the backup timer during user access mode operation, a bit is set at terminal status port 20 and a program interrupt signal is communicated to CPU 11 so that the CPU can take corrective action if necessary. In addition to this loop close timer, terminal status port 11 monitors a user overrun timer that interrupts CPU 11 if a single user data source affirms the RT input line for too long a time period. The terminal status port also monitors an access window timer that interrupts CPU 11 if too much time elapses before receiving an access window and it further monitors channel status and oscillator status signals outputed by T/R module 12 as shown in FIG. 19 of the drawings. As disclosed hereinafter in reference to FIG. 20B, several of the signals monitored by terminal status port 20 cause program interrupts of CPU 11 whenever they change from one binary state to the other.

The user access mode of terminal operation disclosed herein is a "free running" mode wherein any given terminal may gain access to the system by capturing an access window without any direct action taken by its terminal control microprocessor. The diagnostic mode of operation will now be described.

A multiplex terminal is disposed in the diagnostic mode by virtue of its CPU 11 outputing an appropriate control word to terminal control port 18 to so inform its TLU TX logic 17 and to disable both its access window capture logic 19 and its transmit user interface logic 23. With the terminal so disposed, no messages generated by local user data sources will be accepted for transmission. However, its CPU 11 can still transmit terminal broadcast messages by outputting them to the terminal broadcast transmit register 21 and then asserting the TB ready bit of terminal control port 18. Upon assertion of the last mentioned bit, TLU TX logic 17 responds immediately rather than waiting for an uncaptured access window as in the case of user access mode operation. Relay/access multiplexer 16 is immediately commanded to assume a transmit access configuration and user/supervisory data multiplexer 22 is commanded to select the TB stored in the terminal broadcast register 21. User/supervisory data multiplexer 22 responds by generating a frame signal and a TB function code (zero-zero) and transferring the function code to TX input. Immediately after the TB function code, 16 data bits are transferred from terminal broadcast register 21 to TX input.

After the 16th bit of TB message is transferred to TX input, transmission is terminated without appending an EOT or access window bit. TLU TX logic 17 then commands relay/access multiplexer 16 to return to a relay configuration when means comparing the numbers of transmitted and received frame signals (described hereinafter in conjunction with FIGS. 29, 32 and 33) indicates that the two numbers are equal. Thus, no frame signals at all will be trapped on the closed loop. Any data bits that happen to be trapped will be ignored by receiving terminals. As with user access mode operation, backup timing means closes the loop if the counting means does not succeed in doing so within a specified time.

The asynchronous data bus system disclosed herein is preferably installed with complementary redundant bypass architecture. Such a system is shown schematically in FIG. 9 wherein a plurality of multiplex terminals, MT1 through MT4 are shown interfaced with users 1 through n. The transmission path 10 may be seen to consist of multiple paths 10a, 10b and 10c. Complementary paths 10a and 10b may be seen to be conducting data in opposite directions and extend in parallel between each terminal and its adjacent neighbors on each side. Path 10a, designated channel A, conducts data in a clockwise direction, and path 10b, designated channel B, conducts data in a counterclockwise direction. Path 10c, designated bypass or C channel, conducts data in the same direction as the B channel, but couples alternate terminals in the closed loop. Each terminal therefore includes three data transmitters and three data receivers with separate transmitters and receivers serving each channel, A, B or C.

FIG. 10 shows the arrangement of transmission paths for a general terminal, designated terminal N, in a general multi-terminal system according to the present invention. The A and B channel paths conduct data in opposite directions and interconnect adjacent terminals. The C channel path conducts data in the same direction as the B channel but interconnects alternate terminals. For simplicity of explanation, the architecture of FIG. 10 will be assumed. It should be clear, however, that other bypass architectures are possible. For example, the bypass channel could interconnect every third terminal or every fourth terminal. In addition, other bypass channels could conduct data in the same direction as channel A. All of these variations are believed to fall within the scope of the present invention.

According to the present invention, a terminal control microprocessor can selectively pair different combinations of data transmitters and receivers for use in disposing the terminal in a relay configuration. It can furthermore transmit different TBs on two of the three channels and can select several combinations of transmitters and receivers for communicating user data. With this flexibility, the diagnostic mode subdivides into two submodes and the user-access mode subdivides into five submodes.

The two diagnostic submodes are illustrated in FIGS. 11 and 12 and the five user access submodes are illustrated in FIGS. 13 through 17. These Figures all disclose a multiplex terminal comprising three T/R units 12a, 12b and 12c connected to transmission medium segments 10a, 10b and 10c respectively. T/R unit 12a contains data receiver RX-A and data transmitter TX-A. T/R unit 12b contains data receiver RX-B and data transmitter TX-B. T/R unit 12c contains data receiver RX-C and data transmitter TX-C. Two relay/access multiplexers, denoted 16a and 16b in FIGS. 11 through 17 are employed in each terminal. In addition, a primary/bypass multiplexer 40 is used to select the output of either the primary receiver, receiver B, or the bypass receiver, receiver C. Note, however, that the input to transmitters B and C are permanently connected together so that these two transmitters always transmit identical data. The elements shown generally as TLU (terminal logic unit) 41 in FIGS. 11 through 17 comprise all of the logic elements of the multiplex terminal including its terminal control microprocessor.

FIG. 11 shows a block diagram of a multiplex terminal with complementary redundant bypass architecture disposed in the linear coupled submode of the diagnostic mode. As has been disclosed, no user data is communicated with the terminal so disposed. However, TB messages can be received and can be generated locally. FIG. 11 discloses that separate TBs generated by TLU 41 are transferred to the input of TX-A and to the combined inputs of TX-B and TX-C with relay/access multiplexers 16a and 16b, respectively, in transmit access configurations. Also, separate TBs received on RX-A and on either RX-B or RX-C, depending on the state of primary/bypass multiplexer 40, are transferred to TLU 41. With relay/access multiplexer 16a in a relay configuration, the output of RX-A is coupled to the input of TX-A. With relay/access multiplexer 16b in a relay configuration, the combined input of TX-B and TX-C is fed from the output of either RX-A or RX-B depending upon the state of primary/bypass multiplexer 40. The diagnostic mode terminal arrangement of FIG. 11 is referred to hereinafter and in the Figures as configuration 1 or 1 BP depending upon whether multiplexer 40 selects RX-B or RX-C, respectively.

FIG. 12 discloses a block diagram of a multiplex terminal disposed in the cross coupled submode of the diagnostic mode. Again, separate TBs generated by TLU 41 are transferred to the input of TX-A and to the combined inputs of TX-B and TX-C with relay/access multiplexers 16a and 16b in transmit access configurations. Also again the TBs received on RX-A and on either RX-B or RX-C, depending upon the state of primary/bypass multiplexer 40 are transferred to TLU 41. However, with relay/access multiplexer 16a in a relay configuration, the output of RX-A is coupled to the combined inputs of TX-B and TX-C. Furthermore, with relay/access multiplexer 16b in a relay configuration, the input of TX-A is fed from the output of either RX-B or RX-C depending upon the state of primary/bypass multiplexer 41. The diagnostic mode terminal arrangement of FIG. 12 is referred to hereinafter and in the Figures as configuration 2 or 2BP depending upon whether multiplexer 40 selects RX-B or RX-C, respectively.

FIGS. 13 through 17 disclose block diagrams of five user access submodes. Each of these block diagrams includes a bidirectional user data path UD showing data flow to user data sinks and from user data sources. When operating in one of these user access submodes, the transmit user interface and access window capture logic circuits are enabled. Thus, a terminal is capable of communicating user data as well as communicating interterminal TBs. As will hereinafter be further disclosed, these five submodes are employed by the plurality of terminals to collectively configure an optimum loop for communicating user data. The form of this loop will depend upon the resources that are available and may comprise an all channel A loop, an all channel B loop, or a hybrid loop combining elements of both channel A, channel B and bypass channel C.

FIG. 13 discloses a block diagram of a multiplex terminal disposed in the A loop submode of the useraccess code. Multiplexer 40 always selects RX-B with this submode. Accordingly, separate TBs are communicated on channel A and B. Additionally, user data are communicated on channel A as shown in FIG. 13. If all terminals are disposed in this submode, a channel A loop will be formed for communicating user data. The terminal arrangement of FIG. 13 is referred to hereinafter and in the Figures as configuration 3.

FIG. 14 discloses a block diagram of a multiplex terminal disposed in the B loop submode of the user access mode. Again, multiplexer 40 always selects RX-B with this submode. Separate TBs are communicated on channels A and B, however, user data are carried on channel B only as shown in FIG. 14. If all terminals in the system are identically disposed in this submode, a channel B loop will be formed for communicating user data. The arrangement of FIG. 14 is referred to hereinafter and in the Figures as configuration 4.

FIGS. 15, 16 and 17 are block diagrams of the three hybrid-loop submodes of the user access mode. FIG. 15 discloses the A-end submode wherein user data received on channel A is communicated to local users and is retransmitted on channels B and C in a relay configuration, and locally generated user data is transmitted on channels B and C in a transmit access configuration. FIG. 16 discloses the B-end submode wherein user data received on channels B or C, as selected by multiplexer 40, is communicated to local users and is retransmitted on channel A in a relay configuration, and locally generated user data is transmitted on channel A in a transmit access configuration. FIG. 17 discloses the hybrid interior submode of the user access mode wherein channels B or C remain permanently in a relay configuration, passing on data received on channel B or C as determined by multiplexer 40. As seen in FIG. 17, data received on channel A is communicated to local users and retransmitted on channel A in a relay configuration. Locally generated data are transmitted on channel A in a transmit access configuration. The arrangements of FIGS. 15, 16 and 17 are referred to hereinafter and in the Figures as terminal configurations 5, 6, and 7, respectively. The suffix BP added to the configuration number indicates that multiplexer 40 has selected the bypass channel receiver, RX-C.

A plurality of terminals can employ the submodes of FIGS. 15, 16 and 17 to cooperatively form a hybrid-loop for communicating user data. A hydrid-loop comprises one terminal disposed in the A-end submode (FIG. 15), one terminal disposed in the B-end submode (FIG. 16), and any number of terminals disposed in the hybrid-interior submode (FIG. 17). According to the present invention, at least one terminal in a hybrid loop will be in a bypass configuration, i.e., its multiplexer 40 will have selected RX-C.

FIG. 18 discloses a block diagram of a single multiplex terminal in a data bus system employing complementary redundant path and bypass architecture, such as that seen in FIG. 9. This block diagram may be compared with the block diagram of FIG. 3 discussed hereinbefore. Item numbers for like circuits are the same as in FIG. 3 with a suffix "a" or "b" for those circuits which appear twice, once for channel A and once for channel B respectively. Certain of the elements common to both FIGS. 3 and 18 serve both channels. These are CPU 11, TLU TX logic 17, terminal control port 18, terminal status port 20, transmit user interface 23, and receiver user interface logic 27. Elements of FIG. 3 that appear twice in FIG. 18 are T/R units 12a and 12b, relay/access multiplexers 16a and 16b, access window capture logic circuits 19a and 19b, terminal broadcast transmit registers 21a and 21b, user/supervisory data multiplexers 22a and 22b, function decoders 24a and 24b, and terminal broadcast receive registers 26a and 26b. In addition, three elements appear in the block diagram of FIG. 18 that do not have counterparts in the block diagram of FIG. 3. They are normal/cross coupled logic circuits 42 and 43 and channel receive select logic 44. The primary/bypass multiplexer 40 mentioned in connection with the discussion of FIGS. 11 through 17 is shown in FIG. 18 coupled to the receiving sections of T/R modules B and C (bypass). The multiplexer is controlled by CPU 11 as indicated at 5 to bring data received on either channel B or bypass channel C into the terminal for passing to the TB-RX register 26b or a user coupled to the terminal, or for relaying to another terminal.

The data receiver/transmitter cross coupling occurring in the submode configurations illustrated in FIGS. 12, 15 and 16 is accomplished by the normal/cross coupling logic circuits 42 and 43 associated with channels A and B/C respectively. It may be seen that data messages received from path 10b (channel B) or path 10c (bypass channel C) may be passed through relay/access multiplexer 16b in a relay configuration to normal/cross coupling logic 42 and thence to TX input of T/R unit 12a for transmission on path 10a of channel A. A data message received on channel A may in like fashion be retransmitted on channels B and C in a relay configuration by means of normal/cross coupling logic 43. The two normal/cross coupling logic elements therefore provide combinations of the three data transmitters and the three data receivers in a relay configuration. The selection is made by CPU 11 by means of an appropriate command to terminal control port 18 shown at numeral 2 in FIG. 18.

The commands represented by numerals 1, 3, 4 and 5 from terminal control port 18 of FIG. 18 are enabling signals to access window capture logics 19a and 19b, and control commands to relay/access multiplexer 16b, relay/access multiplexer 16a and primary/bypass multiplexer 40 respectively as indicated in the Figure. Terminal control port 18 also provides a selection signal to channel receive select multiplexer 44 which determines which of the data receiver outputs is to be transferred to a user data sink. In addition, terminal control port 18 provides enabling signals to TLU TX logic 17 and transmit user interface logic 23 as shown.

Component parts of the elements described generally in block form in FIG. 18 will now be described. Elements will be described in configurations adapted to serve a dual channel multiplex terminal which is appropriate for complementary redundant path and bypass architecture.

With reference to FIG. 20a, the terminal control port 18 of FIG. 18 will be described. Data from the bus associated with CPU 11 is delivered to an 8 bit latch 46. When the data is desired to be latched, a CPU write signal is provided by the CPU to the latch which is an edge triggered (rising) device. Each bit in the terminal control byte appearing at the output of the 8 bit latch 46 controls some terminal characteristic. The setting of TCB1 determines whether the terminal is in the normal or the cross coupled configuration. Bit TCB2 designates whether channel A or channel B is the userreceiver channel. TCB3 enables the access window capture logic when set and disables the logic when not set. Bit TCB4 holds transmit access when set so that the transmission path is held open at the terminal during multiple terminal broadcasts from a given terminal. In this fashion the transmit access is not surrendered and the access window is not allowed to traverse the loop between terminal broadcasts. Bit TCB5, when set, indicates that a terminal broadcast is ready for transmission on the A channel. If the terminal is in the diagnostic operational mode, the TB is transmitted immediately. If the terminal is in the user access operational mode, the setting of this bit causes the access window to be captured and the TB to then be transmitted.

Bit TCB6 when set indicates that a terminal broadcast is ready for transmission in B channel. The transmission is accomplished in the diagnostic and user access operational modes as described in the A channel. Bit TCB7 is the user access transmit enable bit. Bits TCB0 and TCB7 are provided as inputs to the negative AND gate G1 to provide a diagnostic mode signal $\overline{DIAG}$ which indicates that the terminal is operating in the diagnostic mode. The inverse of the relay control bit is provided by inverter I1 as $\overline{TCB1}$. The inverse of the user data reception channel bit is provided by inverter I2 as $\overline{TCB2}$.

A two-bit latch 47 is coupled to the CPU data bits 5 and 6 which are latched through to the output of latch 47 by the CPU write command. The output from the two-bit latch are designated QB5 and QB6 which are transmitted to the TLU transmit logic circuitry indicating that a terminal broadcast is ready to be transmitted in either channel A or channel B respectively. The two-bit latch is reset by a QB5 or QB6 reset signal which is generated by the frame signal generator portion (FIG. 33) of the TLU transmit logic 17 (FIG. 18) to be hereinafter described. This reset removes the indication that a terminal broadcast is ready to be transmitted in either channel A or channel B.

A JK flip-flop FF1 is seen having the CPU data bit 3 coupled to the K input through an inverter I3. The CPU write command is coupled to the clock input of FF1 so that upon the CPU write command an initiate access window signal (IAW) is provided at the $\overline{Q}$ output of the flip-flop. A terminal transmit signal $\overline{TT}$ from the transmit sequence logic (FIG. 31) in the TLU transmit logic 17 (FIG. 18) is coupled to the preset of FF1 to remove the IAW signal after an access window has been transmitted.

FIG. 20B shows the terminal status port 20 (FIG. 18) wherein any changes in the status in the system are sensed and the current status of the system is transmitted to the CPU 11. Two timer signals, a loop close time out A and a loop close time out B are provided as inputs to a pair of AND gates G2 and G3 respectively. Either bit $\overline{TCB2}$ or TCB2 is present dependent upon whether user data is being transmitted on channels A or B respectively. As a consequence, an input is provided to OR gate G4 which is coupled to the bit 5 terminal on an eight-bit latch 48 and to an input on one side of a comparator 49. A received access window (AW) time out for channel A is coupled to bit 6 of the eight-bit latch through an inverter I4 and a received access window (AW) time out for channel B is coupled to the bit 7 input on the eight-bit latch through an inverter I5. The last two mentioned signals are also connected to the comparator 49. A user overrun signal obtained from a timer in the circuit in FIG. 28A is coupled to the bit 3 input of the eight-bit latch and to the input side of comparator 49. If either of the oscillators in the dual transmit/receive modules 12a and 12b change status, a signal is input to an OR gate G5 which provides an output coupled to the bit 2 input of the eight-bit latch 48 and the input side of the comparator 49. The status of channel A and channel B is also obtained from the T/R module and coupled to bits 1 and 0 respectively at the eight-bit latch and the input side of the comparator. The oscillator and channel status signals are obtained from the T/R module as may be seen in FIG. 19 described hereinbefore.

Comparator 49 makes a comparison between latch 48 inputs and selected latch 48 outputs. If the comparison is "not equal", a status change signal is generated which produces a program interrupt to CPU 11. CPU 11 responds by issuing a CPU read pulse to latch 48 which transfers the new status data to the CPU data bus and equalizes the inputs of comparator 49.

Referring now to FIG. 21 a schematic is presented for the function decoders 24a and 24b in FIG. 18. The received clock, received frame and received data as seen in FIGS. 4 through 8 are provided as inputs to the function decoder. The received clock is provided through an inverter I20 to the clock input of a counter 52. The Received frame is provided through an inverter I6 to the K input of JK flip-flop FF2 so that on the next clock pulse the $\overline{Q}$ output of the flip-flop will start the counter 52. At the zero count from the counter a latch 53 will be cleared through a negative OR gate G6. The received data is delivered to the input of a D-type flip-flop FF3 which latches the first bit of the function code at the output thereof. The second bit of the function code is applied to the input of a one of four decoder 54 which decodes the two-bits then at its input and provides an indication at the decoder output that the message is a terminal broadcast (TB) if the decoder input is a digital 00, is a start of message (SM) if the input is a digital 01, is an intramessage gap (IG) if the input is a digital 10 and is an end-of-transmission message (EOT) if the input is a digital 11. At the end of the second clock count after the clear caused by the framing signal, the output of the decoder 54 which is at the input of the latch 53 is latched through to the output of the latch. The latch output for the messages TB, SM and IG remains set indicating that one of these message formats is about to be received until the next received frame arrives at the receiver. The flip-flop FF2 is preset to disable the counter 52 by the third count where the rising or the falling portion of the count is operative as indicated. When the EOT message format is indicated at the output of the latch 53 the indication is provided to the D-input of a D-type flip-flop FF4 and the indication is clocked through the $\overline{Q}$ output of the flip-flop by the next clock pulse to clear the latch 53. Therefore, the EOT received indication is reset after one clock pulse.

Turning now to FIG. 22 of the drawings a schematic for the receiver user interface logic 27 in FIG. 18 will be described. The received data and the received clocks from the T/R modules 12a or 12b as selected by the channel receive select multiplexer 44 (FIG. 18) are provided as two inputs to the user interface. The received IG and SM signals from the function decoder 24 of FIG. 21 are also provided as inputs. The IG and SM signals are inputed to an OR gate G7, the output of which is provided as one input to an AND gate G8 and to an AND gate G9. Gate G7 therefore provides a logical high state when either SM or IG signals are received. When the SM received signal is coupled to the receiver user interface logic it is provided through an inverter I7 to clock a flip-flop FF5 to provide a high logical state at inputs on AND gates G8 and G9. As a consequence the received data and the received clock signals will be anded with the output of OR gate G7 and flip-flop FF5 to provide DR (data) and CR (clock). The output from $\overline{Q}$ of FF5 is the receive enable signal for the receiver-user interface 27 and will remain until FF5 is preset by removal of the signal RR (user ready to receive) or the appearance of a receive TB or receive EOT signal through the NOR gates G10 and G11 as shown.

Turning now to FIG. 23 the circuit for the terminal broadcast transmitters 21a and 21b in FIG. 18 will be described. The CPU data bus is coupled to the inputs of two 8 bit latches 56 and 57. Eight bits are latched into each 8 bit latch on command of the CPU through the negative AND gates G12 and G13. It may be seen that the latch 56 is actuated by the gate G13 and the latch 57 is actuated by the gate G12. An internal frame signal obtained from the circuit of FIG. 33 in the TLU transmit logic 17 of FIG. 18 loads the latched data into a shift register 58. An internal clock signal from the clock (not shown) associated with the CPU 11 mentioned hereinbefore clocks the loaded data serially out onto the TB transmit line.

FIG. 24 is a diagram of the access window capture logic circuit 19a or 19b of FIG. 18. This circuit applies the $\overline{DIAG}$ signal from terminal control port 18 and an alternate channel signal (TCB2 or $\overline{TCB2}$, (FIG. 20A) to negative OR gate G14. The $\overline{DIAG}$ signal indicates that the terminal is disposed in the diagnostic mode, and the alternate channel signal indicates that the subject channel is not the active channel. In either case, AND gate G15 is disabled. A user ready signal from the transmit user interface logic 23 (FIG. 18) is provided as one input to an AND gate G16 together with the transmit enable bit TCB7 from the terminal control port of FIG. 20A. When both of these last two named signals are present, the output of the AND gate G16 provides a high logical state as one input to an OR gate G17. As a consequence a high logical state is provided from the output of the OR gate G17 to the AND gate G15. As previously mentioned when both the $\overline{DIAG}$ and TCB2 or $\overline{TCB2}$ signals are both absent, the output of negative OR gate G14 is normally high. As a result the AND gate G15 provides a logical high signal to one input of an AND gate G18. As mentioned hereinbefore the EOT receive signal from the function decoder of FIG. 21 is high for one clock pulse and thereby provides an access window capture (AWC) signal at the output of AND gate G18. An alternate way for the AND gate G15 to receive its second logical high input from the OR gate G17 is for the TB ready signal (QB5 for channel A and QB6 for channel B) obtained from the terminal control port of FIG. 20A to be provided as an input to the circuit of FIG. 24. Thus, when the user ready signal and the bit TCB7 at the input to the circuit of FIG. 24 are in logical high states or when a TB ready signal is in a logical high state, then when the EOT receive signal is coupled to the access window capture logic from the function decoder 24a or 24b, an AWC pulse is provided.

With reference now to FIG. 25A of the drawings a circuit diagram for the relay/access multiplexer logic seen as circuitry segments 16a and 16b in FIG. 18 is shown. A series of four inputs may be seen to provide inputs for a series of gates including a NAND gate G19, a negative NOR gate G20 and a negative NAND gate G21. The four signals are the signals TB from the transmit sequence logic of FIG. 31, the TB enable signals TCB5 (Channel A) or TCB6 (channel B) from the terminal control port FIG. 20A, the channel selector for user data AW enable ($\overline{TCB2}$ for channel A and TCB2 for channel B) from the terminal control port of FIG. 20A and the internal frame signal (INT $\overline{FRM}$) from the frame signal generator circuitry of FIG. 33. When these four signals are present, a high is provided at the output of the negative NAND gate G21 which is coupled to an A input in a multiplexer 58. This output from the gate G21 represents a framing signal generated within the multiplex terminal. A Received frame signal from the T/R modules 12a or 12b is coupled to a B input of the multiplexer 58 through an inverter I8. Received data is coupled to a B input of the multiplexer through an inverter I9. The internal clock signal is coupled to an A input of the multiplexer and the received clock signal is coupled to a B input of the multiplexer. Internal data is coupled to an A input of the multiplexer and the AWC signal from the access window capture logic of FIG. 24 is coupled to a B input of the multiplexer 58. When a $\overline{GO}$ signal obtained from the loop access logic of FIG. 30 is in a high state, the B inputs are presented at the multiplexer output which may be recognized as the relay configuration. When the $\overline{GO}$ signal is in a low state the A inputs to the multiplexer 58 are presented at the outputs which may be recognized as the transmit access configuration. The frame signal to be transmitted therefore is either the received frame or the internally generated frame from the output of the gate G21 and appears as TX $\overline{FRM}$. The data to be transmitted is therefore seen to be either the received data or the internally generated data ($\overline{INT\ DATA}$) and appears at the output of the circuit as TX data. Either the internal clock or the received clock is presented at the output of the multiplexer and appears as the TX clock at the output of the circuit. When the access window is to be captured the data from the multiplexer 58 may be seen to be treated by a number of components including inverters I10, I11 and I12, flip-flop FF6 and NOR gate G22. Reference to the timing diagram of FIG. 25B shows that the received frame is initiated at time t1 and lasts until time t2 in synchronism with the received clock. The received data when it is an end of transmission message with an access window is shown wherein the end of transmission logical one-one extends from t2 through t5 and the access window extends from t5 through t7. The access window capture (AWC pulse from the access window capture logic of FIG. 24) occurs on the falling edge of the clock at time t4. As a consequence it is another half clock pulse until the flip-flop FF6 is clocked by the output from inverter I11 and the Q output from the flip-flop FF6 appears as the $\overline{XD}$ signal which is logically high from time t5 to t7. The transmitted data at the output of the NOR gate G22 is therefore low from t5 through t7 as shown at TX data in FIG. 25B. Thus, the access window has been removed.

A RX EOT signal is shown as an input to the circuit of FIG. 25A and is coupled to one input of an AND gate G23. It may be seen that the output from inverter I10 is a high logical state if an access window is available in the data. The Q output from flip-flop FF6 is high during the period t5 through t7 as seen at $\overline{XD}$ in FIG. 25B. When the RX EOT signal from the function decoder circuit of FIG. 21 is present which, as previously described, is only one clock pulse long, there are three high inputs to the AND gate G23 if an access window is available in the data. As a consequence, the output OL occurs from the circuit of FIG. 25A for the period t5 through t6 as shown in the timing diagram of FIG. 25B.

Referring now to FIG. 26 the circuitry for the user/supervisory data multiplexer 22a and 22b in FIG. 18 will be described. $\overline{TB}$, $\overline{SM}$ and $\overline{IG}$ are normally high signals which, when actuated, assume a low state and indicate that a terminal broadcast, start of message or intramessage gap message format is ready for transmission. An array of gates G24 through G32 are arranged with inverters I13 through I15 to operate with a pair of flip-flops FF7 and FF8 so that the flip-flops operate as a 2 bit shift register following an internal frame signal to provide an appropriate function code at the Q output of FF8 corresponding to the $\overline{IG}$, $\overline{SM}$ or $\overline{TB}$ inputs. The flip-flops FF7 and FF8 are clocked by the internal clock signal. The 2 bit function code is presented to one input of a multiplexer 59 which selects the function code to be presented at the multiplexer output as internal data for the two clock periods. When the input to the circuit of FIG. 26 is either $\overline{IG}$ or $\overline{SM}$ a switchover signal (SW OVER) at the select terminal of the multiplexer 59 causes the multiplexer to pass user data through to the output thereof as internal data. When the input to the circuit is $\overline{TB}$, the switchover signal leaves the multiplexer 59 in condition to pass the Q output from FF8 through to the output of the multiplexer as internal data. The circuit functions in this manner because a terminal broadcast to be transmitted is passed through the OR gate G30 unchanged into the 2 bit shift register consisting of the flip-flops FF7 and FF8. The clock pulses then shift the entire terminal broadcast through to the Q output of FF8 in sixteen additional clock pulses. Therefore a terminal broadcast together with the terminal broadcast function code requires 18 clock pulses to be shifted through the register formed by the flip-flops. The start of message and intramessage gap function codes are shifted through the register in two clock pulses. Three clock pulses are required to shift the end of transmission function code plus an access window through the 2 bit register. The EOT function code is produced only for those conditions when the $\overline{IG}$, $\overline{SM}$ and $\overline{TB}$ signals are not present and a framing signal is present. Clearly this condition requires that an EOT function code be generated by the 2 bit shift register formed by FF7 and FF8.

FIG. 27 shows a terminal broadcast receiver register at 26a and 26b as seen in FIG. 18. The circuit of FIG. 27 receives a decoded terminal broadcast identification TB from the function decoder of FIG. 21 which is connected to a start count terminal on a counter 61. A received clock and received data is input to the terminal broadcast receiver register from a T/R module 12a or 12b. The received clock is inverted by an inverter I16 and coupled to the clock inputs of the counter 61 and a shift register 62. The received data is coupled to the input of the shift register. At the end of an eight clock pulse count the counter provides an input to an OR gate G33 which provides a "shift in" pulse to a memory 63 so that the first 8 bit of the received data are taken into the memory from the shift register 62. At the end of sixteen clock counts from the counter 61 the OR gate G33 provides another "shift in" pulse to the memory 63 to take the next eight received data bits in the terminal broadcast into the memory from the shift register 62. When the full sixteen bit terminal broadcast is in the memory a ready signal is provided which advises the CPU 11 that the received terminal broadcast is ready to be read. The CPU calls the terminal broadcast from the memory by selecting a negative AND gate G34 and providing a CPU read signal thereto. The select and read signals provide an output from the negative AND gate G34 which causes the memory to transmit onto the CPU data bus the first received eight data bits followed by the second received eight data bits. The entire terminal broadcast is thereby transmitted to the CPU 11.

With reference to the circuit diagram of FIG. 28A a ready-to-transmit signal RT is received from a user data source and coupled to one input of a negative OR gate G37. A user transmit enable signal TCB7 (from the terminal control port circuit of FIG. 20A) is also coupled to an input of the gate G37. An overrun timer 64 has an output which is in a high state when the timer is not enabled. The timer output also is in a high state after it is enabled until it times out. The time out period for the timer is set to define the maximum transmission time which may be allowed for a user transmission. Consequently, the user may send a message consuming any amount of time within this predetermined maximum period. When the signals RT, TCB7 and timer output are present, the output of the gate assumes a logical high state providing a user ready signal and removing the preset for a flip-flop FF9. The user ready signal is utilized by the access window capture logic described hereinbefore in conjunction with FIG. 24. After the access window is captured (through the operation of the circuit of FIG. 24) the signal $\overline{SM}$ goes to a low logical state. This signal is inverted by an inverter I17 and coupled to the K input of FF9. A signal $\overline{SW\ OVER}$ goes to a low logical state at the end of the SM function code and is coupled to the clock input of FF9. The low going edge of this clock signal provides a logical high signal at the $\overline{Q}$ output of FF9 to provide the signal ET which is an indication that a user transmission is coming onto the bus. The $\overline{Q}$ high signal is also inputed to the overrun timer 64 as the enable signal and internal clock pulses begin the timer count. As long as the enable or ET signal does not remain for a time longer than the maximum time allowed for any user transmission, the output from the timer will remain in a logical high state. The $\overline{Q}$ output from FF9 is also input to a three input AND gate G35. A flip-flop FF10 has a Q output present to a logical high state which is also input to the gate G35. The gate G35 is therefore enabled to pass the internal clock signal through the AND gate as the signal CT. The clock signal is returned to the transmit user interface logic as clock signal CI which is in phase with user data DT. The ET signal is also input to a NAND gate G38 so that the inverse of the user data DT is provided at the output thereof. The inverted user data is coupled to the multiplexer 59 in the user/supervisory data circuit of FIG. 26 to be utilized as described hereinbefore.

The user ready signal when set to a logical high together with a normally high $\overline{MW\ RST}$ signal is input to a negative OR gate G36. This provides a logical high output from the gate which removes the preset from flip-flop FF10. The Q output of the flip-flop remains in a logical high state in this condition and will only be changed by a clock input (the falling edge thereof). The signal triggers a one-shot device 66 to rise to a logical high state at the clock input of FF10. The one-shot period is longer than a clock period (CI) so that the one-shot output remains in a high state as long as CI is present. At the end of a user transmission the signal RT is removed and the signal ET is therefore removed and the clock signal is blocked at the AND gate G35. The circuit of FIG. 28A thereby completes its specific function for this message transmission. However, if the intramessage gap is required, the signal RT is not removed. At that time the user data source breaks the path between CT and CI and the one-shot 66 times out. Flip-flop FF10 is clocked on the falling edge of the one-shot output causing the Q output to go low. The clock signal through the AND gate G35 is thereby blocked and the low going state at the Q output of FF10 provides a $\overline{IG}$ signal which is an indication that an intramessage gap is occurring. The signal ET remains since the signal $\overline{SM}$ is present for the entire duration of a SM and IG message. The $\overline{IG}$ signal is provided to the transmit sequence logic (FIG. 32) for purposes to be hereinafter described and is also provided to the user/supervisory data logic of FIG. 26 for purposes hereinbefore described. As a consequence instead of an end of transmission (EOT) being generated as a function code, an intramessage gap (IG) is generated as a function code so that bus access is retained by the terminal and the user associated therewith.

With reference now to the timing diagram of FIG. 28B the manner in which bus retention is accomplished as described immediately hereinbefore will be discussed. The signal RT is generated at time t1 after which the signal ET is generated at a later time t2. One-half cycle later the clock signals CT and CI occur at time t3. Also at time t3 the output from the one-shot 66 occurs and remains until the last clock pulse in the SM message plus the one-shot period (of arbitrary length) which is shown in FIG. 28B as extending from t4 through t5. When the one-shot output falls, the Q output of flip-flop FF10 which is the signal $\overline{IG}$ also falls at time t5. Thus, an intramessage gap function code IG is generated by the circuit of FIG. 26 and access to the bus is retained. A signal $\overline{MWRST}$ is provided at time t6, which is a low going signal causing the negative OR gate G36 to preset flip-flop FF10 so that the Q output again assumes a high logical state, the signal $\overline{IG}$ is removed (set back to a high state) and the transmission of the intramessage gap message ensures in the same manner as described hereinbefore for a start of message communication.

FIG. 29 shows the TLU transmit logic in block form having input signals QB5, OL-A and IAW to a loop access logic 67 for channel A and having inputs QB6, OL-B and IAW to a loop access logic 68 for channel B. The two loop access logic circuit sections also have a loop select input as indicated. The QB5, QB6 and IAW are obtained from the circuit of FIG. 20A, and the signals OL-A and B are obtained from the circuit of FIG. 25A. The loop select signal is either the signal TCB 2 (channel B) or $\overline{TCB2}$ (channel A) also obtained from the circuit of FIG. 20A. The user ready signal is obtained from the circuit of FIG. 28A as hereinbefore described. A loop close logic circuit segment 69 receives the signals SM, IG or EOT from the function decoder circuit of FIG. 21. The loop access logic segments 67 and 68 provide an open loop A ($\overline{GO}$ A) and an open loop B ($\overline{GO}$ B) signal respectively. A framing signal generator 71 provides the internal frame signal and the QB 5 and QB6 reset signals. The internal frame signal is utilized by several of the circuits described hereinbefore while the QB5 and QB6 reset signal is provided as an input to the terminal control port circuit of FIG. 20A to remove the signals which indicate that a terminal broadcast is ready to be transmitted. A supervisory data counter circuit 72 is included in the TLU transmit logic providing a switchover (SW OVER) signal which controls the multiplexer 59 for providing user data or supervisory data at the output of the circuit of FIG. 26. Transmit sequence logic 73 is shown which affords control signals for other segments of circuitry in the TLU transmit logic portion of the multiplex terminal.

Turning now to FIG. 30 a description of the loop access logic for either channel A or channel B (Items 67 and 68 respectively) is shown. FIG. 30 shows a single channel of loop access logic which is duplicated for the other channel as indicated in FIG. 29. It may be noted that several additional inputs are present in FIG. 30 over those shown to the loop access logic circuits of FIG. 29. These additional inputs are in the nature of control support signals and are left out of the FIG. 29 block diagram for purposes of clarity. A diagnostic mode signal ($\overline{DIAG}$) is delivered through an inverter I18 to the K input of a flip-flop FF11. A TB ready signal (QB5 for channel A or QB6 for channel B) is coupled through an inverter I19 to the clock input of FF11. Thus, when the terminal is in the diagnostic mode and a terminal broadcast is ready for transmission, the Q output of FF11 goes low causing a high logical state to appear at the output of a negative NOR gate G39. The output of G39 is coupled to the K input of a flip-flop FF12 which is clocked through by the next internal clock pulse as a logical low state at the Q output of the flip-flop. This low state is coupled to the input of a negative NOR gate G40 which provides a logical high to the K input of a flip-flop FF13 which on the next clock pulse provides a logical low at the Q output thereof. This low signal is the transmit access signal ($\overline{GO}$) which functions to open the transmission path 10a or 10b (FIG. 9) at the multiplex terminal so that the terminal may transmit on the path.

When the controller terminal in the diagnostic mode wants to go from the diagnostic to the user access mode the signals IAW (TCB3) and either TCB2 or $\overline{TCB2}$ from the terminal control port circuit of FIG. 20A are provided to the inputs of a NAND gate G41. When these two inputs are present (an access window is being initiated and this channel is selected for transmission) the gate G41 provides a logical low output which is input to the gate G39 providing a logical high output therefrom. The access signal ($\overline{GO}$) is thereby generated as described hereinbefore through the flip-flops FF12 and FF13 and the gate G40.

In the user access modes when the circuit of FIG. 30 is in the primary channel (the channel carrying user data), and an access window has been sensed by the circuit of FIG. 25A and captured, the signal OL (FIG. 25B) is clocked through as a logical low at the output of a flip-flop FF14 by the inverted received clock signal $\overline{XC}$. A logical low is thereby provided from the Q output of FF14 to one input of the negative NOR GATE G39 and the access signal ($\overline{GO}$) is generated as described before.

When the terminal is in the user access mode and the circuit of FIG. 30 is in the secondary channel (the channel which does not carry user data) then the access signal from the alternate channel (the channel carrying user data) is input to a negative AND gate G42. $\overline{TB}$ signal is also input to the gate G42 together with the inverse of the TB ready signal QB5 or QB6 as appropriate. Thus, when the alternate channel loop is opened for transmission, when the alternate channel is selected to transmit a terminal broadcast and when a terminal broadcast is ready to be transmitted in the channel, a logical low output is provided from the gate G42 which is coupled to one input of the negative NOR gate G40. This provides a logical high state at the output of G40 which produces the access signal $\overline{GO}$ on the next internal clock pulse as described before. When the loop is to be reclosed after any of the aforementioned four ways of opening the loop for transmission, a loop close signal is provided to the J inputs of the flip-flops FF12 and FF13 so that the access signal $\overline{GO}$ is returned to a high state on the succeeding internal clock (INT CLK) pulse.

With reference now to FIG. 31 of the drawings the circuitry for the transmit sequence logic 73 of FIG. 29 will be described. This circuit determines the transmit priority for terminal broadcasts, user data messages and end of transmission messages. A table 74 is shown in FIG. 31 which shows the priority as; 1, terminal broadcasts (TB); 2, user data messages (SM); and 3, end of transmission messages (EOT). It should be noted that when the $\overline{GO}$ signal from the loop access logic for either channel is present at the input to a negative OR gate G42 a terminal transmit signal ($\overline{TT}$) is provided from the circuit of FIG. 31 which is utilized as a control signal in a number of other circuits described herein when the transmission path 10a or 10b is opened preparatory to transmission of messages thereon. Also when the loop access signal for either channel A or channel B is present at gate G42 a flip-flop FF15 is clocked to produce the low logic state established by the ground at the J input at the Q output. This low logic state from FF15 is coupled to one input of a programmable read only memory (PROM) 76. When a terminal broadcast is ready to be transmitted along either channel A or channel B as indicated by signals QB5 or QB6, the output of a NOR gate G43 is indicative thereof and is also coupled to one of the inputs of the PROM. The output from the gate G43 is also used as a clocking pulse for a flip-flop FF16 which clocks a signal through to the Q output thereof which indicates that a terminal broadcast is ready and on hold. This last mentioned signal is also coupled to one of the inputs of the PROM 76. The user ready signal from the circuit of FIG. 28A, the transmit user interface logic, is also an input to the PROM. The bit TCB4 from the terminal control port of FIG. 20A is another input to the PROM. A sixth input to the PROM is the signal TB which is an indicator of a terminal broadcast being transmitted.

The $\overline{MW}$ $\overline{RST}$ signal is coupled to the clock input of the flip-flop FF17 and provides an indication that a transmission is over and that therefore a next type of transmission in the priority table 74 may be selected. An ET monitor signal $\overline{ET}$ $\overline{MON}$ is input to a flip-flop FF18 to indicate that a user data transmission is completed so that an end of transmission (EOT) message may then be selected as indicated by the priority table 74. The program read only memory 76 is set to provide the desired priority of transmissions to the inputs of a latch 77 so that an appropriate signal $\overline{TB}$, $\overline{SM}$ or $\overline{EOT}$ will be latched through to the output of the latch and subsequently delivered to the user/supervisory data logic of FIG. 26 to provide the appropriate function code as described hereinbefore. The latching pulse for the latch 77 is obtained by any low signal appearing at one of the inputs of the negative NOR gate G44 which is clocked through the D type flip-flop FF19 by the internal clock signal as shown. The inverse of the latching pulse is provided at the $\overline{Q}$ output of FF19 as a frame generator start signal $\overline{FGST}$. The K inputs for the flip-flops 16, 17 and 18 are provided by the indicated ones of the outputs from the latch 77.

With reference to FIG. 32 of the drawings the loop close logic section 69 of FIG. 29 will be described. The purpose of the loop close logic is to provide an indication for both channels of when the loop may be closed following a transmission. The reason for having this circuitry is that a sufficiently long period of time must be allowed following transmission before the loop is closed to insure that all transmitted framing signals are removed from the bus with the exception of the one associated with the EOT function code. This must be done so that ambiguous frame signals do not circulate forever on the bus. This time period, however, must be short enough that a succeeding transmission by another terminal or the circulation of the access window is not impeded. Counters 78 and 79 are enabled by the occurrence of the terminal transmit ($\overline{TT}$) signal from the transmit sequence logic of FIG. 31. This signal indicates that one or both of the loops 10a or 10b has been opened for transmission onto the bus. A gate G45 provides a high going pulse for each framing signal associated with a terminal broadcast transmission and a gate G46 provides a similar pulse for all start of message and intramessage gap transmissions. Note that $\overline{SM}$ is active for both types of transmissions. These two signals are fed to an OR gate G47 which provides a pulse signal to the counter 79 whenever a framing signal associated with a TB, SM or IG function code is transmitted onto the bus. When these transmissions traverse the loop and are received by the function decoder logic (FIG. 21) an indication of each type of transmission (RX TB, RX SM or RX IG) is fed to an OR gate G48. The output of G48 therefore has a rising edge each time one of these function codes is detected and provides a clocking signal for the counter 78. Note that transmission or detection of the EOT function does not increment counter 79 or 78.

The outputs of counters 79 and 78 in FIG. 32 are provided as inputs to a comparator 81. When the output of counter 78 is the same as that of counter 79, the comparator output signal goes low. This condition indicates that all framing signals exclusive of the one associated with the EOT message and the access window which have been transmitted onto the bus have been received and that it is safe to close the loop. This is the normal means of closing the loop.

A backup loop closing mechanism is shown in FIG. 32 in the form of a counter 82. The counter 82 allows the loop to be closed after a predetermined time period in the event a transmitted framing signal does not completely traverse the loop. In this case the output of comparator 81 will never go active as in the case where the data bus should become broken during a transmission. Counter 82 is reset by a gate G49 whenever the output of the comparator 81 goes low or whenever a framing signal ($\overline{INT}$ $\overline{FRM}$) is transmitted onto the bus. Counter 82 counts the internal clock pulses when both of the signals are high. Therefore, it can be seen that counter 82 will provide an output signal which is a loop close time out, whenever the output of comparator 81 does not occur within a predetermined time period (as set into counter 82) after the occurrence of a framing signal. The loop close time out signal from the counter 82 and the output from the comparator 81 are provided as inputs to a gate G50. The output of G50 is a signal which indicates that the loop may be closed either due to the normal loop closing mechanism or due to the backup mechanism just described if there are no more transmissions to be placed on the bus.

The output of a negative NOR gate G51 causes the loop access logic of FIG. 30 to close the loop. This output (LCLS) is activated in one of three ways as determined by the inputs to gate G51. When the terminal is in the diagnostic mode of operation, the loop closing signal comes from a NAND gate G52. The output of this gate goes active (logically low) when the multiplex terminal is in the diagnostic mode and it has no more traffic to transmit as indicated by the $\overline{QEOX}$ signal from the transmit sequence logic of FIG. 31 and the output of gate G50, discussed previously, is high.

When the multiplex terminal is in the user access mode of operation and the channel under observation is the user data carrying channel (the primary channel) the loop closing signal is the output of a gate G53. This signal becomes low or active when the diagnostic mode is not indicated, when the EOT function code and the access window have been transmitted onto the bus (indicated by the ENDX signal from the supervisory data counter logic of FIG. 33), when bit TCB2 from the terminal control port of FIG. 20A indicates that the channel under observation is the primary channel, and when the output of gate G50 is high.

When the terminal is in the user access mode of operation and the channel under observation is not the user data carrying channel (the alternate channel), the loop closing signal to gate G51 is the output of a NAND gate G54. This signal becomes active (low) when the diagnostic mode is not indicated, when bit TCB2 from the terminal control port of FIG. 20A indicates that the channel under observation is a secondary channel, when a terminal broadcast is not being transmitted and a hold state is not in effect as determined by a gate G55 with input signals $\overline{TB}$ and $\overline{QHOLD}$ from the transmit sequence logic of FIG. 31, and when the ouptut of gate G50 is high.

With reference now to FIG. 33 of the drawings a description of the framing signal generator circuit portion 71 and the supervisory data counter logic circuit portion 72 of FIG. 29 will be undertaken. The purpose of the framing signal general 71 is to produce a framing signal when the terminal is about to transmit. The framing signal denotes the beginning of a TB, SM, IG or EOT transmission. A negative OR gate G56 has as its inputs the $\overline{FGST}$ signal from the transmit sequence logic circuit of FIG. 31 and the $\overline{IG}$ signal from the transmit user interface logic of FIG. 28A. The former signal indicates that a TB, SM, or EOT transmission is to occur. The latter signal indicates that an IG transmission is to occur. Therefore, the output of the gate G56 indicates that a framing signal should be generated in anticipation of the upcoming transmission.

The output of gate G56 is the clock input to a flip-flop FF20. When clocked, the Q output of FF20 goes low and is the serial input to a shift register 83. One internal clock period after this serial input goes low, the QA output of the shift register 83 goes low, which presets FF20 and causes the Q output of the flip-flop (and therefore the shift register serial input) to return to the high logical state. On the succeeding internal clock pulse the QA output of the shift register 83 goes high and the QB output goes low. This single low pulse continues through the shift register on succeeding clock pulses to the QC output and then to the QD output. Here the output is defined as the internal frame signal (INT $\overline{FRM}$). Therefore, it can be seen that the internal frame signal is a single low going pulse lasting one clock period which occurs four clock periods after the $\overline{FGST}$ or the $\overline{IG}$ signal goes low.

A negative AND gate G57 in FIG. 33 has as its inputs the internal frame signal from the shift register 83 and the $\overline{TB}$ signal from the transmit sequence logic of FIG. 31. This last-mentioned signal indicates that a terminal broadcast has been selected for transmission. The output of the gate G57 provides the QB5, 6 reset signal and is transmitted to the terminal control port of FIG. 20A to reset bits 5 and 6 of this port which appear as QB5 and QB6 in FIG. 20A. Recalling the discussion of the terminal control port, bit 5 is set by the CPU to indicate that a terminal broadcast is ready for transmission in the A channel and bit 6 indicates the same for the B channel. The QB5, 6 reset signal therefore resets these "TB ready" signals when the framing signal associated with a terminal broadcast transmission occurs.

The purpose of the supervisory data counter logic 72 as shown in FIGS. 29 and 33 is to count the supervisory data bits (function codes and terminal broadcast data) following framing signals in accordance with input signals $\overline{TB}$, $\overline{IG}$, $\overline{SM}$ and $\overline{EOT}$ which indicate whether the transmission is a terminal broadcast, an intramessage gap, a start of message or the end of the transmission respectively. This logic also provides output signals which indicate first whether the supervisory/user data multiplexer 59 of FIG. 26 should select supervisory data or user data during the start of message transmission (SW OVER), second to indicate to the transmit user interface logic circuit of FIG. 28A when the intramessage gap is occurring (MW RST), third to indicate the end of transmission at the end of the terminal broadcast in the diagnoistic operating mode or at the time of the EOT transmission in the user access mode (ENDX) and fourth to show when a user has finished its transmission (ET MON).

A diagram of the supervisory data counter is shown as part of FIG. 33. A counter 84 is reset and begins counting internal clock pulses each time an internal frame pulse is detected. The terminal count is determined by which input signal $\overline{TB}$, $\overline{SM}$, $\overline{IG}$ or $\overline{EOT}$ is set at the time of the internal frame pulse. This terminal frame count signal (END CT) indicates the end of supervisory data transmission onto the bus for the various function codes and has values of 18, 2, 2 and 3 pulses counted respectively for TB, SM, IG and EOT. The end count signal drives three logic elements seen as flip-flops FF21 and FF22 and a one-shot device 86. FF21, like the counter 84, is preset each time an internal frame pulse occurs. This causes its output SW OVER to go to a logic state which in turn causes the user/supervisory data multiplexer of FIG. 26 to select supervisory type information for transmission onto the bus. When the end count occurs from counter 84, the output of flip-flop FF21 changes state and causes the user/supervisory multiplexer to select user data. Note, however, that actual user data transmission only occurs when $\overline{SM}$ is active as described, that is only following a SM or IG function code. For the TB and EOT transmission, the transmit sequence logic of FIG. 31 selects another transmission type or, in conjunction with the loop close logic of FIG. 32, enables the loop to be closed and the TLU to stop transmissions and reenter the relay submode of operation. This latter function occurs in the case after a TB has been transmitted in the diagnostic mode or after an EOT and access window transmission in the user access mode.

The end of the present transmission is indicated by the ENDX signal which is output from an AND gate G58. This output from G58 occurs when $\overline{EOT}$ is active and when SW OVER becomes active, for example, when flip-flop FF21 is toggled by the end count signal. The end count signal also triggers the one-shot 86 which provides a pulse signal $\overline{MWRST}$.

When $\overline{SM}$ is active (an SM or IG function code has been transmitted), the end count signal causes FF22 of FIG. 33 to toggle. The output of this flip-flop, $\overline{ETMON}$, provides an indication that the user is transmitting data onto the bus. This latter signal is one input to a negative AND gate G59. Another input to G59 is provided by the user ready signal from the transmit user interface logic of FIG. 28A which normally indicates whether or not the user has its RT signal set. When the RT signal is removed and ETMON is active, the output of the gate G59 goes low and presets flip-flop FF22. This causes the ETMON signal to become inactive and thereby indicates that the user is finished with its transmission.

According to the present invention an optimum data loop is configured by cooperative action of the programs of the plurality of terminal control microprocessors. These programs include a diagnostic controller algorithm and a cooperative diagnostic follower algorithm. During formation of the loop, one terminal performs the diagnostic controller algorithm while all other terminals in the system perform diagnostic follower algorithms. The diagnostic controller temporarily assumes the role of system controller and defines "time slots" for synchronous bilateral communication with follower terminals using the diagnostic mode of operation. The diagnostic mode of control is necessary because a loop may not initially exist, while the synchronous "time slots" prevent the various terminals from interfering with one another. After a loop has been defined and each of its member terminals properly configured, an access window is inserted into the loop by the diagnostic controller terminal and all terminals switch to user access mode operation for communication of user data.

During diagnostic mode operations, the terminals assume the four diagnostic mode configurations listed in the first four lines of Table 1 (FIG. 34). Upon completion of the diagnostic mode algorithm, each terminal assumes one of the eight user access mode configurations listed in Table 1 and enters the user access mode. All configurations in Table 1 have been previously discussed in reference to FIGS. 11 through 17. FIG. 35 discloses a logical flow chart of the diagnostic controller algorithm and FIG. 36 discloses a logical flow chart of the diagnostic follower algorithm. The purpose of these cooperative algorithms is to permit each terminal to identify its appropriate user access mode configuration for formation of an optimum data loop using available resources.

FIG. 35 discloses a wake up entry and a "status change" entry to the diagnostic controller algorithm. The "wake up" entry is employed by a terminal upon being initially turned on. The "status change" entry is vectored from the interrupt routine which services the terminal status port. This latter routine examines any change in status signals along with other program data and vectors control to the diagnostic controller algorithm if it concludes that the active data loop has been compromised.

Upon entry, the diagnostic controller algorithm commands the terminal to assume configuration 1, the linear coupled submode of the diagnostic mode (FIG. 11). The algorithm then opens all transmission paths, 10a, 10b and 10c and transmits a special "line clear" terminal broadcast (TB) on all channels which causes all other terminals to enter diagnostic follower algorithms which will be described in conjunction with FIG. 36 hereinafter. It then resets its clock so that it will receive program interrupts (ticks) every two milliseconds thereafter. Next, the diagnostic controller algorithm examines the channel A TB receive register 26a (FIG. 18) to see if it received its own terminal broadcast ("echo") on channel A. If yes, the A loop is known to be continuous. Accordingly, the algorithm pauses until the next "tick" and then transmits a TB instructing all diagnostic followers to configure an A-loop. Following this transmission the control terminal stores the appropriate control word for entering configuration 3, the A-loop submode of the user access mode (FIG. 13), and awaits the next "tick".

If no TB echo was received on channel A, the diagnostic controller algorithm checks for one on channel B. If an echo was received, it awaits the next "tick" and then sends a special TB instructing all followers to configure a B-loop. It then stores the appropriate control word to assume configuration 4 (FIG. 14), the B-loop submode of the user access mode, and waits for the next two millisecond "tick".

If TB echos were not received on either channel A or channel B, it indicates that neither the A loop nor the B loop is continuous. Accordingly, the controller algorithm of FIG. 35 pauses until the next "tick" and then transmits a special TB instructing all followers to configure a hybrid loop and calls the H-loop subroutine (FIG. 37).

The H-loop subroutine, which will be discussed in detail hereinafter and which is shown in FIG. 37, is used to determine the appropriate hybrid-loop configuration: 5, 5BP, 6, 6BP 7, or 7BP (FIG. 34). If the configuration can be resolved without ambiguity, the subroutine returns in configuration 2 or 2 BP, with the appropriate command word stored, and with a condition flag reset. Otherwise, the flag will be set to denote "invalid conditions". Upon return from H-loop subroutine, the condition flag is checked, as seen in FIG. 35. If conditions are invalid, control is vectored back to the diagnostic controller entry at A. If conditions are valid, however, the command word is checked to see if the user access configuration is a hybrid-interior configuration; 7 or 7BP. If yes, the terminal switches to a linear diagnostic configuration; 1 or 1 BP, respectively.

With the terminal appropriately configured in the diagnostic mode and the appropriate command word stored for assuming the selected user access configuration, the diagnostic controller transmits a status report TB which identifies the particular configurational submode determined above. It then pauses an appropriate number of "ticks" to permit all terminals to respond synchronously. If no responses have occurred after this delay period, the diagnostic controller algorithm aborts the procedure and reenters the algorithm at A in FIG. 35. If one or more responses are received, however, the controller retransmits its status report TB, but with a special bit set to indicate that it is about to assume the user access mode. It then enters the user access mode by placing an access window onto the loop and applying the stored command word to terminal control port 18 (FIG. 18).

FIG. 36 discloses a logical flow chart of the diagnostic follower algorithm that cooperates with the above disclosed diagnostic controller algorithm to configure an optimum data loop from available resources. The diagnostic follower algorithm is entered only upon receiving a "line clear" TB transmitted by the diagnostic controller. Upon entry, the follower terminal assumes configuration 1, thus disabling communications from its user data sources. It resets its clock to be in synchronism with the diagnostic controller's clock. Thereafter, the diagnostic follower algorithm will receive program interrupts at two millisecond intervals ("ticks") in synchronism with the interrupts of the controller algorithm. The follower algorithm then awaits instruction from the controller algorithm.

If an instruction TB does not arrive within 4 "ticks" of the follower's clock, the procedure is aborted and the follower jumps to A of its diagnostic controller algorithm to attempt to configure a loop itself. If an instruction to configure the A loop arrives, a control word appropriate to entering configuration 3 is stored. If an instruction to configure the B loop arrives, the control word appropriate to entering the configuration 4 is stored. If the instruction from the controller is to configure a hybrid loop, the follower calls the H-loop subroutine (FIG. 37) just as does the diagnostic controller algorithm.

As disclosed above with reference to the diagnostic controller algorithm, H-loop subroutine returns with a condition flag set to indicate invalid conditions. If conditions are valid, the flag will be reset, the terminal will be in diagnostic configuration 2 or 2b and the command word for assuming the appropriate user access configuration will be stored.

Upon returning from H-loop, the diagnostic follower algorithm (FIG. 36) first checks the condition flag. If the flag is set, the diagnostic follower algorithm is aborted and control is vectored to the entry to the diagnostic controller algorithm at A of FIG. 35. If the flag is clear, the algorithm next checks the stored command word and causes the terminal to assume configuration 1 or 1BP when the selected user access configuration is 7 or 7BP, respectively.

With the follower terminal appropriately configured in the diagnostic mode and with the command word stored for assuming the appropriate user access configuration, the diagnostic follower terminal transmits its status report TB identifying this particular submode. In doing so, the follower terminal remains in the diagnostic mode and transmits on the particular "tick" determined by subtracting the controller terminal's identification number from its own identification number. Each terminal therefore transmits synchronously during its own "time slot". This procedure avoids interference between transmissions of the various terminals.

After transmitting a status report as seen in FIG. 36, the follower waits for the diagnostic controller's next transmission. If it doesn't arrive within a given number of "ticks" or if it arrives but doesn't have the bit set that indicates that the controller is about to enter the user access mode, the diagnostic follower algorithm is aborted and the program jumps to the diagnostic controller algorithm at A in FIG. 35. Otherwise, the follower terminal enters the user access mode by applying the stored command word to terminal control port 18 (FIG. 18).

FIG. 37 shows a logical flow chart of the H-loop subroutine called by both diagnostic controller and diagnostic follower algorithms in the event of faults in both the A-loop and the B-loop. The purpose of this subroutine is to determine what transmission paths are available and to use these resources to define a hybrid loop consisting of an A-end (configuration 5) a B-end (configuration 6), and one or more hybrid-interior terminals (configuration 7). At least one terminal in the hybrid loop will be in a bypass (BP) configuration.

Four general principles are employed in defining a hybrid loop:

1. If the channel A receiving path (ARX) is *bad*, the terminal will become a B-end terminal (configuration 6).
2. If the channel A receiving path (ARX) and channel A transmitting path (ATX) are both *good*, the terminal will become a hybrid-interior terminal (configuration 7.)
3. Otherwise, the terminal will become an A-end terminal (configuration 5)
4. If the channel B receiving path (BRX) is *bad*, the terminal will use its bypass receiving path (CRX). That is, "BP" will be appended to the configuration number determined in general principle applications 1, 2 or 3.

In addition to these four general principles, there is a fifth special principle that is also employed:

5. Any terminal whose channel C receiving path (CRX) originates at a terminal that has lost both its channel A and channel B transmitting paths (ATX and BTX) will also add "BP" to its configuration number. The purpose of this special procedure is to provide a "lifeline" transmission path for another terminal that has lost both its primary transmission paths and would be otherwise isolated.

With further reference to the flow chart of H-loop subroutine, FIG. 37, one sees that the terminal first assumes configuration 2, the cross-coupled submode of the diagnostic mode. On the next tick of the clock, a terminal broadcast is transmitted on channel A. On the following tick of the clock, a terminal broadcast is transmitted on channel B. The terminal then examines the TBs stored in its two TB-receive registers 26a and 26b.

The results of the above testing procedure are best understood with reference to FIGS. 38 and 39. FIG. 38 shows a block diagram of three sequential terminals disposed in configuration 2. One sees that a TB transmitted on channel A by terminal N will be relayed by terminal N+1 and returned to terminal N on channel B if transmission paths are operational. Also, a TB transmitted by terminal (N+1) on channel B will be received by terminal N on channel B. Thus, when terminal N examines its channel B TB receive register 26b it should find two stored TBs. It should find the "echo" of its own transmission ($E_B$) along with the TB originated by terminal (N+1)($TB_B$) Similarly, when terminal N examines its channel A TB receive register 26a, it should find the "echo" of its own transmission on channel B ($E_A$) along with the TB transmitted by terminal (N−1) on channel A. This assumes that transmission paths are operational.

Table 2 of FIG. 39 summarizes the results of the above testing procedure. The first four columns tabulate the observed results and the last four columns tabulate the conclusions that can be drawn concerning the four primary transmission paths ATX, ARX, BTX and BRX. Note that in seven of the sixteen cases, an "echo" is received but a neighboring TB is not. These results contradict each other and are considered to be invalid. Of the nine valid conclusions, four are unambiguous, and five leave remaining questions concerning the state of a transmission path.

Returning now to the flow chart of FIG. 37, the test results are examined to see if they lead to valid conclusions. If not, a condition flag is set to indicate invalidity and the subroutine returns to the main program.

Assuming that the results are valid, the terminal switches to a cross-coupled bypass configuration 2BP and the test conclusions are examined to see whether the channel A receiving path (ARX FIG. 38) is bad. Note from Table 2 (FIG. 39) that this can be determined unambiguously. If ARX is bad, general principle 1 is invoked. After pausing one clock tick, the command word appropriate to user access configuration 6 (B-end FIG. 16) is stored.

Assuming with reference to FIG. 37, that the ARX path is good, the routine next examines the test conclusions to see whether the condition of the ATX path has been unambiguously determined. If the answer is no, a second test is performed to resolve the question. This is done as follows. With all terminals in configuration 2BP (bypass FIG. 12) a TB is transmitted on channel A at the next tick of the clock. FIG. 40 discloses that this TB will echo back to the channel A TB receive register 26a via a bypass loop which includes ATX, C and ARX. Thus, if the echo is received, general principle 2 is invoked, and the command for configuration 7 (FIG. 17) is stored. If not, general principle 3 is invoked and the command for configuration 5 (FIG. 15) is stored.

If the condition of the ATX path is known without performing the above test, the routine simply pauses until the next tick of the clock and then invokes general principle 2 or 3 to store the command word for configuration 7 or 5 depending upon whether path ATX is good or bad respectively.

After determining the appropriate user access configuration number, the subroutine next examines the test conclusions to see whether the BRX path is bad. Note from Table 2 (FIG. 39) that the condition of BRX is determined unambiguously. If BRX is found to be bad, general principle 4 is invoked. The stored command word is thus modified to that of a bypass configuration.

Finally, as shown in FIG. 37, the special case of a terminal that has lost both of its primary transmission paths is treated. If both ATX and BTX are bad, the terminal sends a TB on its CTX transmission path. Otherwise, it simply pauses one clock tick. At this point, all terminals are still disposed in a bypass configuration, 2BP. All terminals check to see whether they received a TB on their bypass receiving path CRX. If yes, special principle 5 is invoked. The stored command word is modified to indicate a bypass user access configuration and the subroutine returns to the main program. Note that the terminal configuration upon returning is diagnostic configuration 2BP for this exit.

If the TB is not received on path CRX, the subroutine checks the stored command word to see if it requests a bypass configuration. If no, the terminal configuration is changed to configuration 2 before returning. If yes, the configuration is left at 2BP. One sees that in all cases, the diagnostic mode configuration upon returning from the H-loop subroutine agrees with the selected user access configuration in regards to bypass.

The utility of the disclosed invention as well as the effectiveness of the above described hybrid-loop algorithm can be appreciated by referring to FIGS. 41 through 44. Each of these figures discloses a multiterminal system wherein two faults have occurred; one to transmission path A and one to transmission path B. In three of these four cases, serious degradation of communications would occur if complementary redundant data paths were simply utilized alone without bypass architecture.

FIG. 41 shows a system wherein the two faults occur at widely separated points. Without bypass architecture, the terminals adjacent to each fault must cross-couple. Terminals 7 and 2 would become the A-end and B-end, respectively, of a hybrid loop consisting of terminals 7, 8, 1, and 2. Similarly, terminals 3 and 6 would become the A-end and B-end, respectively, of a hybrid loop consisting of terminals 3, 4, 5, and 6. The two hybrid loops would function autonomously, but would not be able to intercommunicate.

With bypass architecture and the disclosed algorithm, the situation is quite different. Terminal 7 has lost its ATX path and assumes an A-end configuration by virtue of principle 3. Terminal 6 has lost its ARX path and assumes a B-end configuration by virtue of principle 1. All other terminals assume hybrid interior configurations by virtue of principle 2. In addition, terminal 3 has lost its BRX path and therefore switches to its bypass receiving path CRX(C). One sees that a hybrid loop is thereby formed that includes all eight terminals.

FIG. 42 shows a system wherein the two faults are in the primary transmission paths of a single terminal, terminal 2. Without bypass architecture, terminal 2 would be isolated from the remainder of the system. A hybrid loop would be formed with terminals 3 and 1 performing the functions of A-end and B-end, respectively. The terminals in the hybrid loop would not be able to communicate with terminal 2, however.

With bypass architecture and the disclosed algorithim, the situation again is different. Terminal 2 has lost its ATX path and assumes an A-end configuration by virtue of principle 3. Terminal 1 has lost its ARX path and assumes a B-end configuration by virtue of principle 1. All other terminals assume hybrid interior configurations by virtue of principle 2. Terminal 3 has lost its BRX path and switches to bypass path CRX (C) by virtue of principle 4. In addition, since terminal 2 has lost both its primary transmission paths, terminal 4 will switch to the "lifeline" bypass path C'RX (C') by virtue of special principle 5. A hybrid loop is thereby formed utilizing bypass path C' and including all terminals. Note that bypass path C is simply unused. Terminal 1 sends no data to terminal 3 on this path and, even if it did, the data from terminal 1 would be ignored by terminal 4. Data from terminal 3 is seen to be transmitted on the A loop via terminal 2 to terminal 4 and onward throughout the system.

FIG. 43 shows a system wherein the two faults are in the primary receiving paths of a single terminal, terminal 2. Without bypass architecture, terminal 2 would again be isolated from the remainder of the system. As in the case of FIG. 42, a hybrid loop would form involving the remaining terminals, but these terminals would be unable to communicate with terminal 2.

With bypass architecture, the situation is once again quite different. Terminal 3 has lost its ATX path and assumes an A-end configuration by virtue of principle 3. Terminal 2 has lost its ARX path and assumes a B-end configuration by virtue of principle 1. All other terminals assume hybrid interior configurations by virtue of principle 3. In addition, terminal 2 has lost its BRX path and switches to bypass path CRX (C) by virtue of principle 4. One sees that a hybrid loop is thereby formed that includes all eight terminals.

Finally, FIG. 44 shows a system wherein both faults occur between the same pair of terminals. In this one particular case, total communication can still be maintained by just the complementary redundancy alone without introducing bypass architecture. However, the bypass architecture along with the disclosed algorithm will also serve to maintain total communications.

Without bypass architecture, terminals 4 and 5 would both cross-couple to form a hybrid loop which includes all terminals. With bypass architecture, according to the disclosed algorithm, terminal 5 becomes the A-end by virtue of principle 3. Terminal 4 becomes the B-end by virtue of principle 1. All other terminals become interior terminals by virtue of principle 2. Terminal 5 switches to its bypass receiving path C by virtue of principle 4. A hybrid loop is thereby formed which again includes all terminals as is readily seen in FIG. 44.

We have thus shown that the disclosed bypass architecture invention significantly improves the survivability of a multi-terminal active data bus in the event of damage to transmission paths at a multiplicity of locations. Although the specific case of a single bypass channel which skips over the next adjacent terminal has been described, it should be clear that the invention is not limited to that specific geometry. In particular, additional bypass channels that convey data in the opposite direction or that skip over more than one terminal are also possible.

While the bypass architecture disclosed herein is described in conjunction with an asynchronous data bus for purposes of disclosing the best mode known, it should be understood that such system architecture is equally adaptable to a synchronous data bus such as disclosed in U.S. Pat. No. 4,486,852, issued Dec. 4, 1984, Champlin et al, for a Synchronous Time Shared Data Bus or a synchronous/asynchronous data bus such as disclosed in copending patent application Ser. No. 579,612, filed Feb. 13, 1984.

Although the best mode contemplated for carrying out the present invention has been herein shown and described, it will be apparent that modification and variation may be made without departing from what is regarded to be the subject matter of the invention.

What is claimed is:

1. A loop-structured data communications bus serving a plurality of user data sources and sinks which are linked thereto, comprising
   a plurality of multiplex terminals in communication with ones of the system user data sources and sinks,
   at least three receivers in each of said terminals,
   at least three transmitters in each of said terminals,
   means within each of said terminals for controlling coupling of any one of said receivers in a terminal with any one of said transmitters in the same terminal,
   first and second redundant transmission paths extending between each of said terminals and coupling first and second ones of said transmitters in one terminal with first and second ones of said receivers in one other terminal, whereby said plurality of terminals are serially connected in a closed loop, and
   at least one bypass transmission path extending between a third one of said transmitters in one terminal and a third one of said receivers in non-adjacent ones of said serially connected terminals.

2. A data communications system as in claim 1 wherein said one terminal and said non-adjacent terminal between which said bypass transmission path extends are alternate ones of said serially connected terminals.

3. A data communications bus as in claim 1 wherein said multiplex terminals comprise means for detecting change in system status, and
   means responsive to said means for detecting for selecting data on said bypass path for transmission to user data sinks.

4. A data communications bus as in claim 1 wherein said multiplex terminals comprise a central processing unit, and
   means responsive to said central processing unit for selecting data on said bypass path for inspection by said central processing unit, so that data indicative of system status may be obtained.

5. A data communications bus as in claim 1 wherein said multiplex terminals comprise means for coupling said bypass transmission path thereto so that said bypass path supplements said second redundant transmission path.

6. A data communications bus as in claim 1 wherein said multiplex terminals comprise means for coupling said bypass transmission path thereto so that said bypass path supplements said first redundant transmission path.

7. A data communications bus as in claim 1 wherein said at least one bypass path comprises first and second bypass paths, and wherein said multiplex terminals comprise means for coupling said first and second bypass paths so that they supplement said first and second redundant transmission paths respectively.

8. A method of diagnosing faults in a communication system having a plurality of multiplex terminals arrayed serially and adapted to service user data sinks and sources, each multiplex terminal containing a plurality of transmitters and a plurality of receivers, comprising the steps of
   selecting a controller terminal,
   coupling first and second transmitters in each terminal to first and second receivers in each adjacent terminal in the series, thereby forming first and second continuous data channels,
   coupling a third transmitter in each terminal to a third receiver in each alternate terminal in the series, thereby forming a continuous by-pass data channel,
   transmitting first controller instruction data from the first transmitter in the control terminal on the first data channel,
   configuring a closed loop transmission path for user data utilizing all tramsmitters and receivers in the first continuous data channel if the controller terminal receives the first controller instruction on the first data channel,
   transmitting second controller instruction data from the second transmitter in the control terminal on the second data channel if the first controller instruction is not received on the first data channel,
   configuring a closed loop transmission path for user data utilizing all transmitters and receivers in the second continuous data channel if the controller terminal receives the second controller instruction on the second data channel,
   setting a cross coupled mode including coupling the first receiver and the second transmitter in each terminal and the second receiver and the first transmitter in each terminal if the second controller instruction is not received on the second data channel,
   transmitting data from each of the first transmitters in each terminal,
   transmitting data from each of the second transmitters in each terminal,
   listening at the transmitting terminal for an echo of each of the two last mentioned transmissions,
   listening at each terminal for receipt from each adjacent terminal of the two last mentioned transmissions,
   configuring an optimized hybrid loop transmission path for user data if each terminal receives either the transmission echoes or the transmissions from adjacent terminals at the second receiver, connecting the third transmitter in parallel with the second transmitter and the third receiver in parallel with the second receiver, transmitting data from each of the first transmitters in each terminal where neither the transmission echoes nor the transmissions from adjacent terminals are received at the second receiver, configuring an optimized hybrid transmission path for user data including selection of cross coupled mode at each terminal where the last mentioned transmission is not received at the second receiver, transmitting data from each of the third transmitters in each terminal where the transmission echoes are not received at either the first or second receivers, and configuring an optimum hybrid transmission path for user data including selection of reception by the third receiver at each terminal which receives the last mentioned transmission from the third transmitter at another terminal and selection of cross coupled mode in each of the last mentioned transmitting terminals.

9. A data communications system providing intercommunication between a plurality of serially coupled multiplex terminals and a plurality of user data sources and sinks which are connected to ones of the plurality of multiplex terminals comprising, first, second and third transmitters included in each terminal, first, second and third receivers included in each terminal, a first communications path extending between said first transmitter in each terminal and said first receiver in one other terminal, a second communications path extending between said second transmitter in each terminal and said second receiver in one other terminal, a bypass communications path extending between said third transmitter in each terminal and said third receiver in an alternate one of the other serially coupled terminals, and means for configuring an optimum communications path servicing the user data sources and sinks considering available system transmitters, receivers and communication path segments.

10. A data communications system as in claim 9 wherein said means for configuring comprises control means in each terminal, a primary/bypass multiplexer in each terminal coupled to said control means and said second and third receivers, means coupled to said control means for selectively coupling said first, second and third receivers with various ones of said first, second and third transmitters in the same terminal, whereby determination of avaliability of interterminal communications path segments, transmitters and receivers may be made, said control means operating to configure the system optimally following said determination.

11. A data conmunication bus possessing enhanced survivability in the presence of system faults, comprising a plurality of multiplex terminals in communication with ones of the system user data sources and sinks by means of data links therebetween, a plurality of data receivers in each said terminal, a plurality of data transmitters in each said terminal, means within each said terminal for selectively coupling an output of any said receiver in a terminal with an input of any said transmitter in the terminal, first and second complementary transmission paths extending between each pair of adjacent terminals and interconnecting an output of a first transmitter in a first terminal with an input of a first receiver in an adjacent terminal and an output of a second transmitter in said adjacent terminal with an input of a second receiver in said first terminal thereby serially interconnecting the plurality of terminals in two complementary loops, at least one bypass transmission path extending between a non-adjacent pair of terminals and interconnecting an output of a third transmitter in one terminal with an input of a third receiver in said non-adjacent terminal, and means within each terminal for diagnosing system faults and for responding thereto by commanding said means for selectively coupling so as to cooperatively configure an optimum data loop utilizing available transmission paths.

12. A data communications bus as in claim 11 wherein said non-adjacent pair of terminals comprise terminals separated by a single terminal, and wherein said at least one transmission path comprises a transmission path connected therebetween.

13. A data communications bus according to claim 11 wherein each terminal includes at least three data receivers and at least three data transmitters, and wherein said at least one bypass transmission path comprises a plurality of bypass transmission paths interconnected between an output of a third transmitter in each terminal and an input of a third receiver in another non-adjacent terminal.

14. A data communications bus according to claim 13 wherein each said terminal and each said non-adjacent terminal comprise alternate terminals around said loops, and wherein said plurality of bypass transmission paths comprise transmission paths connected therebetween.

15. A data communications bus according to claim 14 wherein each said bypass transmission path conducts signals in the same general direction as said transmission path interconnecting the output of said second data transmitter to the input of said second data receiver in an adjacent terminal, and wherein the inputs of said second and third data transmitters at each terminal are permanently connected together, said means for selectively coupling including multiplexer means to select one or the other of the outputs of said second and third data receivers.

16. A data communications bus according to claim 11 wherein said means for selectively coupling comprises multiplexer means operating to select one or the other of the outputs of said second and third data receivers, and wherein said means for diagnosing system faults and for responding thereto includes means for commanding said multiplexer means to select the output of said third data receiver in the event of faults in both complementary loops and loss of signal at the output of said second data receiver.

17. A data communications bus according to claim 11 wherein means for selectively coupling comprises multiplexer means operating to select one or the other of the outputs of said second and third data receivers, and wherein said means for diagnosing system faults and for responding thereto includes means for commanding said multiplexer means to select the output of said third data receiver in the event that said third receiver is receiving signals from a third data transmitter at a terminal that has lost use of both said first and second data transmitters.

18. A data communications bus according to claim 11 wherein means for selectively coupling comprises multiplexer means operating to select one or the other of the outputs of said second and third data receivers, and wherein said means for diagnosing system faults and for responding thereto includes means for commanding said means for selectively coupling to couple the output of said multiplexer means to the input of said first data transmitter in the event of faults in both complementary loops and loss of signal at the output of said first data receiver.

19. A data communications bus according to claim 11 wherein said means for diagnosing system faults and for responding thereto includes means for commanding said means for selectively coupling to couple the output of said first data receiver to the combined inputs of said second and third data transmitters in the event of faults in both complementary loops along with a fault in the transmission path emanating from the output of said first data transmitter but no fault in the data path terminating at the input of said first data receiver.

20. A data communications bus according to claim 11 wherein means for selectively coupling comprises multiplexer means operating to select one or the other of the outputs of said second and third data receivers, and wherein said means for diagnosing system faults and for responding thereto includes means for commanding said means for selectively coupling to couple the output of said first data receiver to the input of said first data transmitter and the output of said multiplexer means to the combined inputs of said second and third data transmitters in the event of faults in both complementary loops along with no faults in either the data path emanating from the output of said first data transmitter or the data path terminating at the input of said first data receiver.

21. A data communications bus as in claim 11 wherein said means for diagnosing system faults and for responding thereto comprises means for configuring one of said multiplex terminals as a controller terminal and for directing the operation of the same means at all other terminals.

22. A survivable active data communications system providing communication between a plurality of user data sources and sinks, comprising
a plurality of active multiplex terminals interfaced to said sources and sinks and serially arranged in a loop,
first and second data transmitters included in each terminal,
first and second data receivers included in each terminal,
a plurality of first transmission path segments interconnecting first transmitter outputs and first receiver inputs at adjacent terminals around said loop in one direction,
a plurality of second transmission path segments interconnecting second transmitter outputs and second receiver inputs at adjacent terminals around the loop in the other direction,
a third data transmitter included in at least one terminal,
a third data receiver included in at least one other non-adjacent terminal,
at least one third transmission path segment interconnecting a third transmitter output and a third receiver input at non-adjacent terminals,
means for selecting data receivers and data transmitters at each terminal to form a user access terminal configuration, and
means at each terminal for analyzing system faults and for controlling said means for selecting so as to form an optimum data loop in cooperation with other terminals.

23. A survivable active data communications system according to claim 22 wherein each terminal includes a third data transmitter and a third data receiver, said at least one third transmission path comprising a plurality of third transmission path segments interconnecting the output of each of said third transmitters with the input of one of said third receivers at another non-adjacent terminal.

24. A survivable active data communications system according to claim 23 wherein said third transmission path segments conduct data in the same direction as said second transmission path segments, and wherein said non-adjacent terminals comprise alternate terminals around said loop.

25. A survivable active data communications system according to claim 22 wherein said second and third transmitters emit the same data signals and said means for selecting includes multiplexer means operating to select data received by either said second receiver or said third receiver.

26. A survivable active data communications system according to claim 25 wherein said means for analyzing system faults commands said multiplexer means to select said third receiver in response to a fault in a first transmission path segment anywhere in the system and a fault in the second transmission path segment terminating at the terminal's second receiver.

27. A survivable active data communications system according to claim 25 wherein said means for analyzing system faults comprises means for commanding said multiplexer means to select said third receiver if the signals arriving at said third receiver emanate from a third transmitter at a terminal having faults in the two transmission path segments connected to its first and second transmitters.

28. A survivable active data communications system according to claim 25 wherein said means for analyzing system faults comprises means for commanding said means for selecting to select said first transmitter and the receiver selected by said multiplexer means in response to a fault in a second transmission path segment anywhere in the system and a fault in the first transmission path segment terminating at the terminal's first receiver.

29. A survivable active data communications system according to claim 25 wherein said means for analyzing system faults comprises means for commanding said means for selecting to select said first receiver and said second and third transmitters in response to a fault in a second transmission path segment anywhere in the system and a fault in the first transmission path segment connected to the terminal's first transmitter but no fault in the first transmission path segment connected to the terminal's first receiver.

30. A survivable active data communications system according to claim 25 wherein said means for analyzing system faults comprises means for commanding said means for selecting to interconnect said first receiver with said first transmitter and to interconnect the receiver selected by said multiplexer means with said second and third transmitters in response to faults in both first and second transmission path segments anywhere in the system but no faults in the two first transmission path segments connected to the terminal.

31. A survivable active data communications system according to claim 22 wherein said means for analyzing system faults comprises means for configuring one of said multiplex terminals as a controller terminal and for directing actions taken by the same means at other terminals.

32. A method of configuring a closed loop communications system having first and second complementary redundant data transmission paths extending between a plurality of serially coupled multiplex terminals and a bypass data transmission path extending between non-adjacent ones of the multiplex terminals when various ones of the data transmission paths experience faults, the multiplex terminals having data receivers coupled with data transmitters in each data transmission path, and having A-end, B-end, hybrid interior and bypass configuration capabilities, comprising the steps of
   determining the location of the faults in the data transmission paths,
   arranging a terminal in the B-end configuration if a fault exists in the first data transmission path connected to the first path terminal data receiver,
   arranging a terminal in the hybrid interior configuration if no faults exist in the first data transmission path connected to the first path terminal data receiver and transmitter,
   arranging the terminal in the A-end configuration if a fault exists in the first data transmission path connected to the first path terminal data transmitter, and
   arranging the terminal in the bypass configuration if a fault exists in the second data transmission path connected to the second path terminal data receiver.

33. A method as in claim 32 further comprising the step of arranging the terminal in the bypass configuration if the bypass transmission path connected to the bypass path terminal data receiver originates at a non-adjacent terminal having faults existing in both first and second data transmission paths connected to the first and second terminal data transmitters respectively.

34. A loop-structured data communications system serving a plurality of user data sources and sinks, comprising
   a plurality of multiplex terminals in communication with ones of said user data sources and sinks,
   first, second, and third data receivers and first, second, and third data transmitters in each said multiplex terminal, each said data transmitter and each said data receiver having an input and an output,
   a plurality of first unidirectional transmission path segments operably connecting the output of each said first transmitter to the input of a said first receiver at a different multiplex terminal so as to serially interconnect said plurality of multiplex terminals in a first primary loop,
   a plurality of oppositely-directed second unidirectional transmission path segments operably connecting the output of each said second transmitter to the input of a said second receiver at an adjacent multiplex terminal so as to serially interconnect said plurality of multiplex terminals in a congruent oppositely-directed second primary loop,
   a plurality of third unidirectional transmission path segments directed the same as said second unidirectional transmission path segments and operably connecting the output of each said third transmitter to the input of a said third receiver at a different multiplex terminal, said third transmission path segments bypassing adjacent multiplex terminals of said second primary loop and interconnecting non-adjacent multiplex terminals,
   means within each said multiplex terminal for alternatively selecting the output of either said second receiver or said third receiver,
   means within each said multiplex terminal for alternatively selectively establishing either a linear terminal configuration wherein a first communication path is established between the output of said first receiver and the input of said first transmitter and a second communication path is established between said selected output of one of said second or third receivers and the paralleled inputs of said second and third transmitters, or a cross-coupled terminal configuration wherein a first communication path is established between the ouptut of said first receiver and the paralleled inputs of said second and third transmitters and a second communication path is established between said selected output of said second or third receiver and the input of said first transmitter,
   means within each said multiplex terminal for controllably opening said first and second communication paths to introduce locally generated data to said transmitter input or inputs connected thereto,
   means within each said multiplex terminal for alternatively selecting either said first communication path or said second communication path to communicate with said user data sources and said user data sinks served by said terminal,
   and means within each said multiplex terminal for selectively transferring received data from said selected communication path to ones of said user data sinks and for selectively transferring locally generated data from ones of said user data sources to said means for controllably opening said selected communication path to introduce said locally generated data to said transmitter input or inputs connected thereto.

35. A loop-structured data communications system as in claim 34 wherein said plurality of third transmission paths comprise terminal interconnections whereby said non-adjacent multiplex terminals of said second primary loop are separated by one bypassed multiplex terminal.

36. A loop-structured data communications system as in claim 34 wherein each said multiplex terminal includes logic means for controlling each of said means for alternatively selecting the output of said second receiver or said third receiver, said means for alternatively selecting said first communication path or said second communication path, and said means for alternatively selectively establishing a linear terminal configuration or a cross-coupled terminal configuration.

37. A loop-structured data communication system as in claim 36 wherein said logic means comprise means operably connected to said first and second communication paths for receiving data therefrom and operably connected to said means for controllably opening said first and second communication paths for introducing data thereto, whereby intercommunication between said logic means at different ones of said multiplex terminals is provided.

38. A loop-structured data communications system as in claim 37 wherein said logic means at said plurality of multiplex terminals comprise means for intercommunicating with one another while cooperatively performing a sequence of operations which serves to diagnose system faults and which culminates in the configuration of a continuous data loop utilizing available system resources.

39. A loop-structured data communications system as in claim 38 wherein said means for performing a sequence of operations comprises means for initiating said sequence by one said logic means serving as controlling logic means and means for performing cooperative operations directed by said controlling logic means by all other said logic means.

40. A loop-structured data communications system as in claim 39 wherein said means for performing a sequence of operations includes means for each said multiplex terminal transmitting test messages on said first, second, and third data transmitters and for receiving test messages on said first receiver and alternatively on either said second receiver or said third receiver.

41. A loop-structured data communications system as in claim 40 wherein said means for performing a sequence of operations comprises means for alternately disposing said multiplex terminal in said linear terminal configuration and in said cross-coupled configuration during transmission and receipt of test messages.

42. A method for configuring a continuous data loop in a communication system having a plurality of multiplex terminals arranged in a ring, each said terminal normally capable of bilateral communication with a first nearest neighbor terminal by means of first and second primary receiving and transmitting channels and of bilateral communication with another nearest neighbor terminal by means of second and first primary receiving and transmitting channels and of unilateral communication with a non-nearest neighbor terminal on the same side as said first nearest neighbor terminal by means of a bypass receiving channel and of unilateral communication with a second non-nearest neighbor terminal on the same side as said other nearest neighbor terminal by means of a bypass transmitting channel, comprising the steps of
    testing all elements of said first primary channel throughout the ring and thereafter coupling said first primary receiving and transmitting channels at each said terminal to form an aggregate first primary channel data loop if all said first primary channel elements are found to be operative,
    testing all elements of said second primary channel throughout the ring if one or more of said first primary channel elements is found to be inoperative and thereafter coupling said second primary receiving and transmitting channels at each said terminal to form an aggregate second primary channel data loop if all said second primary channel elements are found to be operative, and
    testing local elements of both first and second primary channels in bilateral communication with each said nearest neighbor terminal of each said terminal if one or more of said first primary channel elements throughout the ring and one or more of said second primary channel elements throughout the ring are both found to be inoperative and thereafter forming an aggregate hybrid data loop comprising elements of both first and second primary channels as well as at least one bypass channel element wherein each member terminal of said aggregate hybrid data loop couples appropriate receiving and transmitting channels according to a set procedure based upon the results of said testing.

43. A method for configuring a continuous data loop as in claim 42 comprising the step of separating each said non-nearest neighbor terminal from each said terminal by one of said nearest neighbor terminal.

44. A method of configuring a continuous data loop as in claim 43 wherein said set procedure for coupling appropriate receiving and transmitting channels at each member terminal of said aggregate hybrid data loop comprises the steps of
    selecting said bypass receiving channel if said local second primary receiving channel is found to be inoperative,
    selecting said bypass receiving channel if said bypass receiving channel communicates unilaterally with a non-nearest neighbor terminal having inoperative local first and second primary transmitting channels,
    selecting said second primary receiving channel if said channel is locally operative and if said bypass receiving channel does not communicate unilaterally with a non-nearest neighbor terminal having inoperative local first and second primary transmitting channels,
    coupling said selected receiving channel to said first primary transmitting channel if said local first primary receiving channel is found to be inoperative,
    coupling said first primary receiving channel to both said second primary transmiting channel and said bypass transmitting channel if said local first primary receiving channel is found to be operative but said first primary transmitting channel is found to be inoperative, and
    coupling said selected receiving channel to both said second primary transmitting channel and said bypass transmitting channel and coupling said first primary receiving channel to said first primary transmitting channel if said local first primary receiving and transmitting channels are both found to be operative.

45. A method for configuring a continuous data loop as in claim 43 together with the step of initiating and directing said testing by one said terminal serving as controller terminal.

46. A method for configuring a continuous data loop as in claim 45 wherein said step of testing all elements of said first primary channel throughout the ring and thereafter coupling said first primary receiving and transmitting channels at each said terminal to form an aggregate first primary channel data loop if all said first primary channel elements are found to be operative comprises the steps of
    said controller terminal commanding all other said terminals to locally couple said first primary receiving and transmitting channels,
    said controller terminal transmitting a first test message on said first primary transmitting channel, and
    said controller terminal commanding all other said terminals to configure a first primary channel data loop if said first test message is subsequently received by said controller terminal on said first primary receiving channel.

47. A method for configuring a continuous data loop as in claim 45 wherein said step of testing all elements of said second primary channel throughout the ring if one or more of said first primary channel elements is found to be inoperative and thereafter coupling said second primary receiving and transmitting channels at each said terminal to form an aggregate second primary channel data loop if all said second primary channel elements are found to be operative comprises the steps of said controlled terminal commanding all other said terminals to locally couple said second primary receiving and transmitting channels, said controller terminal transmitting a second test message on said second primary transmitting channel, and said controller terminal commanding all other said terminals to configure a second primary channel data loop if said second test message is subsequently received by said controller terminal on said second primary receiving channel, but said first test message is not received on said first primary receiving channel.

48. A method for configuring a continuous data loop as in claim 45 wherein said step of testing local elements of both first and second primary channels in bilateral communication with each said nearest neighbor terminal of each said terminal if one or more of said first primary channel elements throughout the ring and one or more of said second primary channel elements throughout the ring are both to be inoperative comprises the steps of said controller terminal commanding all said terminals to test local elements of both first and second primary channels in bilateral communication with each said nearest neighbor terminal of each said terminal, each said terminal subsequently coupling said first primary receiving channel to said second primary transmitting channel and coupling said second primary receiving channel to said first primary transmitting channel, each said terminal transmitting test messages on said first and second primary transmitting channels, and each said terminal examining test messages received on said first and second primary receiving channels to ascertain the operative condition of local elements of both first and second primary channels in bilateral communication with each said nearest neighbor terminal.

49. A method for configuring a continuous data loop as in claim 48 together with the steps of each said terminal coupling said bypass receiving channel to said first primary transmitting channel and coupling said first primary receiving channel to said bypass transmitting channel, any said terminal ascertaining that its said first primary receiving channel is operative, but that the operative condition of its said first primary transmitting channel in unknown, further transmitting a test message on its said first primary transmitting channel and examining a test message received on its said first primary receiving channel to ascertain the operative condition of its said first primary transmitting channel.

50. A method for configuring a continuous data loop as in claim 49 together with the step of any said terminal ascertaining that its said first primary transmitting channel and its said second primary transmitting channel are both inoperative subsequently transmitting a message reporting same on its said bypass transmitting channel.

51. A method for configuring a continuous data loop as in claim 50 wherein said set procedure for coupling appropriate receiving and transmitting channels at each member terminal of said aggregate hybrid data loop comprises the steps of selecting said bypass receiving channel if said local second primary receiving channel is ascertained to be inoperative, selecting said bypass receiving channel if a message is received on said channel which reports a transmitting terminal having inoperative both first and second primary transmitting channels, selecting said second primary receiving channel if said channel is ascertained operative and if a message is not received on said bypass receiving channel reporting a transmiting terminal having inoperative both first and second primary transmitting channels, coupling said selected receiving channel to said forst primary transmitting channel if said local first primary receiving channel is ascertained to be inoperative, coupling said first primary receiving channel to both said second primary transmitting channel and said bypass transmitting channel if said local first primary receiving channel is ascertained to be operative but said first primary transmitting channel is ascertained to be inoperative, and coupling said selected receiving channel to both said second primary transmitting channel and said bypass transmitting channel and coupling said first primary receiving channel to said first primary transmitting channel if said local first primary receiving and transmitting channels are both ascertained to be operative.

* * * * *